US012432146B2

(12) United States Patent
Pinheiro et al.

(10) Patent No.: US 12,432,146 B2
(45) Date of Patent: Sep. 30, 2025

(54) METHODS AND APPARATUSES FOR HANDLING END-TO-END ENCRYPTION

(71) Applicant: Comcast Cable Communications, LLC, Philadelphia, PA (US)

(72) Inventors: Ana Lucia Pinheiro, Allen, TX (US); Robert Jaksa, Irving, TX (US); Stephie Lim, The Colony, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/479,465

(22) Filed: Oct. 2, 2023

(65) Prior Publication Data

US 2024/0114014 A1 Apr. 4, 2024

Related U.S. Application Data

(60) Provisional application No. 63/411,998, filed on Sep. 30, 2022.

(51) Int. Cl.
*H04L 9/40* (2022.01)
*H04L 45/00* (2022.01)
*H04L 45/24* (2022.01)
*H04L 47/122* (2022.01)
*H04L 47/2483* (2022.01)

(52) U.S. Cl.
CPC .......... *H04L 47/122* (2013.01); *H04L 45/24* (2013.01); *H04L 45/566* (2013.01); *H04L 47/2483* (2013.01); *H04L 63/0414* (2013.01); *H04L 63/0435* (2013.01)

(58) Field of Classification Search
CPC ..... H04L 47/122; H04L 45/24; H04L 45/566; H04L 47/2483; H04L 63/0414; H04L 63/0435; H04L 63/0428; H04L 63/166
See application file for complete search history.

(56) References Cited

U.S. PATENT DOCUMENTS

| | | | |
|---|---|---|---|
| 10,382,401 B1 * | 8/2019 | Lee | H04L 63/166 |
| 10,778,588 B1 | 9/2020 | Singh | |
| 11,929,925 B2 * | 3/2024 | Dutta | H04L 45/74 |
| 2005/0174937 A1 * | 8/2005 | Scoggins | H04M 7/006 370/230 |
| 2006/0212933 A1 * | 9/2006 | Scoggins | H04M 7/006 726/11 |
| 2013/0275534 A1 * | 10/2013 | Larson | H04L 67/14 709/225 |

(Continued)

OTHER PUBLICATIONS

International Search Report and Written Opinion issued in related application No. PCT/US23/34316 mailed Jan. 24, 2024.

(Continued)

*Primary Examiner* — Khalid M Almaghayreh
(74) *Attorney, Agent, or Firm* — Ballard Spahr LLP

(57) ABSTRACT

Methods, apparatuses, and systems for handling end-to-end encryption are described. A user device may send encrypted data to a server via a proxy using an encryption key shared with multiple network nodes across multiple layers. The proxy device may create an encrypted tunnel with an application server and send the encrypted data over the encrypted tunnel to the application server. The application server may receive the encrypted data over the encrypted tunnel from the proxy device. The application server may decrypt the encrypted data.

20 Claims, 36 Drawing Sheets

(56) References Cited

U.S. PATENT DOCUMENTS

| | | | |
|---|---|---|---|
| 2014/0071977 A1 | 3/2014 | Morrill et al. | |
| 2017/0034129 A1* | 2/2017 | Sawant | H04L 12/4633 |
| 2018/0359811 A1* | 12/2018 | Verzun | H04L 12/28 |
| 2019/0097881 A1* | 3/2019 | Lee | H04L 41/0803 |
| 2020/0304477 A1* | 9/2020 | Venkataraman | H04L 12/4633 |
| 2021/0204200 A1* | 7/2021 | Krishan | H04W 4/50 |
| 2022/0021612 A1 | 1/2022 | Zhou et al. | |
| 2022/0150059 A1* | 5/2022 | Tanaka | H04L 9/083 |
| 2022/0191139 A1* | 6/2022 | Dutta | H04L 69/22 |
| 2022/0360566 A1* | 11/2022 | Sawant | H04L 63/061 |
| 2022/0393981 A1* | 12/2022 | Solanki | H04L 47/805 |
| 2023/0118718 A1* | 4/2023 | Solanki | H04L 12/4633 726/12 |
| 2023/0198964 A1* | 6/2023 | Viswambharan | H04L 63/0485 713/168 |

OTHER PUBLICATIONS

International Search Report and Written Opinion issued in related application No. PCT/US23/34317 dated Apr. 22, 2024.

\* cited by examiner

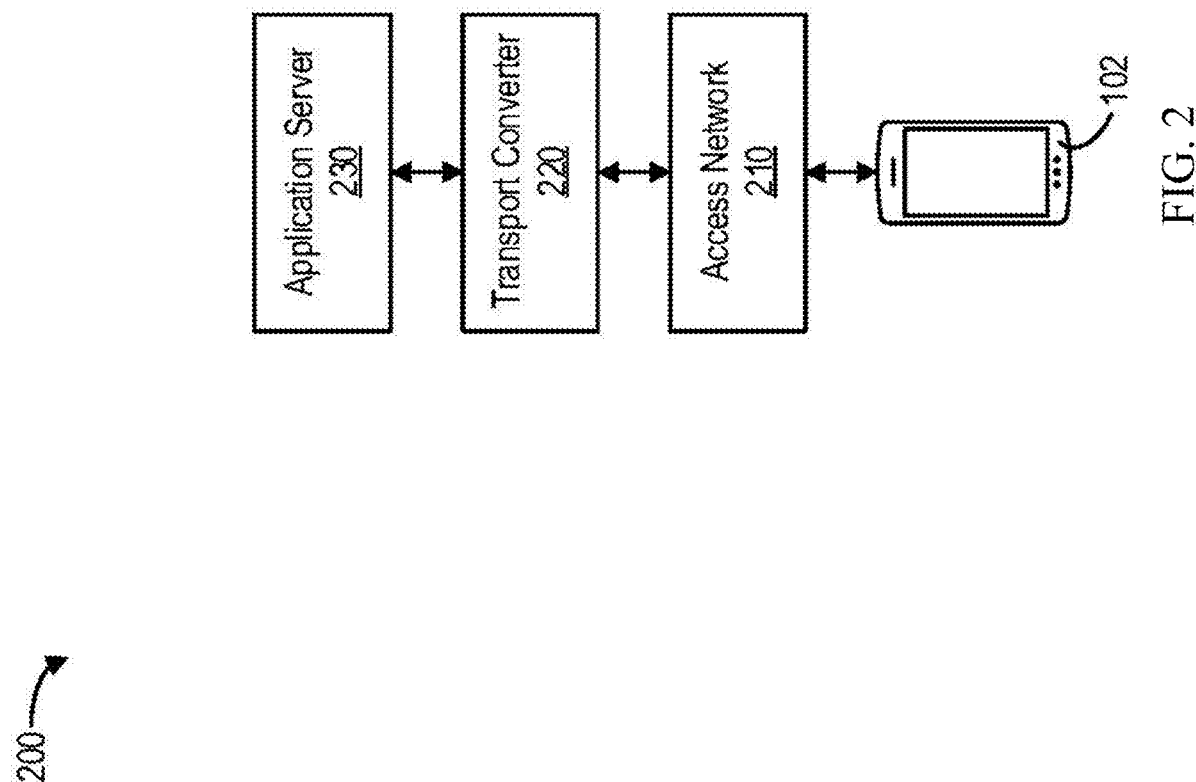

| Datagram mode 1 | QUIC DATAGRAM Frame {<br>Type (i) = 0x30, 0x31,<br>Length (i),<br>Datagram Data (Quarter Stream ID (i), HTTP Datagram Payload (Context ID=1, SeqNum, UDP data)) |
|---|---|
| Datagram mode 2 | QUIC DATAGRAM Frame {<br>Type (i) = 0x30, 0x31,<br>Length (i),<br>Datagram Data (Quarter Stream ID (i), HTTP Datagram Payload (Context ID=0, UDP data)) |

FIG. 7D

| Datagram mode 1 | QUIC DATAGRAM Frame {<br>Type (i) = 0x30..0x31,<br>[Length (i)],<br>Datagram Data (Quarter Stream ID (i), HTTP Datagram Payload (Context ID=1, SeqNum, UDP data))<br>} |
|---|---|
| Datagram mode 2 | QUIC DATAGRAM Frame {<br>Type (i) = 0x30..0x31,<br>[Length (i)],<br>Datagram Data (Quarter Stream ID (i), HTTP Datagram Payload (Context ID=0, SeqNum, UDP data))<br>} |

FIG. 21

METHODS AND APPARATUSES FOR HANDLING END-TO-END ENCRYPTION

CROSS REFERENCE TO RELATED APPLICATION

This application claims priority to U.S. Provisional Application No. 63/411,998, filed Sep. 30, 2022, the entirety of which is incorporated herein by reference.

BACKGROUND

Modern networking protocols are compartmentalized into a hierarchy of layers. For example, QUIC protocol operates as a transport layer protocol, which means it functions as a fundamental part of the networking stack responsible for facilitating communication between devices over the internet. The QUIC protocol operates at the transport layer, but it also incorporates features typically associated with additional layers or protocols such as HTTP3, Transport Layer Security (TLS), and User Datagram Protocol (UDP). Additional layers or protocols are configured to ride on top of preceding layers in the hierarchy and preceding layers encapsulate higher layers. Communication protocols need to understand these encapsulations to provide reliable interchangeability between different protocols and across various network nodes.

SUMMARY

It is to be understood that both the following general description and the following detailed description are exemplary and explanatory only and are not restrictive. Methods, apparatuses, and systems for handling end-to-end encryption across multiple layers and multiple network nodes are described. For example, a user device may perform QUIC encryption over 5G New Radio (NR) based on a shared key. Specifically, the user device may generate a frame that includes a QUIC datagram encrypted with the shared key or encryption key in the user device. The shared key or encryption key may be shared with multiple network nodes, including user plan function (UPF), and across multiple layers including a QUIC layer. After a multipath connection with the proxy (e.g., UPF) is established, the user device may send the frame to the server over the encryption tunnel between the user device and the server via the UPF. The UPF in the middle of the communication architecture may read/understand encrypted information based on the shared or encrypted key and forward the frame to the server.

This summary is not intended to identify critical or essential features of the disclosure, but merely to summarize certain features and variations thereof. Other details and features will be described in the sections that follow.

BRIEF DESCRIPTION OF THE DRAWINGS

In order to provide understanding techniques described, the figures provide non-limiting examples in accordance with one or more implementations of the present disclosure, in which:

FIG. 21 is example formats of QUIC datagrams in accordance with one or more implementations of the present disclosure.

DETAILED DESCRIPTION

Figure 1A:
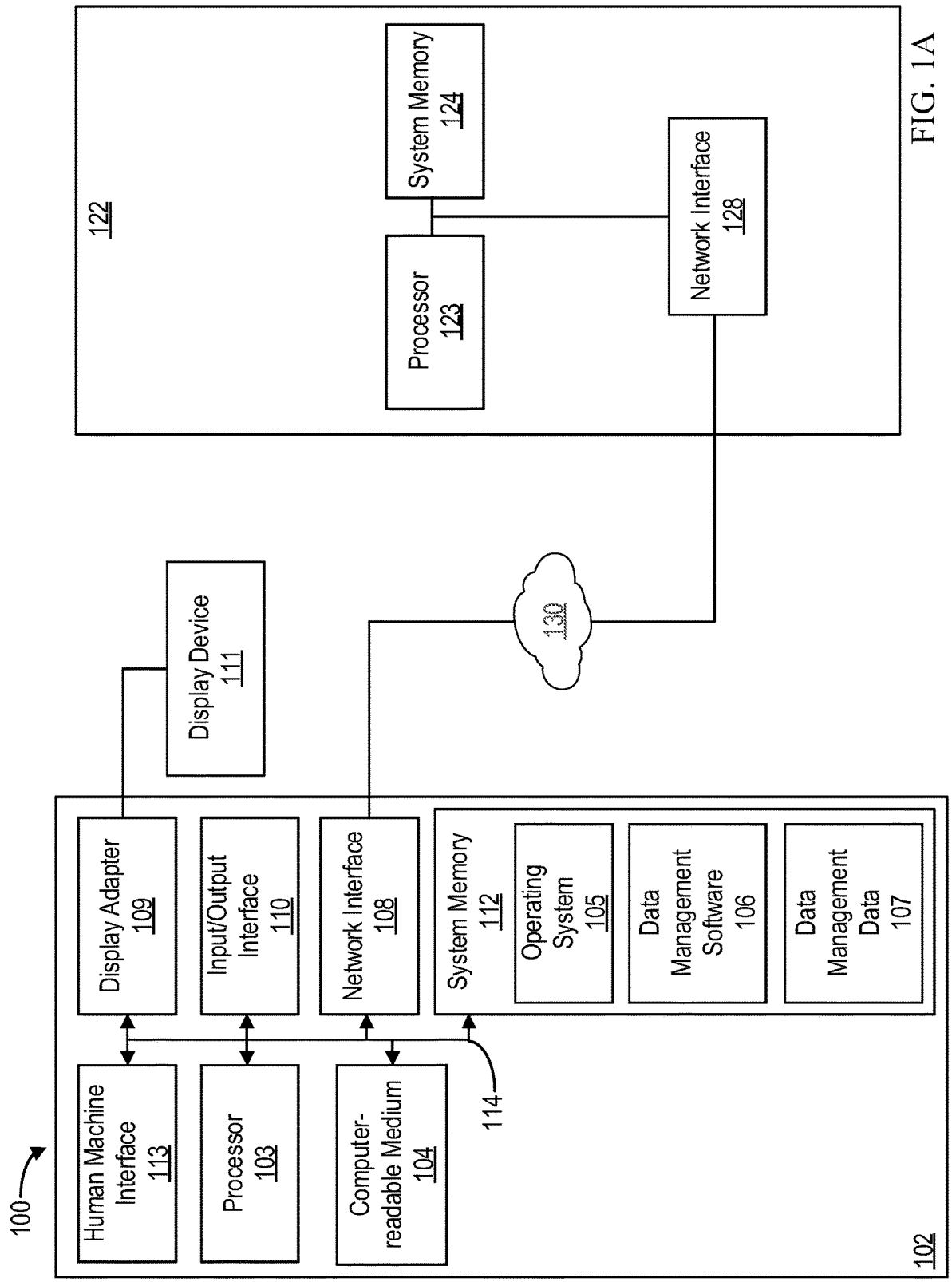
FIG. 1A illustrates an example system in accordance with one or more implementations of the present disclosure.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a special purpose computer or other programmable data processing instrument to produce a machine, such that the processor-executable instructions which execute on the computer or other programmable data processing instrument create a device for implementing the steps specified in the flowchart block or blocks.

These processor-executable instructions may also be stored in a non-transitory computer-readable memory or a computer-readable medium that may direct a computer or other programmable data processing instrument to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing instrument to cause a series of operational steps to be performed on the computer or other programmable instrument to produce a computer-implemented process such that the processor-executable instructions that execute on the computer or other programmable instrument provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The method steps recited throughout this disclosure may be combined, omitted, rearranged, or otherwise reorganized with any of the figures presented herein and are not intended to be limited to the four corners of each sheet presented.

The techniques disclosed herein may be implemented on a computing device in a way that improves the efficiency of its operation. As an example, the methods, instructions, and steps disclosed herein may improve the functioning of a computing device.

As disclosed herein, communications between a user device and a server (e.g., an application server) may be subjected to bottlenecks and link or path impediments, challenging the quality of service provided by Internet service providers (ISPs). For example, a user device may access an application server through one or more networks (e.g., 4G, 5G, 6G, Wi-Fi, Ethernet). In order to avoid reliance on only one connection mechanism to the application server, the user device or ISP may generate a multipath connection between the user device and the network with a transport converter, supporting the path between the network and the application server.

As disclosed herein, communications between user devices and these networks may be ordered. For example, the communications may be connection-based with a packet number or sequence number. The packet number may increase incrementally such that packets received are combined in order of the packet number or according to the sequence number. These communications may be organized into streams, which include ordered sequences of bytes for recombination at respective endpoints. Such ordered communications can cause undesirable and unintentional delays in data access from endpoints (e.g., user devices, application servers, etc.). A scheduler, Quality of Service (QoS) flow selector, or steering mode selector may estimate the best path for delivery of each packet before transmission. For example, after the packet is assembled or partially assembled, the scheduler may send a packet that includes a portion of the application data being sent on one path and another portion of the application data being sent on another path for reconstitution or reconstruction of the application data at the transport converter or proxy on the network before being forwarded to the application server.

Networks can be hampered by ordered communications because a buffer may be required to maintain the stream until the packets can be aggregated into the application data. For example, the scheduler may send a packet for a stream on the first path and another packet for the stream on another path. The packets may arrive at the transport converter at different times as delay on the paths may be different and constantly changing. As such, the scheduler may be configured to consider a stream identifier, application identifier, another identifier, or combination thereof and schedule packets associated with that stream, application, or otherwise on the same path. For example, the scheduler may be configured to maintain the path for the stream until an extreme situation arises (e.g., the round-trip time or latency satisfies a threshold).

As such, endpoint buffering may be overwhelmed when data is received out of order for a particular stream identifier because endpoints of the multipath communications may be required to deliver the data in order or combined and the endpoints may be required store any incomplete data until the missing pieces are received. An application identifier or stream identifier may be used to overcome these challenges. For example, the transport converter or user device may send data based on the application identifier or stream identifier on only one of the paths of the multipath connection. The application identifier may be further enclosed in header information to ensure that the packet is only sent on the path by nodes of the path. Additionally or alternatively, the stream identifier and the path identifier may be included in header information or information available to nodes, endpoints, and the transport converter to ensure that streams associated with a particular application or set of data are enclosed in a path or set of paths with a similar latency or delivery speed.

The payloads or portions of the application data may be encapsulated in a packet associated with a protocol used by the application (e.g., QUIC) and a protocol used by a kernel of the user device or the transport converter (e.g., MPQUIC). For example, a tunnel may be generated for the single path portion between the user device and the application server, and a tunnel may be generated for a multipath portion between the user device and the transport converter. That is, both protocols may generate separate encrypted tunnels (e.g., a transport layer security (TLS) tunnel), which may also increase the resources necessary for the connection without improving security. For example, the tunnel based on QUIC or another protocol may provide the same level of confidentiality, integrity, and availability as a QUIC-based tunnel inside of an MPQUIC-based tunnel and require additional overhead to construct.

As such, duplicative overhead may be required by protocols. A streamlined configuration may reduce such overhead on the network. For example, the TLS tunnel may be established between the application layer of the user device and the application layer of the application server without the tunnel between the user device and the transport converter. The header for the multipath connection may include multipath information (e.g., connection identifiers, packet numbers, addresses, ports, etc.) for communication between the transport converter and the user device and single path information (e.g., addresses, ports, packet numbers, etc.). These and other improvements to computing systems are disclosed herein.

FIG. 1A shows a system 100 in accordance with one or more applications of the present disclosure. The user device 102 may comprise one or more processors 103, a system memory 112, and a bus 114 that couples various components of the user device 102 including the one or more processors 103 to the system memory 112. In the case of multiple processors 103, the user device 102 may utilize parallel computing.

The bus 114 may comprise one or more of several possible types of bus structures, such as a memory bus, memory controller, a peripheral bus, an accelerated graphics port, and a processor or local bus using any of a variety of bus architectures.

The user device 102 may operate on and/or comprise a variety of user device readable media (non-transitory). User device readable media may be any available media that is accessible by the user device 102 and comprises, non-transitory, volatile and/or non-volatile media, removable and non-removable media. The system memory 112 has user device readable media in the form of volatile memory, such as random-access memory (RAM), and/or non-volatile memory, such as read only memory (ROM). The system memory 112 may store data such as data 107 and/or programs such as operating system 105 and software 106 that are accessible to and/or are operated on by the one or more processors 103.

The user device 102 may also comprise other removable/non-removable, volatile/non-volatile user device storage media. The computer-readable medium 104 may provide non-volatile storage of user device code, user device readable instructions, data structures, programs, and other data for the user device 102. The computer-readable medium 104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of programs may be stored on the computer-readable medium 104. An operating system 105 and software 106 may be stored on the computer-readable medium 104. One or more of the operating system 105 and software 106 (e.g., mobile applications), or some combination thereof, may comprise program and the software 106. Data 107 may also be stored on the computer-readable medium 104. Data 107 may be stored in any of one or more databases known in the art. The databases may be centralized or distributed across multiple locations within the network 130.

A user may enter commands and information into the user device 102 via an input device (not shown). Such input devices comprise, but are not limited to, a keyboard, pointing device (e.g., a computer mouse, remote control, etc.), a microphone, a joystick, a scanner, tactile input devices such as gloves, and other body coverings, motion sensor, and the like These and other input devices may be connected to the one or more processors 103 via a human machine interface 113 that is coupled to the bus 114, but may be connected by other interface and bus structures, such as a parallel port, game port, an IEEE 1394 Port (also known as a Firewire port), a serial port, network interface 108, and/or a universal serial bus (USB).

A display device 111 may also be connected to the bus 114 via an interface, such as a display adapter 109. It is contemplated that the user device 102 may have more than one display adapter 109 and the user device 102 may have more than one display device 111. A display device 111 may be a monitor, an LCD (Liquid Crystal Display), light emitting diode (LED) display, television, smart lens, smart glass, and/or a projector. In addition to the display device 111, other output peripheral devices may comprise components such as speakers (not shown) and a printer (not shown) which may be connected to the user device 102 via Input/Output Interface 110. Any step and/or result of the methods may be output (or caused to be output) in any form to an output device. Such output may be any form of visual representation, including, but not limited to, textual, graphical, animation, audio, tactile, and the like. The display device 111 and user device 102 may be part of one device, or separate devices.

The user device 102 may operate in a networked environment using logical connections to one or more computing devices 122. A computing device 122, or user device 102, may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the user device 102 and a computing device 122 may be made via a network 130. Such network connections may be through a network interface 108. A network interface 108 may be implemented in both wired and wireless environments.

Application programs and other executable program components such as the operating system 105 are shown herein as discrete blocks, although it is recognized that such programs and components may reside at various times in different storage components of the user device 102, and are executed by the one or more processors 103 of the user device 102. The computing device 122 may include all of the components described with regard to the user device 102.

The user device 102 may communicate with the computing device 122 over a network 130. Such communication paths may include wired communication technologies, wireless communication technologies, or combinations thereof. Wireless communication technologies may include various 3GPP standards (e.g., 4G LTE, 5G New Radio (NR), etc.) and Institute of Electrical and Electronics Engineers (IEEE) standards (e.g., 802.11g, 802.11n, 802.11ac, 802.11ax, 802.11be, etc.). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

Figure 1B:
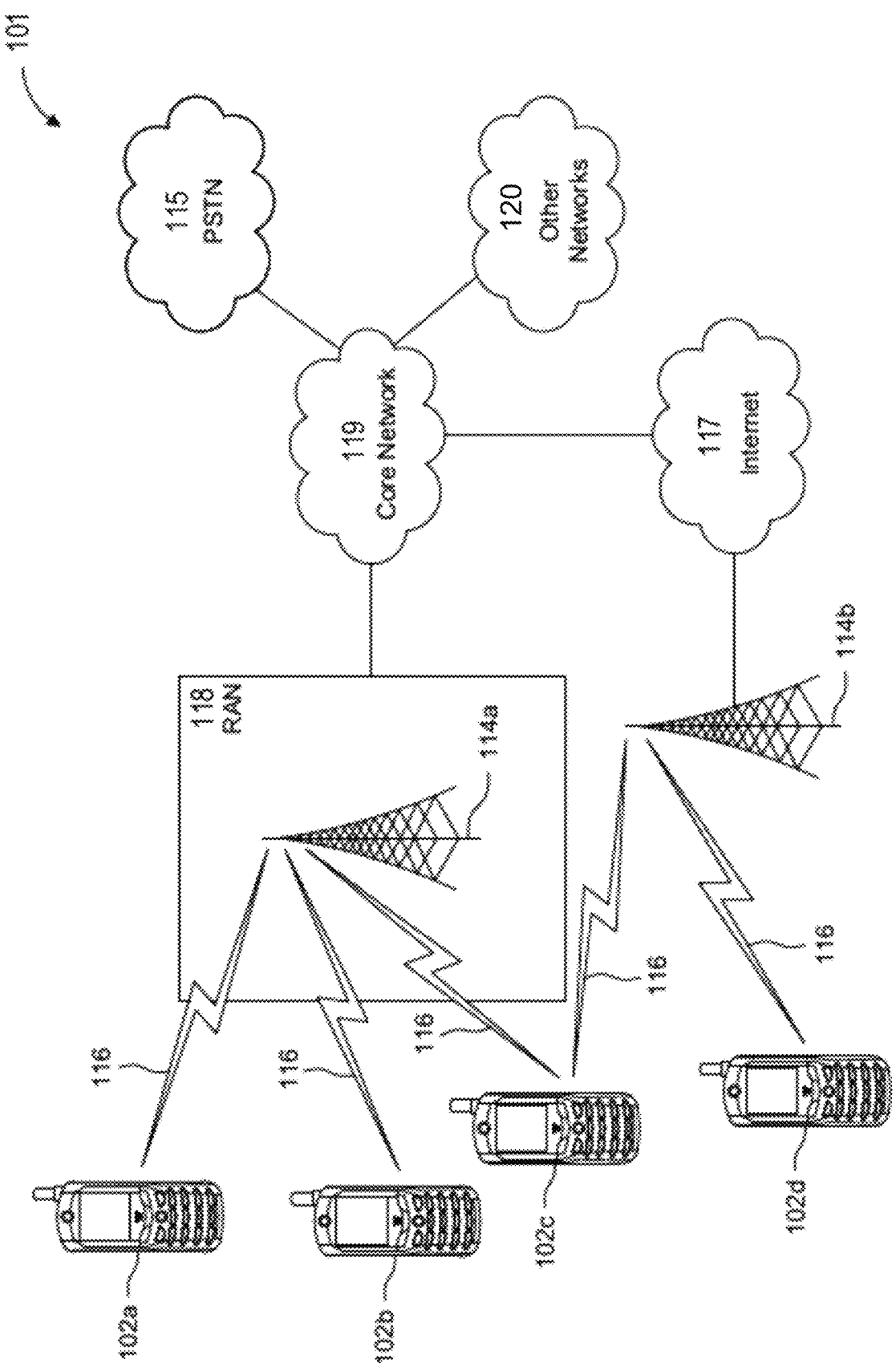
FIG. 1B illustrates an example system diagram in accordance with one or more implementations of the present disclosure.

FIG. 1B shows an example communications system 101. The communications system 101 may be a multiple access system that provides content, such as voice, data, video, messaging, broadcast, etc., to multiple wireless users. The communications system 101 may enable multiple wireless users to access such content through the sharing of system resources, including wireless bandwidth. For example, the communications systems 101 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multi-carrier (FBMC), and the like.

As shown in FIG. 1B, the communications system 101 may include user devices 102a, 102b, 102c, 102d, a radio access network (RAN) 118, a core network (CN) 119, a public switched telephone network (PSTN) 115, the Internet 117, and other networks 120, though it will be appreciated that any number of user devices, base stations, networks, and/or network elements are contemplated. Each of the user devices 102a, 102b, 102c, 102d may be any type of device configured to operate and/or communicate in a wireless environment. By way of example, the user devices 102a, 102b, 102c, 102d, any of which may be referred to as a station (STA), may be configured to transmit and/or receive wireless signals and may include a user equipment (UE), a wireless transmit/receive unit (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, an industrial device and applications (e.g., a robot and/or other wireless devices operating in an industrial and/or an automated processing chain contexts), a consumer electronics device, a device operating on commercial and/or industrial wireless networks, and the like. Any of the user devices 102a, 102b, 102c and 102d may be interchangeably referred to as a UE.

The communications systems 101 may also include a base station 114a and/or a base station 114b. Each of the base stations 114a, 114b may be any type of device configured to wirelessly interface with at least one of the user devices 102a, 102b, 102c, 102d to facilitate access to one or more communication networks, such as the CN 119, the Internet 117, and/or the other networks 120. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 118, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, the base station 114a may include three transceivers, i.e., one for each sector of the cell. The base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the user devices 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 101 may be a multiple access system and may employ one or more channel access schemes, such as CDMA, TDMA, FDMA, OFDMA, SC-FDMA, and the like. For example, the base station 114a in the RAN 118 and the user devices 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

The base station 114a and the user devices 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

The base station 114a and the user devices 102a, 102b, 102c may implement a radio technology such as NR Radio Access, which may establish the air interface 116 using NR.

The base station 114a and the user devices 102a, 102b, 102c may implement multiple radio access technologies. For example, the base station 114a and the user devices 102a, 102b, 102c may implement LTE radio access and NR radio access together, for instance using dual connectivity (DC) principles. Thus, the air interface utilized by user devices 102a, 102b, 102c may be characterized by multiple types of radio access technologies and/or transmissions sent to/from multiple types of base stations (e.g., an eNB and a gNB).

The base station 114a and the user devices 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1B may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. The base station 114b and the user devices 102c, 102d may implement a radio technology such as IEEE 802.11 to establish a wireless local area network (WLAN). The base station 114b and the user devices 102c, 102d may implement a radio technology such as IEEE 802.15 to establish a wireless personal area network (WPAN). The base station 114b and the user devices 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1B, the base station 114b may have a direct connection to the Internet 117. Thus, the base station 114b may not be required to access the Internet 117 via the CN 119.

The RAN 118 may be in communication with the CN 119, which may be any type of network configured to provide voice, data, applications, and/or voice over internet protocol (VoIP) services to one or more of the user devices 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 119 may provide call control, billing services, mobile location-based services, pre-paid calling, Internet connectivity, video distribution, etc., and/or perform high-level security functions, such as user authentication. Although not shown in FIG. 1B, it will be appreciated that the RAN 118 and/or the CN 119 may be in direct or indirect communication with other RANs that employ the same RAT as the RAN 118 or a different RAT. For example, in addition to being connected to the RAN 118, which may be utilizing a NR radio technology, the CN 119 may also be in communication with another RAN (not shown) employing a GSM, UMTS, CDMA 2000, WiMAX, E-UTRA, or WiFi radio technology.

The CN 119 may also serve as a gateway for the user devices 102a, 102b, 102c, 102d to access the PSTN 115, the Internet 117, and/or the other networks 120. The PSTN 115 may include circuit-switched telephone networks that provide plain old telephone service (POTS). The Internet 117 may include a global system of interconnected computer networks and devices that use common communication protocols, such as the transmission control protocol (TCP), user datagram protocol (UDP) and/or the internet protocol (IP) in the TCP/IP internet protocol suite. The networks 120 may include wired and/or wireless communications networks owned and/or operated by other service providers. For example, the networks 120 may include another CN connected to one or more RANs, which may employ the same RAT as the RAN 118 or a different RAT.

Some or all of the user devices 102a, 102b, 102c, 102d in the communications system 101 may include multi-mode capabilities (e.g., the user devices 102a, 102b, 102c, 102d may include multiple transceivers for communicating with different wireless networks over different wireless links). For example, the user device 102c shown in FIG. 1B may be configured to communicate with the base station 114a, which may employ a cellular-based radio technology, and with the base station 114b, which may employ an IEEE 802 radio technology.

Figure 1C:
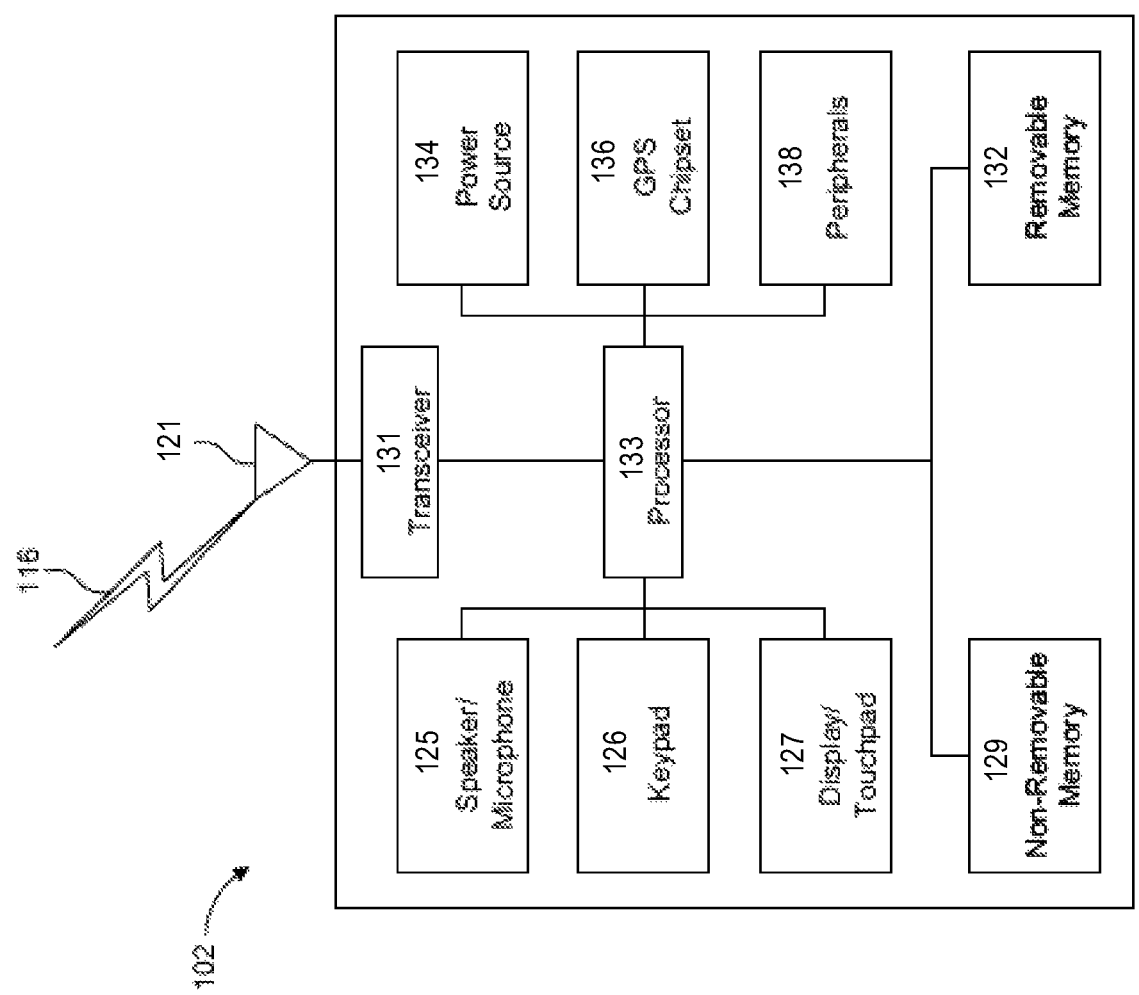
FIG. 1C illustrates an example system diagram in accordance with one or more implementations of the present disclosure.

FIG. 1C is a system diagram illustrating an example user device 102. As shown in FIG. 1C, the user device 102 may include a processor 133, a transceiver 131, a transmit/receive element 121, a speaker/microphone 125, a keypad 126, a display/touchpad 127, non-removable memory 129, removable memory 132, a power source 134, a global positioning system (GPS) chipset 136, and/or other peripherals 138, among others. It will be appreciated that the user device 102 may include any sub-combination of the foregoing elements.

The processor 133 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 133 may perform signal coding, data processing, power control, input/output processing, and/or any other functionality that enables the user device 102 to operate in a wireless environment. The processor 133 may be coupled to the transceiver 131, which may be coupled to the transmit/receive element 121. While FIG. 1C depicts the processor 133 and the transceiver 131 as separate components, it will be appreciated that the processor 133 and the transceiver 131 may be integrated together in an electronic package or chip.

The transmit/receive element 121 may be configured to transmit signals to, or receive signals from, a base station (e.g., the base station 114a) over the air interface 116. For example, the transmit/receive element 121 may be an antenna configured to transmit and/or receive RF signals. The transmit/receive element 121 may be an emitter/detector configured to transmit and/or receive IR, UV, or visible light signals, for example. The transmit/receive element 121 may be configured to transmit and/or receive both RF and light signals. It will be appreciated that the transmit/receive element 121 may be configured to transmit and/or receive any combination of wireless signals.

Although the transmit/receive element 121 is depicted in FIG. 1C as a single element, the user device 102 may include any number of transmit/receive elements 121. More specifically, the user device 102 may employ MIMO technology. Thus, the user device 102 may include two or more transmit/receive elements 121 (e.g., multiple antennas) for transmitting and receiving wireless signals over the air interface 116.

The transceiver 131 may be configured to modulate the signals that are to be transmitted by the transmit/receive element 121 and to demodulate the signals that are received by the transmit/receive element 121. As noted above, the user device 102 may have multi-mode capabilities. Thus, the transceiver 131 may include multiple transceivers for enabling the user device 102 to communicate via multiple RATs, such as NR and IEEE 802.11, for example.

The processor 133 of the user device 102 may be coupled to, and may receive user input data from, the speaker/microphone 125, the keypad 126, and/or the display/touchpad 127 (e.g., a liquid crystal display (LCD) display unit or organic light-emitting diode (OLED) display unit). The processor 133 may also output user data to the speaker/microphone 125, the keypad 126, and/or the display/touchpad 127. In addition, the processor 133 may access information from, and store data in, any type of suitable memory, such as the non-removable memory 129 and/or the removable memory 132. The non-removable memory 129 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 133 may access information from, and store data in, memory that is not physically located on the user device 102, such as on a server or a home computer (not shown).

The processor 133 may receive power from the power source 134, and may be configured to distribute and/or control the power to the other components in the user device 102. The power source 134 may be any suitable device for powering the user device 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 133 may also be coupled to the GPS chipset 136, which may be configured to provide location information (e.g., longitude and latitude) regarding the current location of the user device 102. In addition to, or in lieu of, the information from the GPS chipset 136, the user device 102 may receive location information over the air interface 116 from a base station (e.g., base stations 114a, 114b) and/or determine its location based on the timing of the signals being received from two or more nearby base stations. It will be appreciated that the user device 102 may acquire location information by way of any suitable location-determination method.

The processor 133 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The user device 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 133). The user device 102 may include a half-duplex radio for which transmission and reception of some or all of the signals (e.g., associated with particular subframes for either the UL (e.g., for transmission) or the DL (e.g., for reception)).

The user device 102 described in FIGS. A-E may perform one or more methods for handling end-to-end encryption using QUIC and/or UDP protocols. For example, the user device 102 may generate a frame that comprises a data packet. The data packet may be encrypted based on an encryption key. The encryption key may be shared with a plurality of network nodes across a plurality of layers. The plurality of network nodes may comprise eNode-B 160a-c, MME 162, Serving Gateway 164, PDN Gateway 166, one or more nodes in PSTN 115, one or more nodes in internet network 117, one or more nodes in other networks 120. The plurality of network nodes may also comprise one or more nodes in a 5G network such as gNB 180a-c, AMF 182a-b, UPF 184a-b, SMF 183a-b, and DN 185a-b. The plurality of layers may comprise a QUIC protocol layer, an Internet Protocol (IP) layer, a UDP layer, and the like.

The user device 102 may determine a multipath connection with a network node such as a proxy. For example, the user device 102 may determine, based on QoS information such as QoS flows associated with a data packet, a multipath connection to transmit/receive the data packet from/to the proxy. The user device 102 may also send a request to create an encrypted tunnel with a server. The server may be located in the Internet network 117. Once the encrypted tunnel is established between the user device 102 and the server, the user device 102 may send, to the proxy, the frame using a path of the multipath connection. The proxy may forward the frame to the server over the encryption tunnel based on the encryption key shared with the plurality of network nodes across the plurality of layers.

The user device 102 described in FIGS. A-E may perform one or more methods for maintaining multiple streams on the same path for UDP/QUIC/MPQUIC traffics. For example, the user device 102 may determine a first network condition of a first path and a second network condition of a second path. The first path and the second path may be part of or associated with a connection. The connection may be the multipath connection. The first path and the second path may also comprise a first data stream and a second data stream, respectively. The user device 102 may send, based on the first network condition relative to the second network condition satisfying a network preference, a first packet using the first path. The user device 102 may determine a third network condition of the second path and a fourth network condition of the first path. Based on the third network condition relative to the fourth network condition satisfying the network preference and based on that the first packet and the second packet form the same data stream, the user device 102 may send a second packet using the first path. In other words, despite that the second path is better than the first path, the user device 102 may send the second packet using the first path if the first packet and the second packet are parts of the same data stream.

Figure 1D:
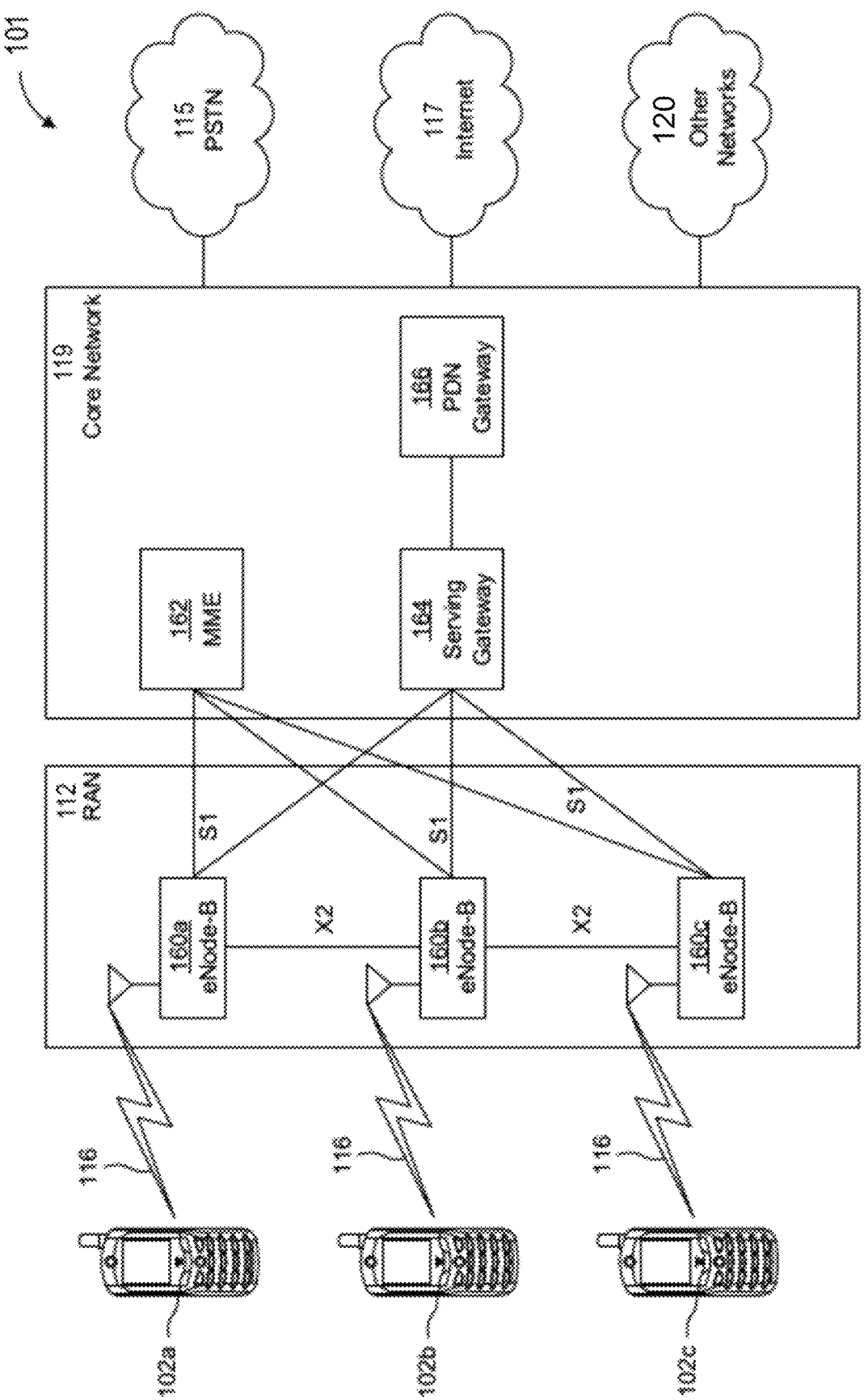
FIG. 1D illustrates an example system diagram in accordance with one or more implementations of the present disclosure.

FIG. 1D is a system diagram illustrating the RAN 118 and the CN 119. As noted above, the RAN 118 may employ an E-UTRA radio technology to communicate with the user devices 102a, 102b, 102c over the air interface 116. The RAN 118 may also be in communication with the CN 119.

The RAN 118 may include eNode-Bs 160a, 160b, 160c, though it will be appreciated that the RAN 118 may include any number of eNode-Bs. The eNode-Bs 160a, 160b, 160c may each include one or more transceivers for communicating with the user devices 102a, 102b, 102c over the air interface 116. The eNode-Bs 160a, 160b, 160c may implement MIMO technology. Thus, the eNode-B 160a, for example, may use multiple antennas to transmit wireless signals to, and/or receive wireless signals from, the user device 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1D, the eNode-Bs 160a, 160b, 160c may communicate with one another over an X2 interface.

The CN 119 shown in FIG. 1D may include a mobility management entity (MME) 162, a serving gateway (SGW) 164, and a packet data network (PDN) gateway (PGW) 166. While the foregoing elements are depicted as part of the CN 119, it will be appreciated that any of these elements may be owned and/or operated by an entity other than the CN operator.

The MME 162 may be connected to each of the eNode-Bs 160a, 160b, 160c in the RAN 118 via an S1 interface and may serve as a control node. For example, the MME 162 may be responsible for authenticating users of the user devices 102a, 102b, 102c, bearer activation/deactivation, selecting a particular serving gateway during an initial attach of the user devices 102a, 102b, 102c, and the like. The MME 162 may provide a control plane function for switching between the RAN 118 and other RANs (not shown) that employ other radio technologies, such as GSM and/or WCDMA.

The SGW 164 may be connected to each of the eNode Bs 160a, 160b, 160c in the RAN 118 via the S1 interface. The SGW 164 may generally route and forward user data packets to/from the user devices 102a, 102b, 102c. The SGW 164 may perform other functions, such as anchoring user planes during inter-eNode B handovers, triggering paging when DL data is available for the user devices 102a, 102b, 102c, managing and storing contexts of the user devices 102a, 102b, 102c, and the like.

The SGW 164 may be connected to the PGW 166, which may provide the user devices 102a, 102b, 102c with access to packet-switched networks, such as the Internet 117, to facilitate communications between the user devices 102a, 102b, 102c and IP-enabled devices.

The CN 119 may facilitate communications with other networks. For example, the CN 119 may provide the user devices 102a, 102b, 102c with access to circuit-switched networks, such as the PSTN 115, to facilitate communications between the user devices 102a, 102b, 102c and traditional land-line communications devices. For example, the CN 119 may include, or may communicate with, an IP gateway (e.g., an IP multimedia subsystem (IMS) server) that serves as an interface between the CN 119 and the PSTN 115. In addition, the CN 119 may provide the user devices 102a, 102b, 102c with access to the other networks 120, which may include other wired and/or wireless networks that are owned and/or operated by other service providers.

Although the user device is described in FIGS. 1A-1E as a wireless terminal, such a terminal may use (e.g., temporarily or permanently) wired communication interfaces with the communication network.

The other network 120 may be a WLAN. A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). The DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum.802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1E:
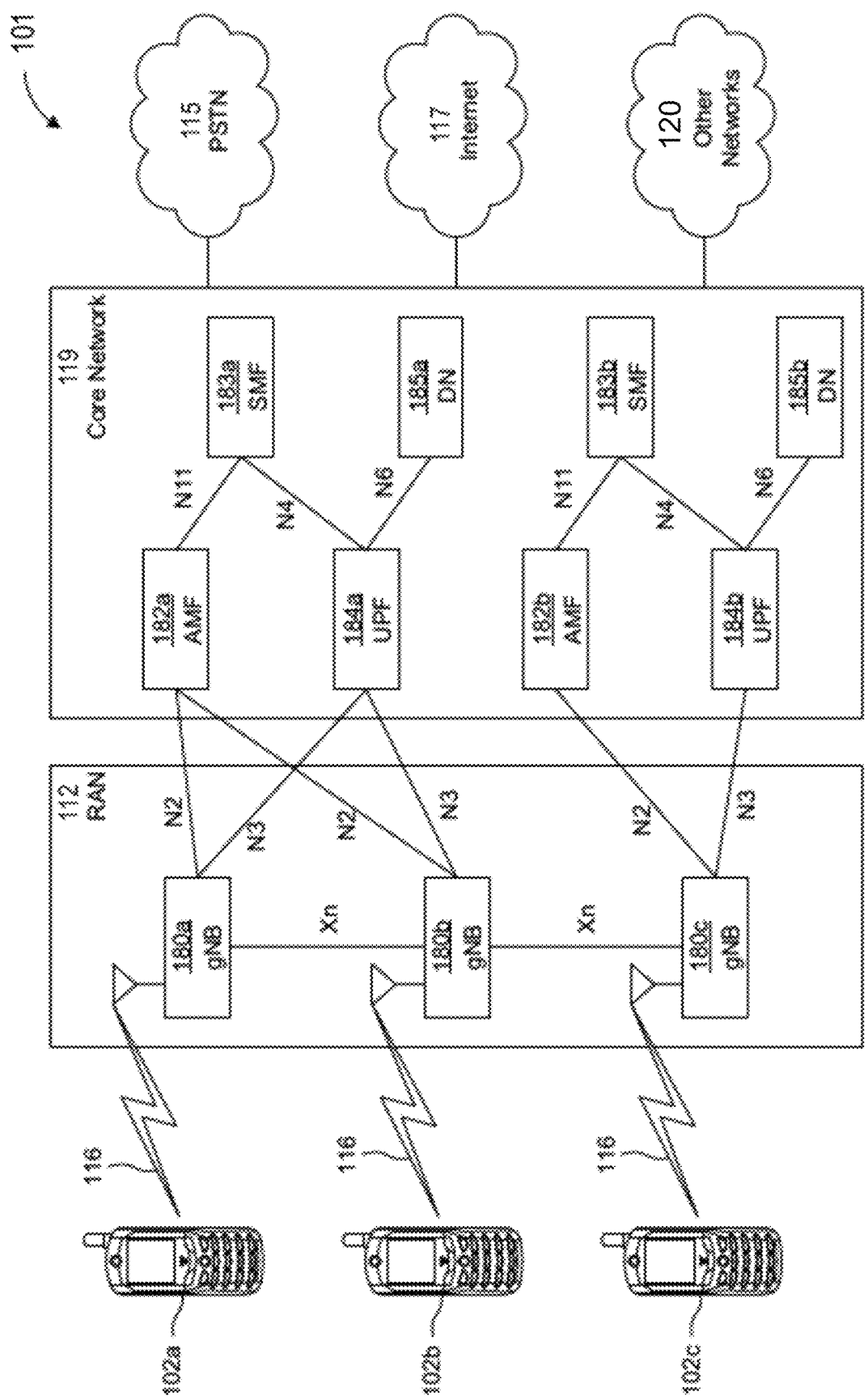
FIG. 1E illustrates an example system diagram in accordance with one or more implementations of the present disclosure.

FIG. 1E is a system diagram illustrating the RAN 118 and the CN 119. As noted above, the RAN 118 may employ an NR radio technology to communicate with the user devices 102a, 102b, 102c over the air interface 116. The RAN 118 may also be in communication with the CN 119.

The RAN 118 may include gNBs 180a, 180b, 180c, though it will be appreciated that the RAN 118 may include any number of gNBs. The gNBs 180a, 180b, 180c may each include one or more transceivers for communicating with the user devices 102a, 102b, 102c over the air interface 116. The gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the user device 102a. The gNBs 180a, 180b, 180c may implement carrier aggregation technology. For example, the gNB 180a may transmit multiple component carriers to the user device 102a (not shown). A subset of these component carriers may be on unlicensed spectrum while the remaining component carriers may be on licensed spectrum. The gNBs 180a, 180b, 180c may implement Coordinated Multi-Point (CoMP) technology. For example, user device 102a may receive coordinated transmissions from gNB 180a and gNB 180b (and/or gNB 180c).

The user devices 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The user devices 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the user devices 102a, 102b, 102c in a standalone configuration and/or a non-standalone configuration. In the standalone configuration, user devices 102a, 102b, 102c may communicate with gNBs 180a, 180b, 180c without also accessing other RANs (e.g., such as eNode-Bs 160a, 160b, 160c). In the standalone configuration, user devices 102a, 102b, 102c may utilize one or more of gNBs 180a, 180b, 180c as a mobility anchor point. In the standalone configuration, user devices 102a, 102b, 102c may communicate with gNBs 180a, 180b, 180c using signals in an unlicensed band. In a non-standalone configuration user devices 102a, 102b, 102c may communicate with/connect to gNBs 180a, 180b, 180c while also communicating with/connecting to another RAN such as eNode-Bs 160a, 160b, 160c. For example, user devices 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for user devices 102a, 102b, 102c and gNBs 180a, 180b, 180c may provide additional coverage and/or throughput for servicing user devices 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1E, the gNBs 180a, 180b, 180c may communicate with one another over an Xn interface.

The CN 119 shown in FIG. 1E may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 119, it will be appreciated that any of these elements may be owned and/or operated by an entity other than the CN operator.

The AMF 182a, 182b may be connected to one or more of the gNBs 180a, 180b, 180c in the RAN 118 via an N2 interface and may serve as a control node. For example, the AMF 182a, 182b may be responsible for authenticating users of the user devices 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for user devices 102a, 102b, 102c based on the types of services being utilized user devices 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 118 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 119 via an N11 interface. The SMF 183a, 183b may also be connected to a UPF 184a, 184b in the CN 119 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 118 via an N3 interface, which may provide the user devices 102a, 102b, 102c with access to packet-switched networks, such as the Internet 117, to facilitate communications between the user devices 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The UPF 184a, 184b may perform one or more methods for handling end-to-end encryption using QUIC and/or UDP protocols. For example, the UPF 184a, 184b may determine, based on Quality of Server (QoS) information associated with a data packet, a multipath connection with a user device 102. The QoS information may be related to network traffics such as UDP flows or QUIC flows. The UPF 184a, 184b may receive, from the user device 102, a request to create an encrypted tunnel with a server. The request may comprise a method field being set to CONNECT and a protocol field being set to CONNECT-UDP or CONNECT-IP. The UPF 184a, 184b may receive, from the user device, using a path of the multipath connection, a frame. The frame may comprise the data packet. The data packet may be encrypted based on an encryption key shared with a plurality of network nodes across a plurality of layers.

The plurality of network nodes may comprise eNode-B 160a-c, MME 162, Serving Gateway 164, PDN Gateway 166, one or more nodes in PSTN 115, one or more nodes in internet network 117, one or more nodes in other networks 120. The plurality of network nodes may also comprise one or more nodes in a 5G network such as gNB 180a-c, AMF 182a-b, UPF 184a-b, SMF 183a-b, and DN 185a-b. The plurality of layers may comprise a QUIC protocol layer, an Internet Protocol (IP) layer, a UDP layer, and the like.

The UPF 184a, 184b may send, to the application server, the frame over the encryption tunnel based on the encryption key shared with the plurality of network nodes across the plurality of layers. The UPF 184a, 184b may be a proxy or a proxy server.

The CN 119 may facilitate communications with other networks. For example, the CN 119 may include, or may communicate with, an IP gateway (e.g., an IP multimedia subsystem (IMS) server) that serves as an interface between the CN 119 and the PSTN 115. In addition, the CN 119 may provide the user devices 102a, 102b, 102c with access to the other networks 120, which may include other wired and/or wireless networks that are owned and/or operated by other service providers. The user devices 102a, 102b, 102c may be connected to a local DN 185a, 185b through the UPF 184a, 184b via the interface to the UPF 184a, 184b and an N6 interface between the UPF 184a, 184b and the DN 185a, 185b.

In view of FIGS. 1A-1E, and the corresponding description of FIGS. 1A-1E, one or more, or all, of the functions described herein with regard to one or more of: user device 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or user device functions.

Communications protocols contemplated herein may be connectionless or connection based. For example, Transmission Control Protocol (TCP) may be used to establish state-based or connection-based communication between a client (e.g., user device 102), a computing device 122, or components, hops, nodes, instances, functions there between, or combinations thereof. A protocol may define header and payload information for packets of information. Headers may define various configurations and settings associated with the transmitted payload. User Datagram Protocol (UDP) may be similarly used to and configured to provide a connection-based protocol (e.g., QUIC). Other protocols (e.g., Datagram Congestion Control Protocol (DCCP)) are contemplated for use in accordance with one or more implementations of the present disclosure. Protocols may also include multipath versions (e.g., MPQUIC, MPDCCP, MPTCP, etc.).

Figure 2B:
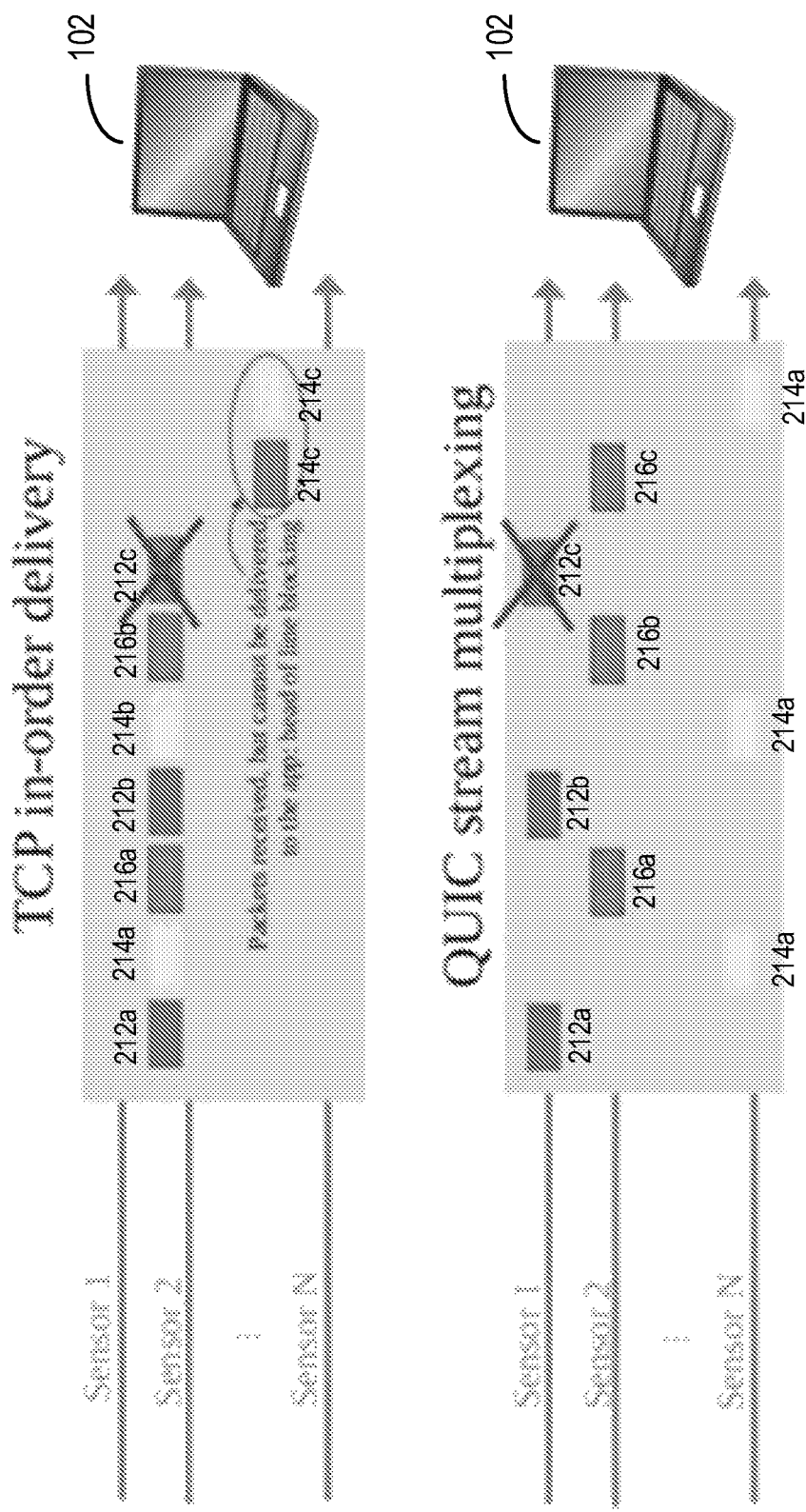
FIG. 2 illustrates an example communication architecture in accordance with one or more implementations of the present disclosure.
Figure 2C:
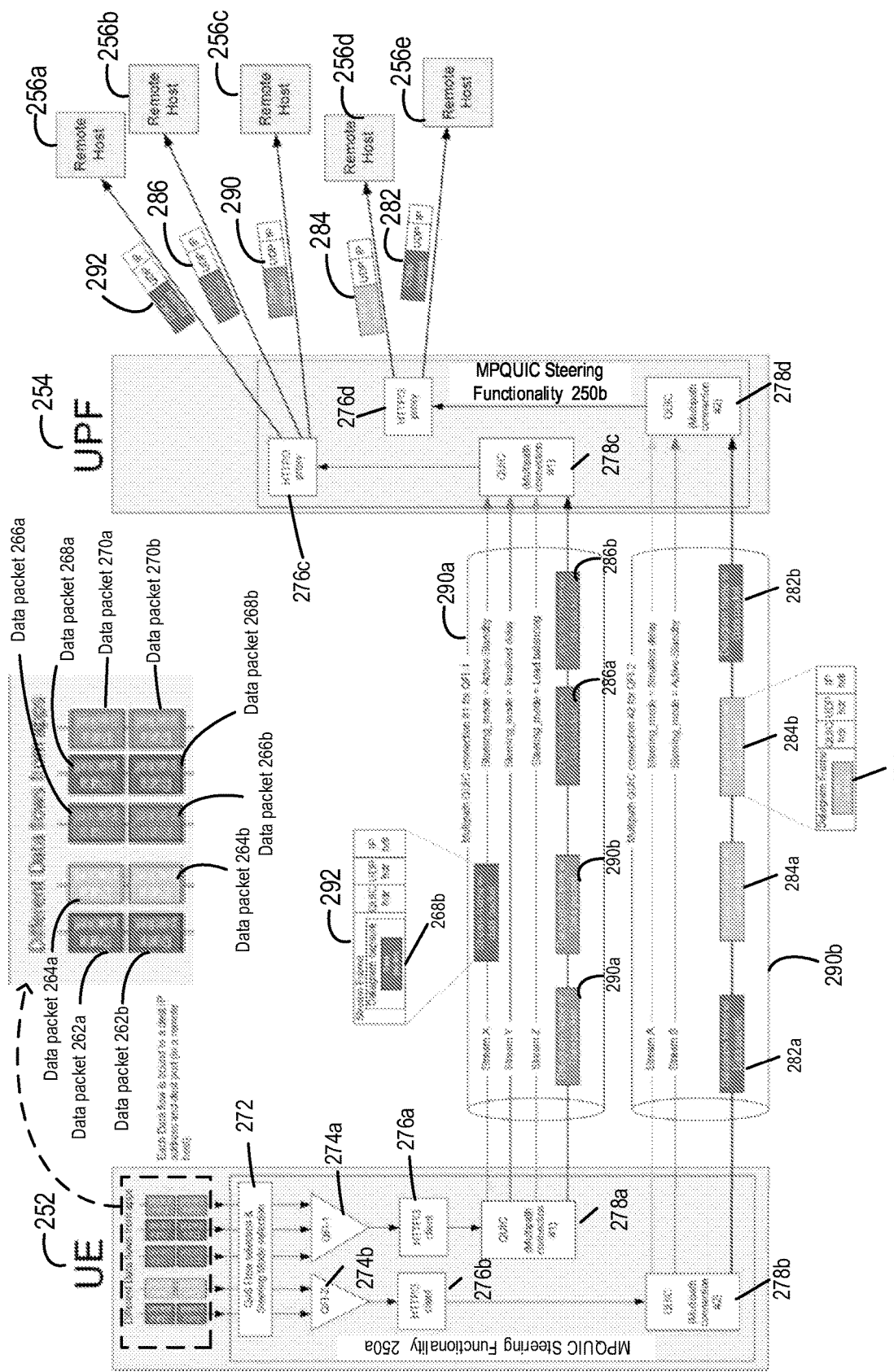

Referring to FIG. 2, an example communication architecture 200 in accordance with one or more implementations of the present disclosure is shown. The communication architecture 200 may include an access network 210. The access network 210 may include cellular base stations, access points, gateways, edge devices, and other appliances for connecting to a network. Subscriptions may be issued for the user device 102 to access a network. The network may include communications hardware and software to support various protocols and components (e.g., 3GPP 5G, IEEE 802.11, and the like). For example, the network may include a transport converter 220 and provide access to a data network (not shown). The data network may provide access to the application server 230. The transport converter may be based on a 0-RTT protocol (e.g., Internet Engineering Task Force (IETF) request for comment (RFC) 8803).

QUIC protocol may be used for the Internet moving forward as it is required for HTTP/3 protocol. Therefore, applications in the user device 102 may use QUIC. In addition, Access Traffic Steering, Switching, and Splitting (ATSSS) in 3GPP may support Multipath QUIC (MPQUIC) for the transport layer between the user device 102 and a network node such the UPF 184b. Thus, the QUIC layer may be located on top of the MPQUIC layer.

QUIC is a connection-oriented protocol that creates a stateful interaction between a client and a server. Endpoints may communicate in QUIC by exchanging one or more QUIC packets. Most packets may include frames, which carry control information and application data between endpoints. QUIC may authenticate the entirety of each packet and encrypt as much of each packet as is practical. QUIC packets may be carried in UDP datagrams to facilitate deployment in existing systems and networks.

Application protocols may exchange information over a QUIC connection via streams, which are ordered sequences of bytes. Two types of streams can be created: (1) bidirectional streams, which allow both endpoints to send data; and (2) unidirectional streams, which allow a single endpoint to send data. A credit-based scheme may be used to limit stream creation and to bound the amount of data that can be sent.

Figure 18:
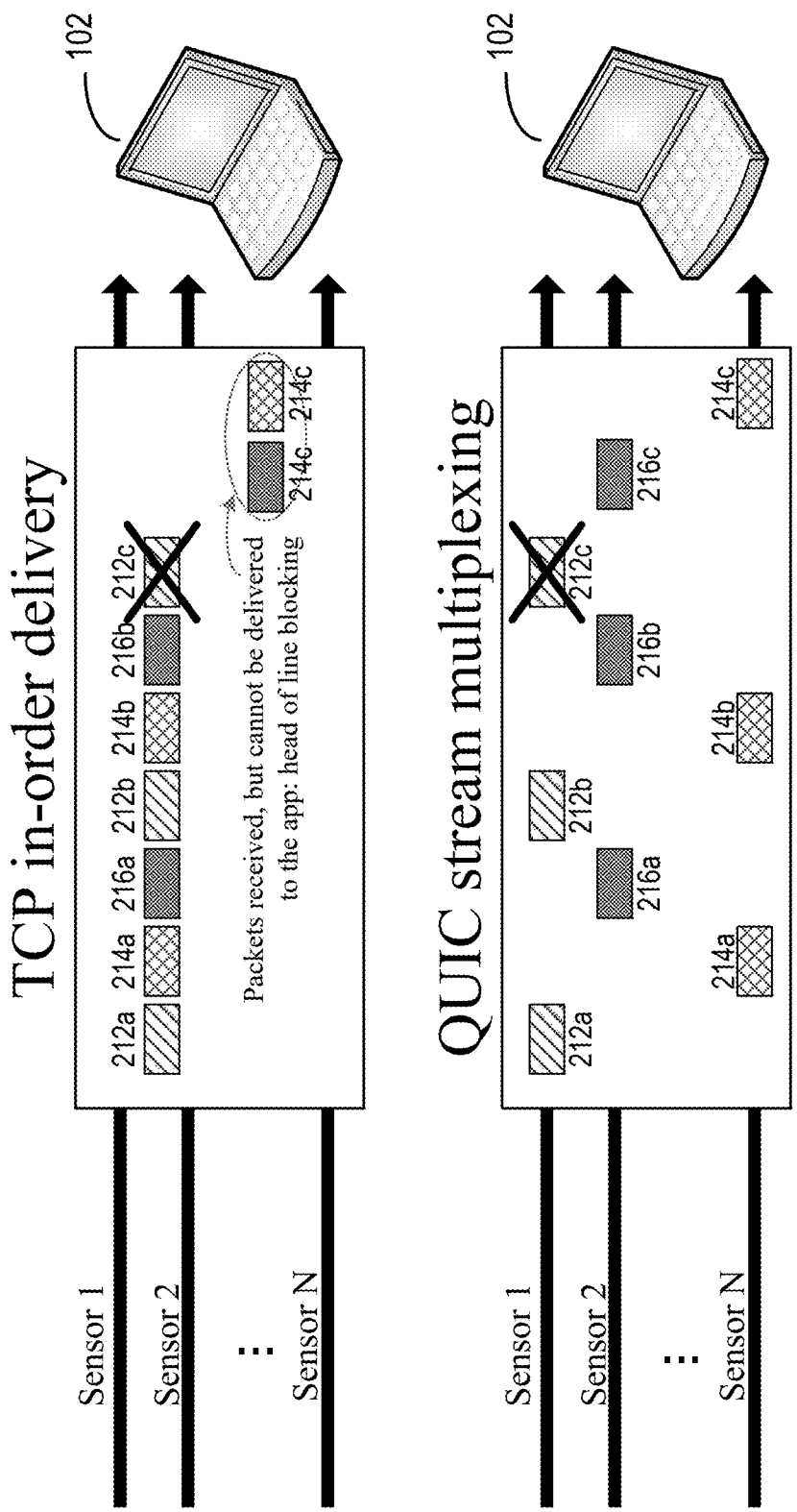
FIG. 18 illustrates example transmissions for Transmission Control Protocol (TCP) and QUIC in accordance with one or more implementations of the present disclosure.

FIG. 18 illustrates example transmissions for Transmission Control Protocol (TCP) and QUIC in accordance with one or more implementations of the present disclosure. QUIC packets may be encrypted by default and encapsulated in UDP datagrams, and the protocol may run directly on applications within the operating system kernel. As shown in FIG. 18, TCP requires in-order delivery, interpreting transmitted data as a single stream and leaving the task of separating application-level objects to the application itself. For examples, packets 212a-b, 214a-b, 216a-b may be received in order as a single stream. In-order delivery can cause issues when multiple objects are transmitted over the same connection, such as for most Web pages. An error on one element of the page can indeed block other objects for a significant time, even though they were already received and could be displayed immediately. As shown in FIG. 18, packet 212c may incur head of line blocking. QUIC may address the head of line blocking issue by defining separate streams of data within the same connection. Each stream may be treated by the QUIC protocol as a logically separate data flow with in-order reliable delivery, independent of the other streams. While the loss of packet 212c may also block packets 214c, 216c in TCP, the logical separation between the streams may allow QUIC to deliver packets 214c, 216c. QUIC may be designed for Web traffic comprising a potentially large number of logically independent objects to be delivered with the lowest possible latency. However, its features can be well-adapted to interactive multi-sensory applications in which sensing data needs to be broadcast, potentially with low delay, to preserve the user's Quality of Experience (QoE). Unlike Web traffic, these applications do not usually require data from all available sensors, as they are built to be redundant. This may make the head of line blocking issue even more pressing, since the undelivered data might not even be necessary for successful operation.

QUIC connections may not be strictly bound to a single network path. The QUIC connections may use different network paths, but may not use different network paths simultaneously. Connection migration may use connection identifiers to allow connections to transfer to a new network path. This design may also allow connections to continue after changes in network topology or address mappings, such as handover from the WiFi network to the cellular network. Since connection migration may not allow data to be sent simultaneously in both paths, MPQUIC may be needed.

A QUIC connection may carry multiple simultaneous streams. Streams may be identified within a multipath connection by a stream identifier, for example a numeric value representing a stream. A stream identifier may be a 62-bit integer (0 to $2^{62}-1$) that is unique for all streams on a connection.

Endpoints (e.g., a user device 102 and a server) may be able to deliver stream data to an application as an ordered byte stream. Delivering an ordered byte stream may require that an endpoint buffer any data that is received out of order, up to the advertised flow control limit.

An application protocol may assume that a QUIC implementation provides an interface that includes the operations described herein. An implementation designed for use with a specific application protocol may provide only those operations that are used by that protocol.

Mapping of application data to streams may be application specific and described for HTTP/3 in QUIC-HTTP. There may be a few general principles to apply when designing an application's use of streams. For example, a single stream may provide ordering. If the application requires certain data to be received in order, that data may be sent on the same stream. There is no guarantee of transmission, reception, or delivery order across streams. In another example, multiple streams may provide concurrency. Data that can be processed independently, and therefore would suffer from head-of-line blocking if forced to be received in order, may be transmitted over separate streams.

Streams may provide message orientation and allow messages to be canceled. If one message is mapped to a single stream, resetting the stream to expire an unacknowledged message may be used to emulate partial reliability for that message.

Figure 19A:
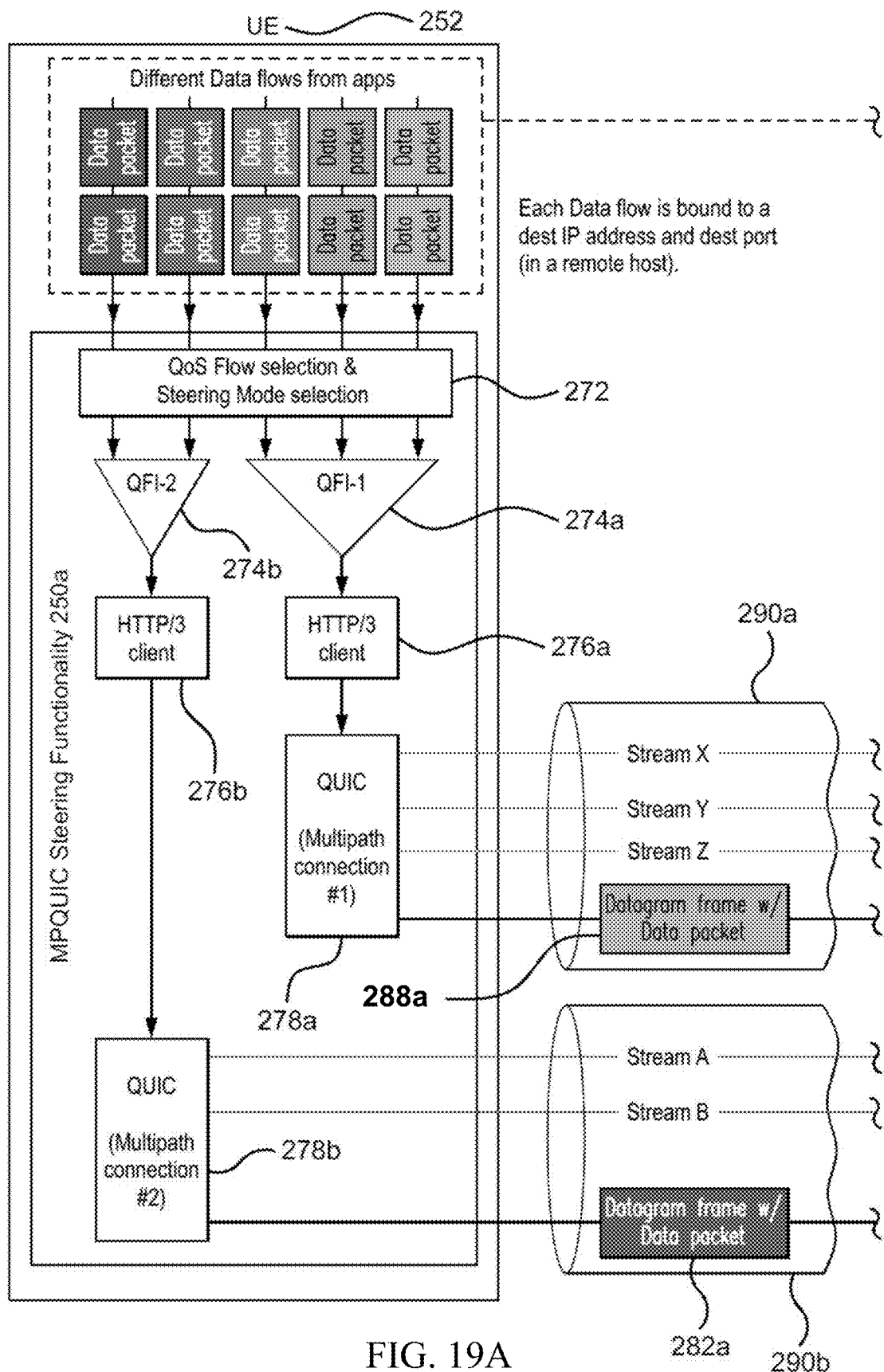
FIGS. 19A-C illustrate an example QUIC on top of Multipath QUIC (MPQUIC) in accordance with one or more implementations of the present disclosure.
Figure 19B:
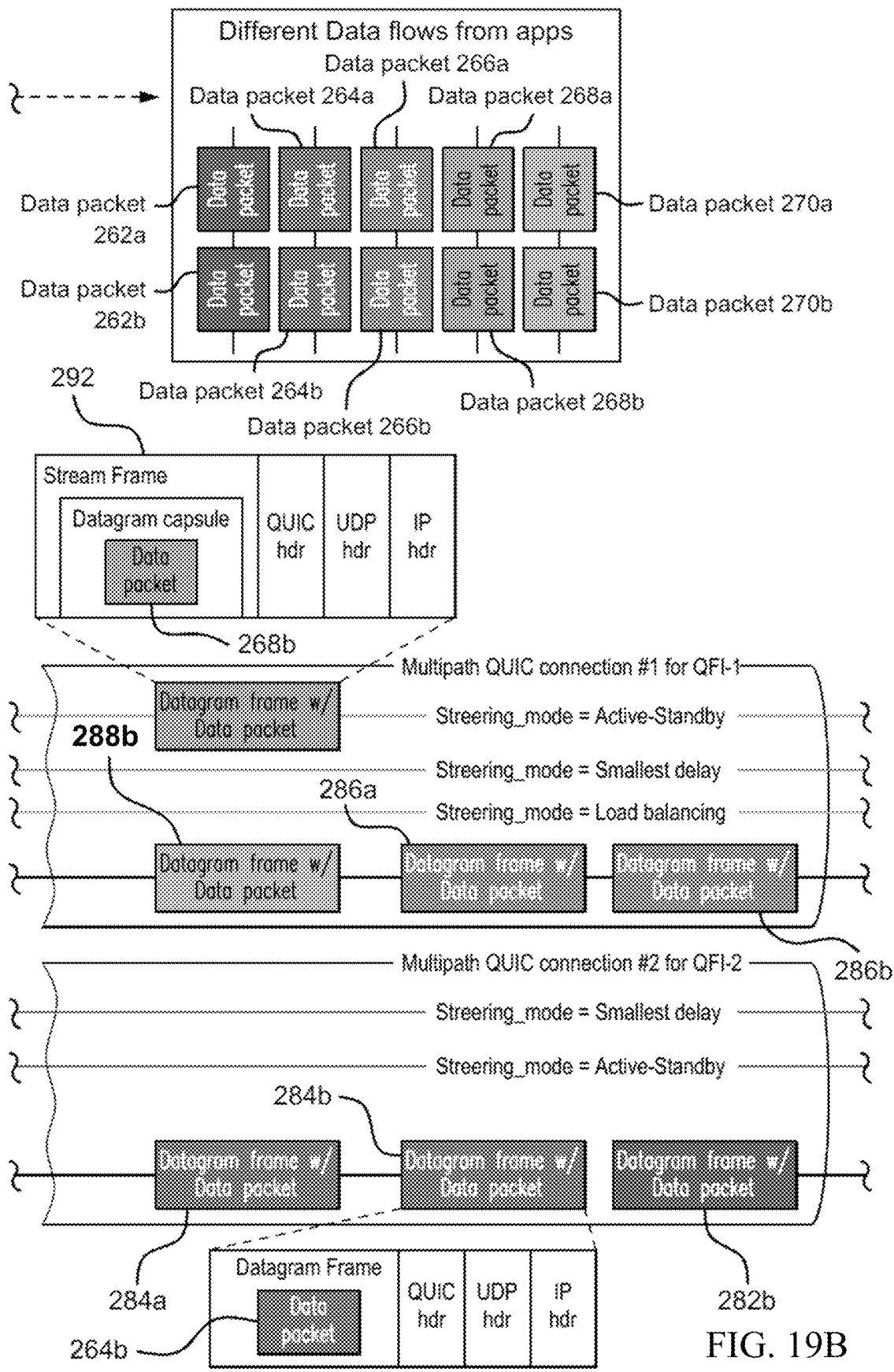
Figure 19C:
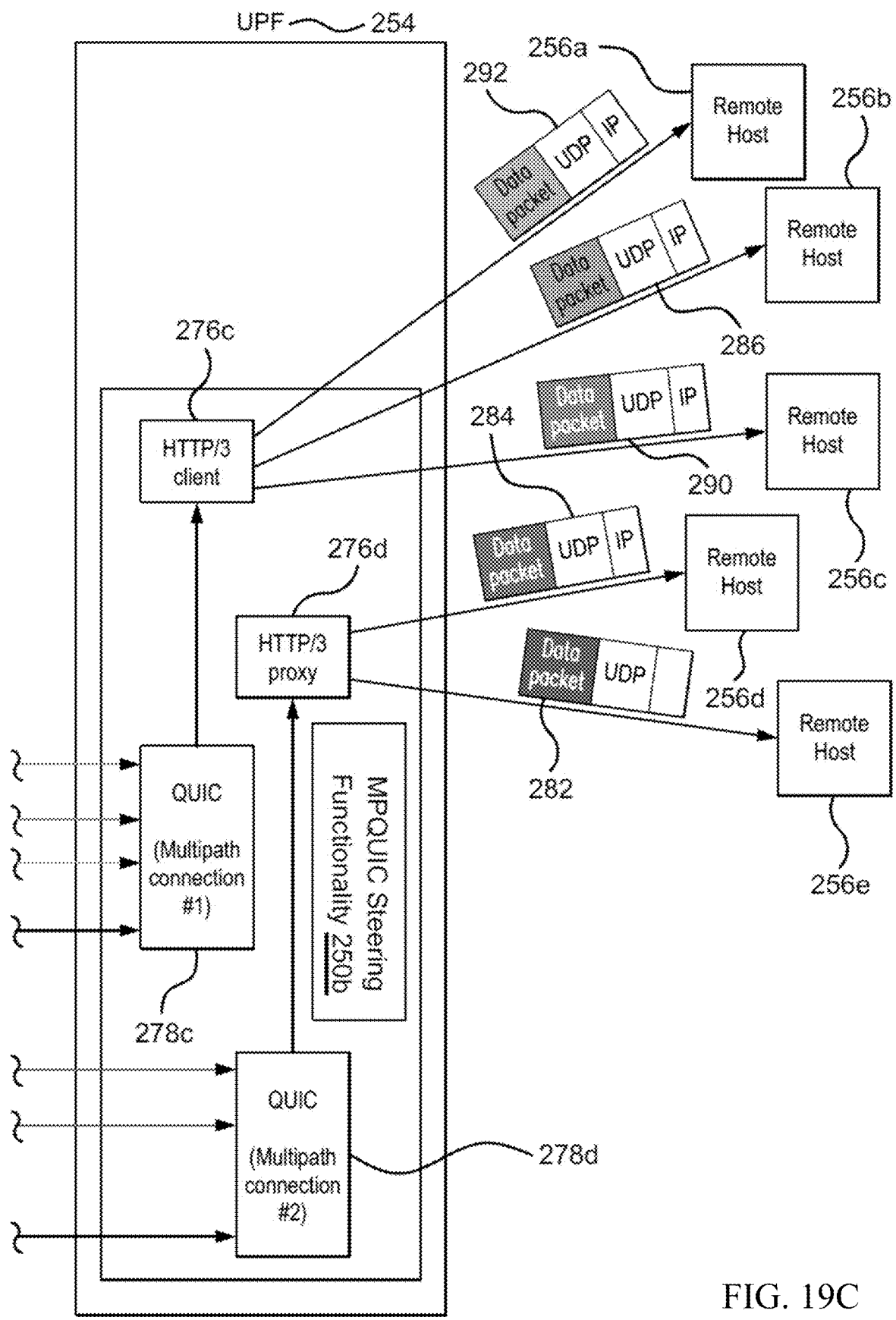
Figure 20A:
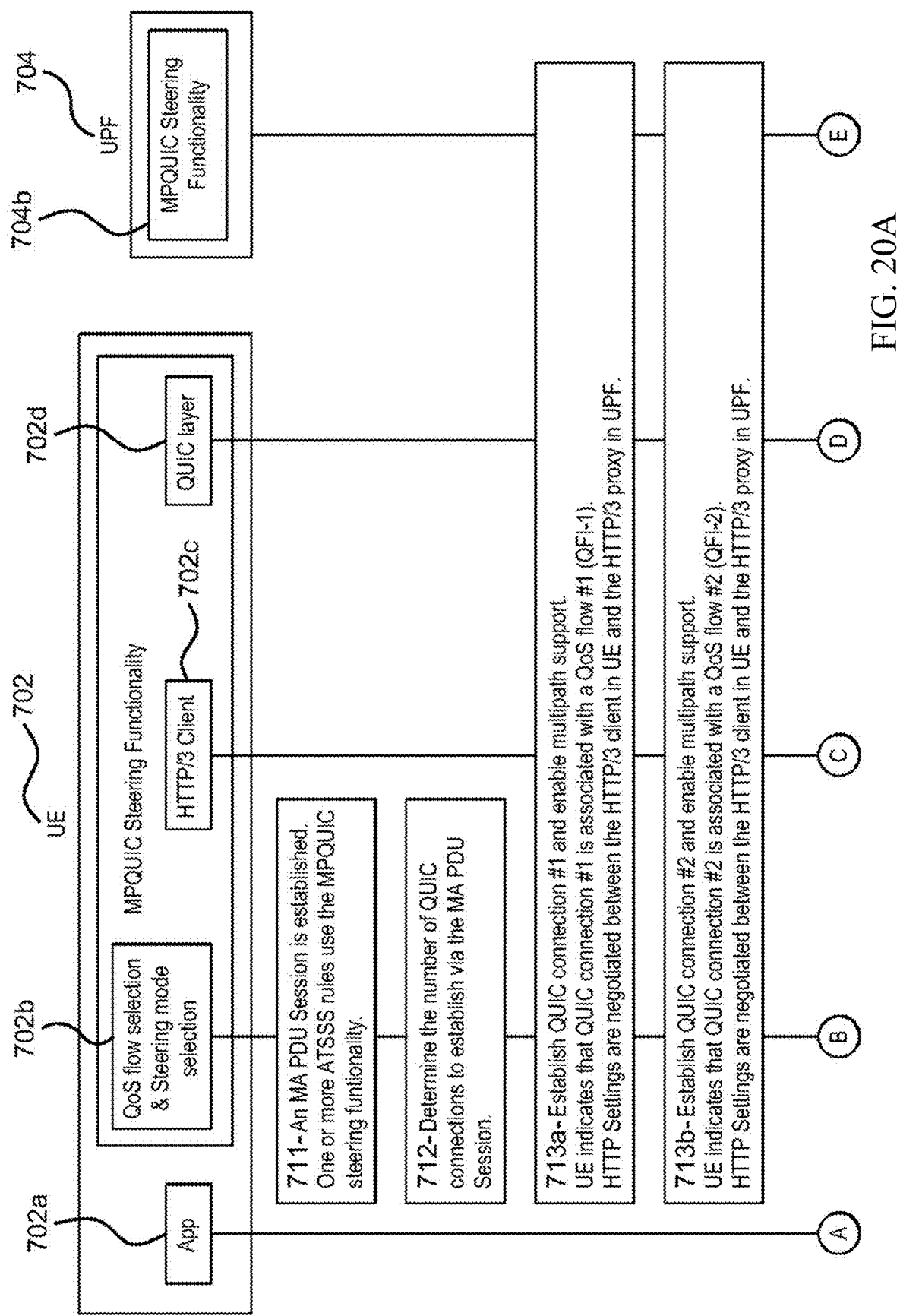
FIG. 20A-D illustrates an example procedure for data traffic exchange between a user equipment (UE) and a user plane function (UPF) using multipath QUIC (MPQUIC) in accordance with one or more implementations of the present disclosure.
Figure 20B:
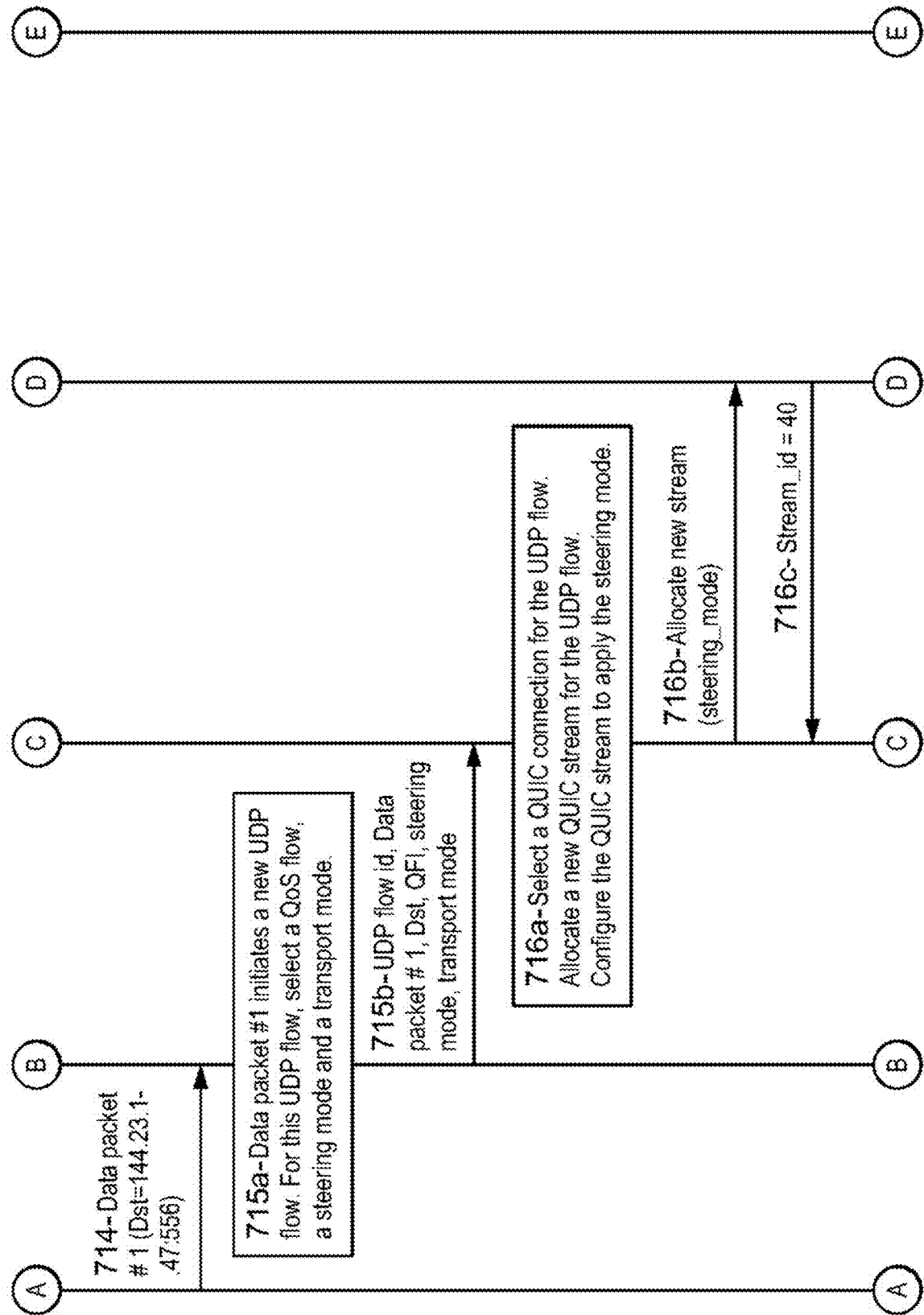
Figure 20C:
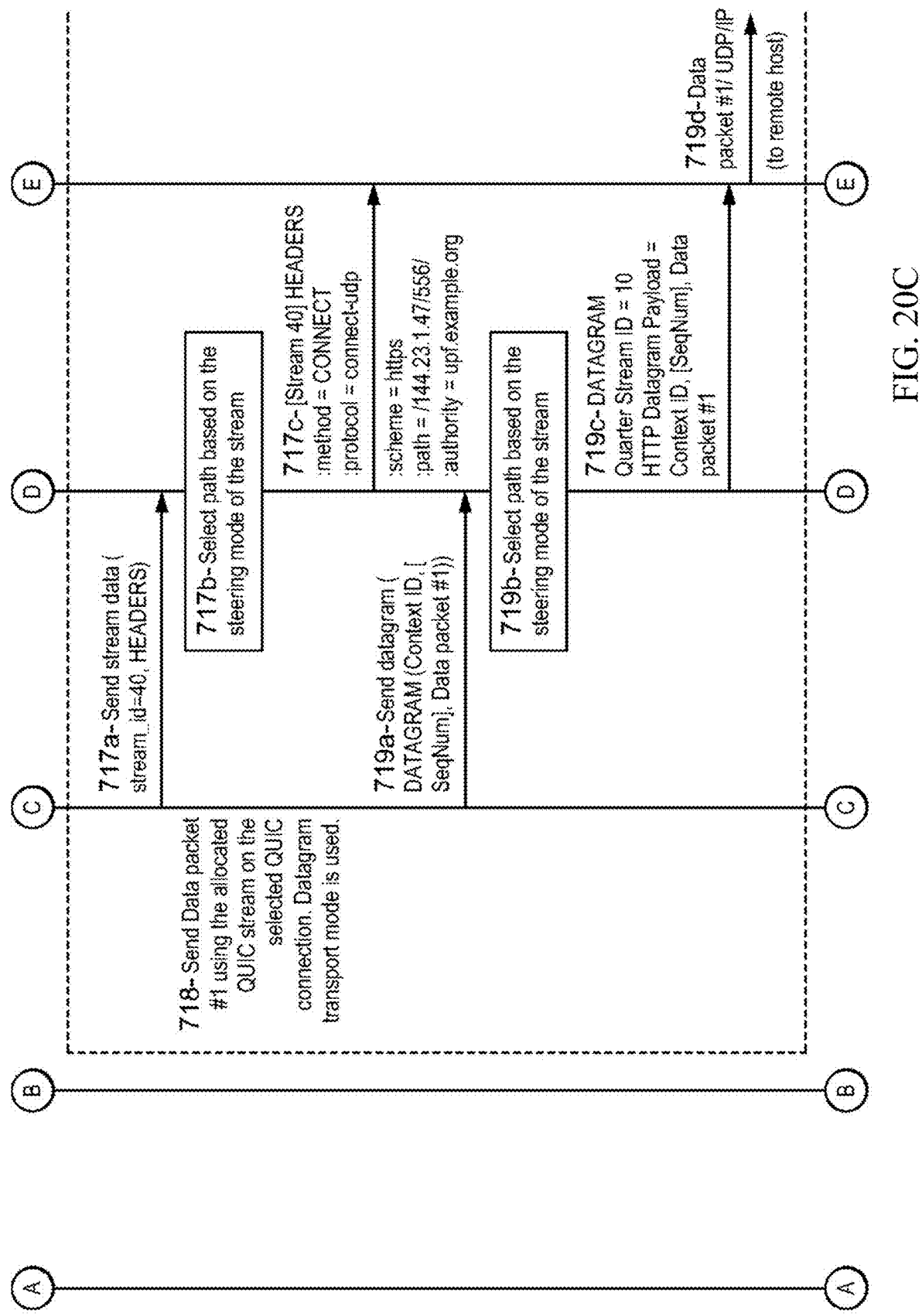
Figure 20D:
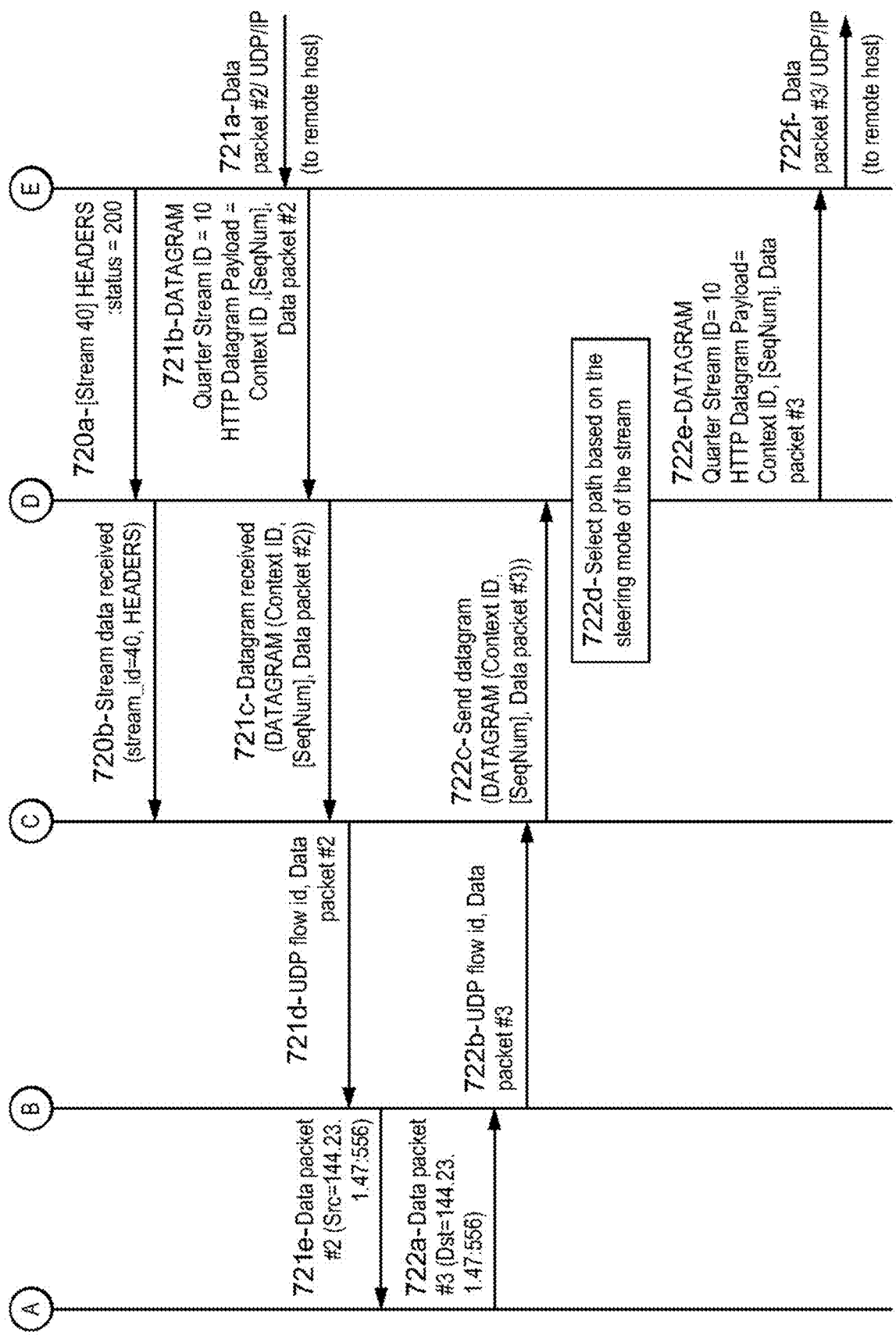

FIGS. 19A-C illustrate an example QUIC on top of Multipath QUIC (MPQUIC) in accordance with one or more implementations of the present disclosure.

As shown in FIGS. 19A-C, how the uplink traffic of various UDP/IP flows is transferred from the UE 252 (FIG. 19A) to UPF 254 (FIG. 19C) using QUIC multipath transport, and how the UPF 254 (FIG. 19C) relays this traffic to a final destination (e.g., remote host). For each UDP/IP flow, there may be an associated QUIC connection and an associated bidirectional QUIC stream, which is configured to apply a specific steering mode for the uplink traffic. For example, the UDP/IP flow for data packets 266a-b, 286a-b may be associated with the multipath QUIC connection #1 290a and with the Stream Y, which is configured to apply the smallest delay steering mode in the uplink direction.

All UDP flows shown in FIGS. 19A-C, except the UDP flow comprising data packets 268a-b, 286b, may be transferred with the datagram transport mode (e.g., mode 1 or mode 2), so the data packets 268a-b, 286b may be transferred inside QUIC DATAGRAM frames. The UDP flow comprising data packets 268a-b, 286b may be transferred with the stream transport mode, so its data packets 268a-b, 286b may be transferred inside QUIC STREAM frames.

The downlink traffic of UDP flows is transferred between the UE and UPF in a similar way.

As shown in FIGS. 19A-C, traffic (e.g., UDP traffic and/or IP traffic) may be transferred between a client (UE 316 or user device 102) and a proxy (UPF 254 or transport converter 220) using the HTTP/3 protocol (e.g., HTTP3 clients/proxies 276a-d). The HTTP/3 protocol may operate on top of the QUIC protocol, which supports simultaneous communication over multiple paths.

In transmitting a UDP flow, one or more modes may be used. For example, datagram mode 1 may encapsulate the UDP data into QUIC DATAGRAM frames. It may provide unreliable transport and add sequence numbers to the transmitted UDP data, so that the received UDP data can be re-ordered, and the duplicated UDP data can be removed. Datagram mode 2 may encapsulate the UDP data into QUIC DATAGRAM frames. It may provide unreliable transport, but does not add sequence numbers to the transmitted UDP data. Therefore, it may result in UDP data delivery with out-of-order packets and/or with duplicated packets. Stream mode may encapsulate the UDP data into QUIC STREAM frames. It may provide reliable transport (e.g., based on the existing mechanisms supported by the QUIC protocol) and support data delivery without out-of-order packets and without duplicated packets. In addition, the stream mode may provide strict reliability and in-order delivery with re-transmissions and therefore may lead to melt down phenomena when reliable (e.g., QUIC) is carried, or counteracts application decisions when UDP is selected to avoid reliability and/or in-order delivery. The datagram mode 1 and the stream mode may be useful for supporting per-packet splitting particularly when the packets of a UDP flow are split across multiple accesses, and may be received out-of-order. The Datagram mode 2 may be a simple transport mode which can be applied for applications that can tolerate packet reordering or duplicated packets.

In transmitting an IP flow, one or more modes may be used. For example, datagram mode 1 may encapsulate the IP packets into QUIC DATAGRAM frames. It may provide unreliable transport and add sequence numbers to the transmitted IP packets, so that the received IP packets can be re-ordered, and the duplicated IP packets can be removed. Datagram mode 2 may encapsulate the IP packets into QUIC DATAGRAM frames. It may provide unreliable transport but may not add sequence numbers to the transmitted IP packets. Therefore, it may result in data delivery with out-of-order packets and/or with duplicated packets. Stream mode may encapsulate the IP packets into QUIC STREAM frames. It may provide reliable transport (e.g., based on the mechanisms supported by the QUIC protocol) and support data delivery without out-of-order packets and without duplicated packets. Stream mode may provide strict reliability and in-order delivery with re-transmissions and therefore lead to melt down phenomena when reliable (e.g. QUIC) is carried, or counteracts application decisions when UDP is selected to avoid reliability and/or in-order delivery. The datagram mode 1 and the stream mode are useful for supporting per-packet splitting, particularly, when the packets of an IP flow are split across multiple accesses, and may be received out-of-order. The datagram mode 2 may be a simple transport mode which can be applied for applications that can tolerate packet reordering or duplicated packets.

In an example, after the multi-access (MA) PDU Session establishment, the UE 252 may create one or more multipath QUIC connections with the UPF 254. Each multipath QUIC connection may be associated with a QoS flow, (i.e. it carries the traffic mapped to a QoS flow).

The UE 252 may operate as a connect-udp client (or a connect-ip client) and the UPF 254 may operate as a connect-udp proxy (or a connect-ip proxy). The UE 252 may also operate as a connect-ip client and the UPF 254 may also operate as a connect-ip proxy. Therefore, the UE 252 may support an HTTP/3 client 276a-b and the UPF 254 may support an HTTP/3 proxy 276c-d, both of them operating over QUIC. In case of using IP proxying over HTTP, on each of the established QUIC connections, the UE 252 may send an extended HTTP CONNECT request to the UPF 254 indicating that IP proxying over HTTP is needed.

When the UE 252 wants to transmit the first uplink packet(s) 266a-b, 268a-b, 270a-b of a first UDP/IP flow, the UE 252 may selects which QUIC connection may be used for the uplink traffic of the UDP/IP flow based on the QoS flow associated with the UDP/IP flow. The UE 252 may create one or more unidirectional/bidirectional QUIC streams on the selected QUIC connection. The UE 252 may configure the one or more QUIC streams to apply one or more steering modes (i.e. the steering mode that is to be used for the uplink traffic of the UDP/IP flow based on the ATSSS rules). In case of UDP traffic, the UE 252 may send to the UPF 254, via the QUIC stream, an extended HTTP CONNECT request including path information that identifies a destination address and port for the UDP flow (i.e., identifies the remote host where the UDP flow needs to be forwarded to) and forward to the UPF 254 the uplink packets of the UDP flow using multipath QUIC transport. In case of IP traffic, the UE 252 may forward to the UPF 254 the uplink packets of the IP flow using multipath QUIC transport.

When the UE 252 wants to transmit the second uplink packet(s) 262a-b, 264a-b of a second UDP/IP flow, the UE 252 may perform the same/similar steps as described above for the second uplink packet(s) 262a-b, 264a-b.

When the UPF 254 wants to transmit a downlink packet of a UDP/IP flow, the UPF 254 may selects which QUIC connection will be used for the downlink traffic of the UDP/IP flow based on the QoS flow associated with the UDP/IP flow. This QUIC connection may be the same as the one selected by the UE 252 for the UDP/IP flow, assuming the QoS flow in UL and DL directions is the same. The UE 254 may select a unidirectional/bidirectional QUIC stream on the selected QUIC connection. This QUIC stream may be the same as the one created by the UE 252 for the UDP/IP flow. The UPF 254 may configure the QUIC stream to apply a steering mode (i.e., the steering mode that needs to be used for the downlink traffic of the UDP/IP flow based on the N4 rules and forward to the UE 254 the downlink packets of the UDP flow using multipath QUIC transport.

As shown in FIGS. 19A-C, multipath QUIC streams 290a, 290b may be established by the UE 252 to enable transmission of data packets 262a-b, 264a-b, 266a-b, 268a-b, 270a-b of the UDP/IP flow. The UE 252 may configure the multipath QUIC streams 290a, 290b to send uplink traffic with a steering mode determined based on the ATSSS rules in the UE 252 (e.g., uplink steering mode). Although it is not shown in FIGS. 19A-C, the UPF 254 may configure these streams to send downlink traffic with a steering mode determined based on the N4 rules in the UPF 254 (e.g., downlink steering mode). The data packets 262a-b, 264a-b, 266a-b, 268a-b, 270a-b of the UDP/IP flow may be transmitted in datagram mode (mode 1 or mode 2).

Each of the data packets 262a-b, 264a-b, 266a-b, 268a-b, 270a-b may be encapsulated in HTTP datagrams and QUIC DATAGRAM frames, each one carrying header information that associates it with each of the established multipath QUIC streams. For example, a stream frame 292 with a data packet 268a may comprise an IP header, a UDP header, a QUIC header, and datagram capsule including the data packet 268a. The IP header may include a source IP address set to the UE's 252 link-specific multipath QUIC address, a destination IP address set to the UPF's 254 address, and a destination UPF port set to the UPF's 254 port. Similarly, each stream frame 282a-b, 284a-b, 286a-b, 288a-b, with respective data packet 262a-b, 264a-b, 268a-b, 270a-b may comprise an IP header, a UDP header, a QUIC header, and datagram capsule including the data packet 262a-b, 264a-b, 268a-b, 270a-b.

The data packets 262a-b, 264a-b, 266a-b, 268a-b, 270a-b of the UDP/IP flow may be transmitted in stream mode (instead of datagram mode). For example, the data packets 262a-b, 264a-b, 266a-b, 268a-b, 270a-b may be transmitted directly over the multipath streams. The data packets 262a-b, 264a-b, 266a-b, 268a-b, 270a-b of the UDP/IP flow may be encapsulated in DATAGRAM capsules and QUIC STREAM frames.

As illustrated in FIGS. 19A and 19C, components of the MPQUIC steering functionality 250a-b may be used to support data transmission in the uplink and downlink direction (not shown for the downlink direction) respectively. The MPQUIC steering functionality 250a-b may comprise QoS flow selection & steering mode selection components 272, HTTP/3 layers 276a-d, and QUIC layers 278a-b.

The QoS flow selection & steering mode selection 272 in the UE 252 may initiate the establishment of one or more QUIC connections 290a-b, after the establishment of the MA PDU session and, for each uplink UDP/IP flow. It may select one or more QoS flows (based on the QoS rules), one or more steering modes (based on the ATSSS rules) and one or more transport modes for one or more QUIC connections 290a-b. This component in the UPF 254 may select, for each downlink UDP/IP flow, a QoS flow (e.g., based on the N4 rules), a steering mode (e.g., based on the N4 rules) and a transport mode. In the UE 252, this component may be used in the uplink direction, while, in the UPF 254, this component may be used in the downlink direction.

The HTTP/3 layers 276a-d may support the HTTP/3 protocol such as UDP proxying over HTTP, HTTP datagrams and extended CONNECT. The HTTP/3 layers 276a-d may select one or more QUIC connections to be used for each UDP/IP flow and allocate one or more new QUIC stream on the one or more QUIC connections that are associated with the UDP/IP flow. It may also configure the one or more QUIC streams to apply a specific steering mode.

In the UE 252, the HTTP/3 layers 276a-d may implement HTTP/3 clients 276a-b, while, in the UPF 254, it may implement an HTTP/3 proxies 276c-d.

The QUIC layers 278a-d may support the QUIC protocol. For example, the QUIC layers 278a-d may support unreliable datagram transport with QUIC and/or QUIC connections using multiple paths simultaneously.

As shown in FIG. 19C, the UPF 254 may relay the UDP/IP traffics to the final destinations such as remote hosts 256a-e. For example, the HTTP3 proxy 276c may relay stream frames 292, 286, 288 to remote hosts 256a, 256b, 256c, respectively. Similarly, the HTTP3 proxy 276d may relay stream frames 284, 282 to remote hosts 256d, 256e, respectively. Each stream frame 282, 284, 286, 288, 292 may comprise source IP addresses set to the UE's 252 MA PDU session address, destination addresses set to the remote hosts' addresses, and destination UDP ports set to the remote hosts' ports.

A communication path may be defined by the individual hops made along the path between components, instances, functions, servers, and interfaces. A path may be unique in that the set of hops are unique. For example, a path comprising hops between A, B, and C may be considered unique from a path that consists of A and B or a path that comprises A, B, and D. A network may be defined as a set of components, instances, functions, servers, interfaces, other implements and combinations thereof that are configured to communicate or have access to communicate with one another. The network may comprise those components, instances, functions, servers, interfaces, other implements and combinations that are managed by a network provider and configured to communicate. A network may be a logical grouping of the set (e.g., subnet). A network may be virtually grouped logically (e.g., virtual private network) or contain portions that are virtually grouped logically.

The communication paths may include wired communication technologies, wireless communication technologies, or combinations thereof. Wireless communication technologies may include various 3GPP standards (e.g., 4G LTE, 5G NR, etc.) and Institute of Electrical and Electronics Engineers (IEEE) standards (e.g., 802.11g, 802.11n, 802.11ac, 802.11ax, 802.11be, etc.). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

The network such as NR may include an access and mobility function (AMF), session management function (SMF), policy control function (PCF), other functions or instances, or combinations thereof may perform some or all of the steps described herein. The computing device 122 may be configured to perform all or some of the steps described.

The computing device 122 may include instructions to serve as a proxy or proxy server (e.g., instructions for transport converter 220) for the plurality of paths formed between the transport converter 220 and the user device 102. For example, one or more application server 230 may be configured to send and receive communications with the computing device 122 based on communications from the user device 102 over one or more paths associated with network. The application server 230 may be stored as instructions on devices similar to the computing device 122 or the user device 102.

Figure 3:
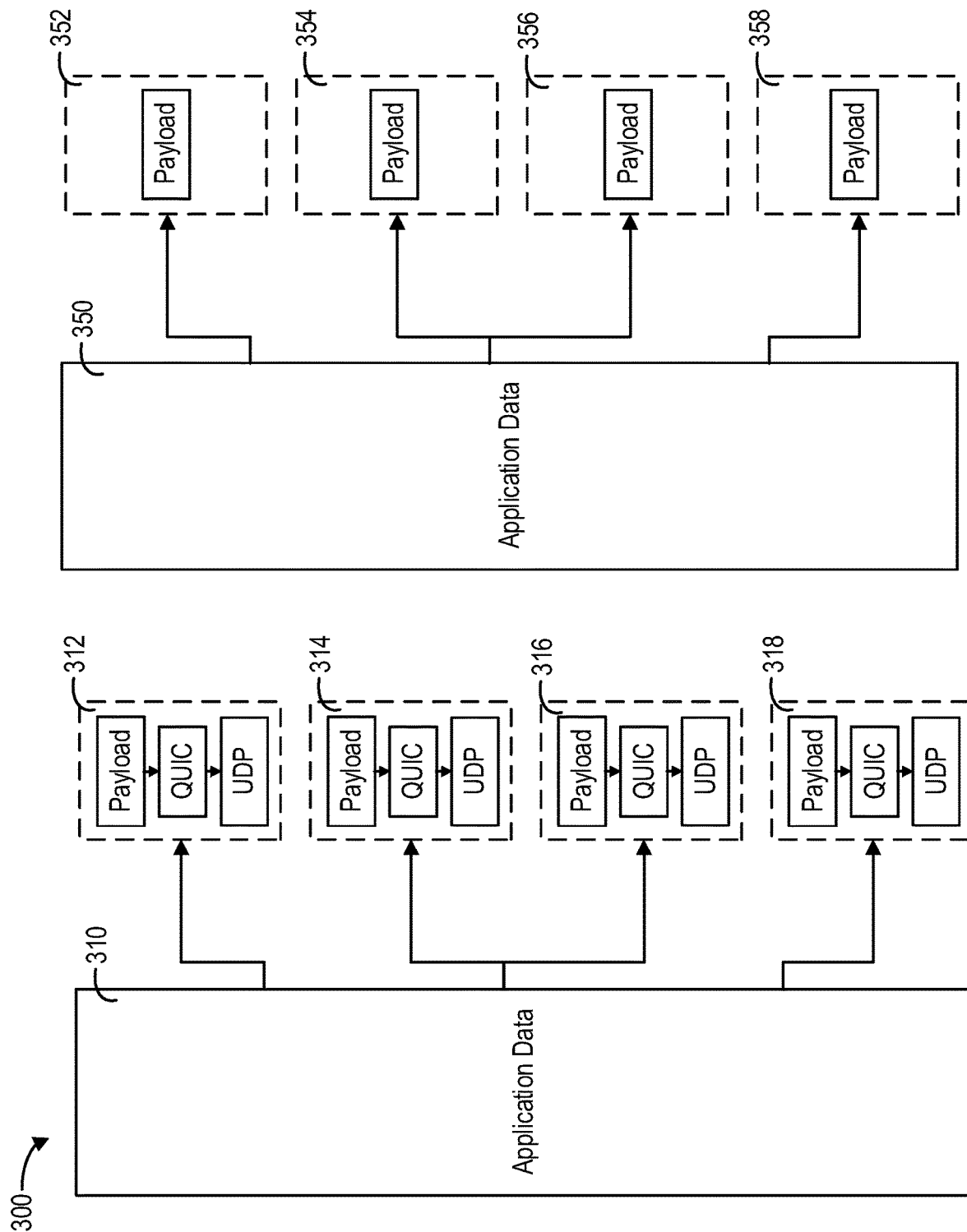
FIG. 3 illustrates example packets in accordance with one or more implementations of the present disclosure.

In FIG. 3, example packets 300 in accordance with one or more implementations of the present disclosure is shown.

An application may be located in non-transitory memory (e.g., computer-readable medium 104) allocated by the user device 102 or application server 230 for a user application or an operating system or kernel application. The application may provide application data 310, 350. For example, the application data 310,350 may be intended to for an endpoint (e.g., user device 102, application server 230). Application data 310, 350 may be divided into payloads and used to define packets 312, 314, 316, 318, 352, 354, 356, 358. The packets 312, 314, 316, 318, 352, 354, 356, 358 may be defined by the application before being repackaged into multipath packets. For example, the packets 312, 314, 316, 318 may be single path QUIC packets. Packets 352, 354, 356, 358 may be standard UDP packets without a QUIC payload. An application may be configured to transmit data to the user device 102 or application server 230 based on a protocol (e.g., QUIC) and other applications may be configured to transmit data to user device 102 or application server 230 based on another protocol (e.g., UDP). The application may divide the application data 310, 350 into packets 312, 314, 316, 318 based on UDP, QUIC, and the payload. The same application or another application may be configured to transmit data to the user device 102 or application server 230 without an encapsulation. Encapsulation may be performed by other protocols further along the communications pipeline.

Figure 4:
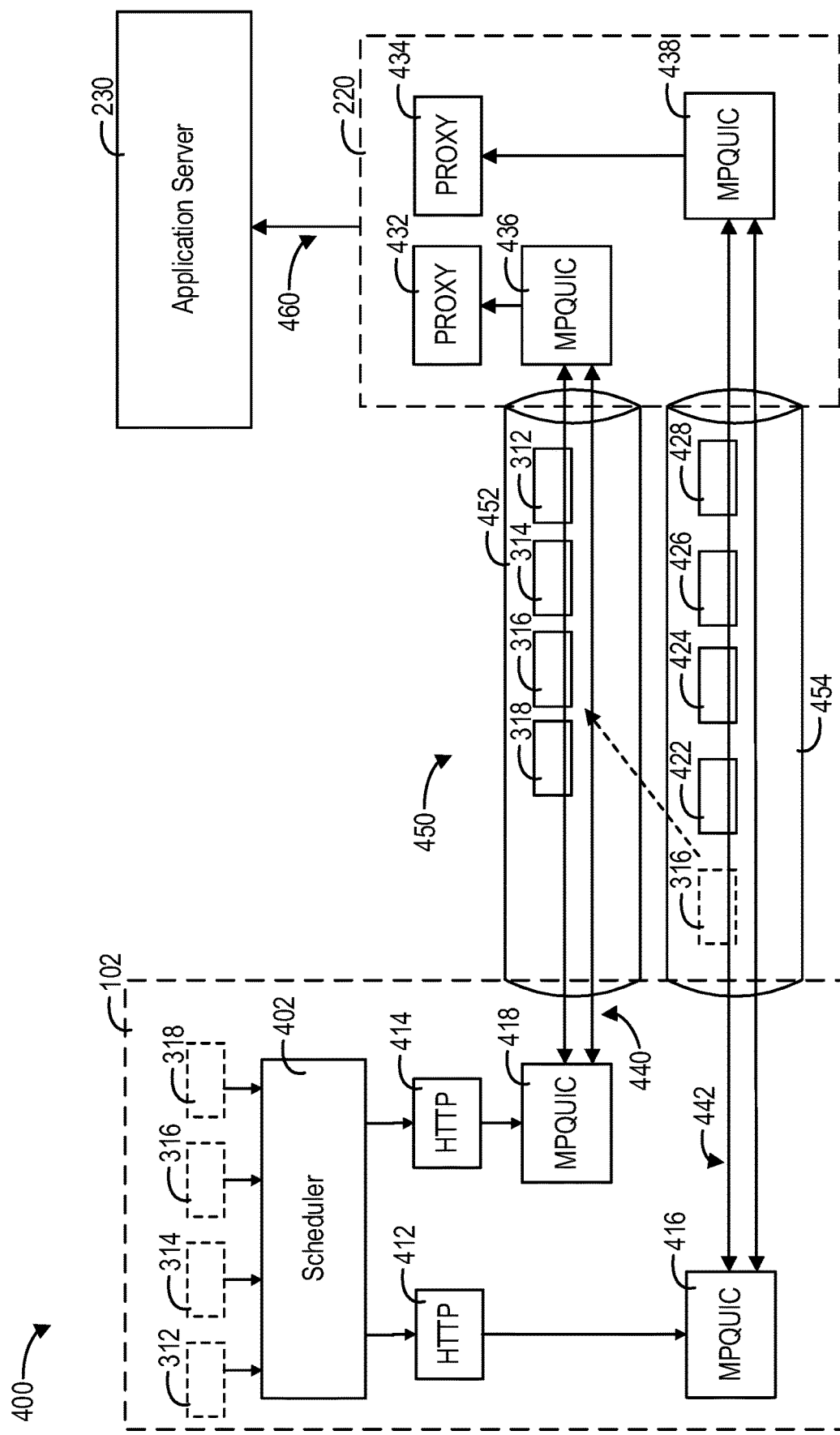
FIG. 4 illustrates a communication link in accordance with one or more implementations of the present disclosure.

In FIG. 4, a communication link 400 in accordance with one or more implementations of the present disclosure is shown. The communication link 400 may include one or more nodes associated for establishing a connection between the transport converter 220, the user device 102, and the application server 230. The user device 102 may include instructions for executing a client application. The user device 102 may further include instructions for a multipath connection (e.g., connection 450 shown with two paths 452, 454). A multipath connection 450 may be based on multipath Transmission Control Protocol (MPTCP), multipath QUIC (MPQUIC), multipath Datagram Congestion Control Protocol (MPDCCP), another multipath protocol, or a combination thereof. An identifier may be assigned to designate the multipath connection. The multipath connection may include two paths 452, 454. The paths may be identified by or based on a connection identifier (e.g., connection identifier 804 of FIG. 8). The connection identifier 804 may be sent with each of the packets (e.g., packets 312, 314, 316, 318). For example, the packets 312, 314, 316, 318 may be identified by a packet number (e.g., monotonically incremented number) or sequence number and the connection identifier. The connection identifier may be selected by the endpoint (e.g., user device 102, transport converter 220, and/or application server 230) to identify the connection.

Packets (e.g., packets 312, 314, 316, 318) may be provided to scheduler 402 of the user device 102. For example, the scheduler 402 may determine which path (e.g., path 452, 454) to send each individual packet on. For example, the scheduler 402 may receive or determine an indication based on one or more of the paths 452, 454. The indication may be indicative of whether to use path 452 or path 454 for transmission of the packet. The scheduler 402 may take into account quality of service rules, policies, steering rules, and other indications of a preference. For example, the preference may require that a packet (e.g., packet 312) be sent down a path having the lowest round-trip time (RTT), latency, propagation delay, and/or throughput.

The packets 312, 314, 316, 318 may be part of an ordered stream (e.g., streams 440, 442) of data related to the application data 310. For instance, the packets 312, 314, 316, 318 may have monotonically increasing packet numbers to indicate how the packets should be recombined. As shown, the scheduler 402 may determine that one or more of the packets 312, 314, 316, 318 of the stream should travel down different paths (e.g., paths 452, 454). The scheduler 402 may identify the path for transmission (e.g., path 452, 454) based on the preference even though the selected path may encounter unexpected delays in data transmission. For example, the packets 422, 424, 426, 428 may delay or impede transmission of packet 316 (as shown). This may be unexpected based on the information available to scheduler 402 when the path determination is made. For example, the packets 422, 424, 426, 428 may be sent down path 454 by another endpoint or node. As such, the scheduler 402 may be configured to override preferences for path determinations when packets 312, 314, 316, 318 are part of the same stream. For example, the scheduler may include a buffer that tracks the paths packets of a stream are sent on. That is, the buffer may retain stream identifiers to determine which packets (e.g., packets 312, 314, 316, 318) are part of the same stream and the path that those packets were sent in. For example, the storage may include a repository (e.g., a dictionary or lookup list) of streams identifiers along with path identifiers (e.g., connection identifiers, packet numbers, or combinations thereof). In such a way, the scheduler 402 may be configured to override preference or quality of service steering to ensure that streams (or other ordered sequences of packets) are maintained on the same path.

Path conditions may warrant sending packets of the same stream on separate paths (e.g., paths 452, 454). For example, the paths 452, 454 may have disparate indications that satisfy a threshold (e.g., a difference between a latency of path 452 and path 454 satisfies a predetermined threshold). As such, there may be deadband where the scheduler 402 overrides the preferences of the policy or rules associated with QoS or steering and sends packets of the same stream on the same path, and once the deadband is exceeded, by either path and indicated by the difference, the scheduler 402 sends the packet down the preferred path.

Packets (e.g., packets 312, 314, 316, 318) may be sent by hypertext transport (HTTP) clients (e.g., HTTP client 412, 414) with the connection formed over HTTP (e.g., HTTP/3). The packets may then be encapsulated by a multipath protocol (e.g., MPQUIC) connections 416, 418. The packets may traverse the paths 452, 454 according to stream identifiers and streams (e.g., streams 440, 442), connection identifiers, and packet numbers.

The transport converter 220 may be configured to receive the packets (e.g., packets 312, 314, 316, 318). The transport converter 220 may unwrap the multipath packets (e.g., packets 312, 314, 316, 318) based on the multipath protocol connections 436, 438. The HTTP proxies 432, 434 may be configured to maintain the HTTP connection with the user device 102. The transport converter 220 may be configured to forward the received packets, or portions thereof to the application server 230 over connection 460. The transport converter 220 may forward the receive packets, or portions thereof, to the application server 230 using a protocol (e.g., QUIC).

Figure 5:
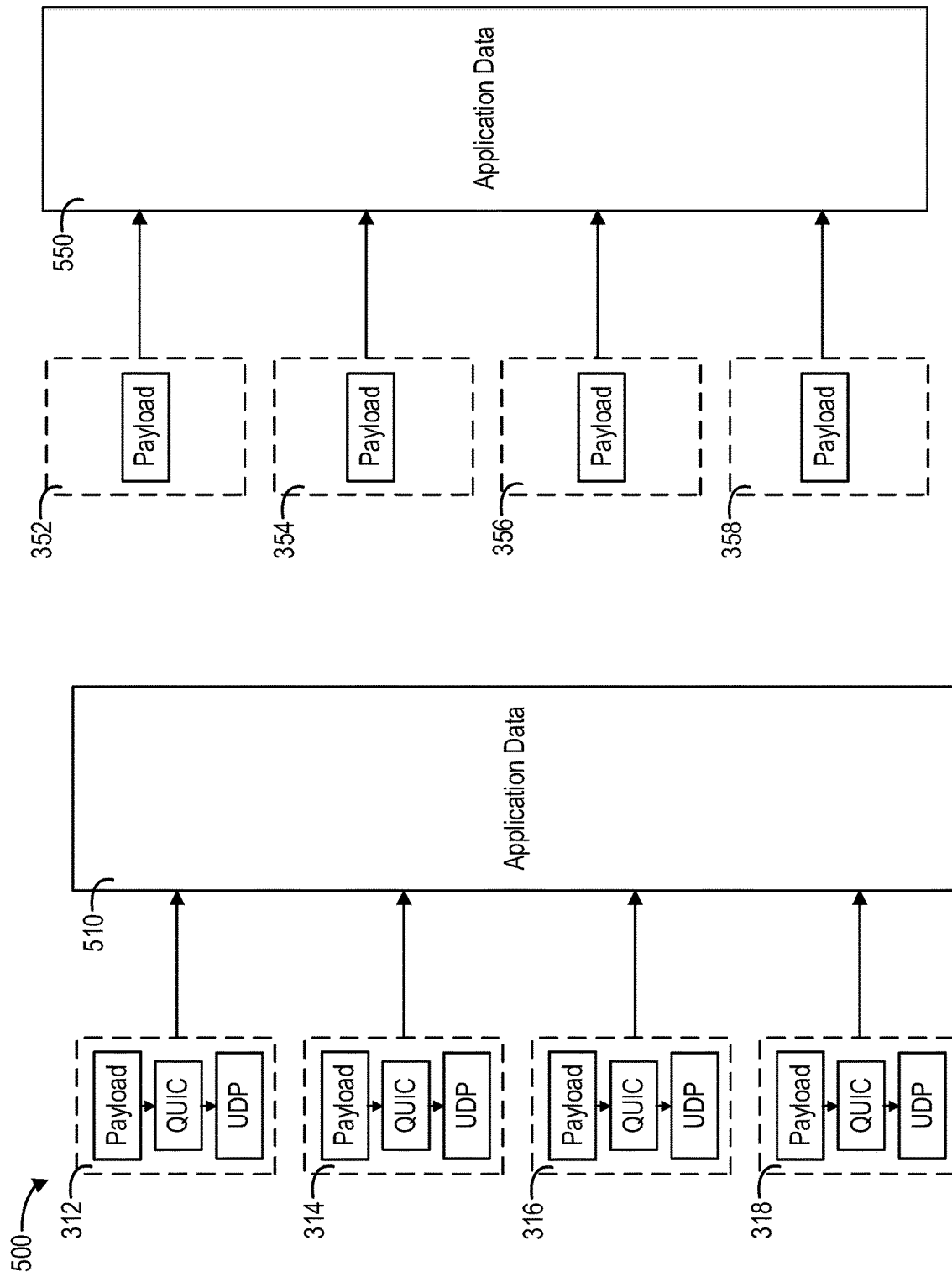
FIG. 5 illustrates example packets in accordance with one or more implementations of the present disclosure.

In FIG. 5, example packets 500 in accordance with one or more implementations of the present disclosure are shown. For example, after transmission, the packets 312, 314, 316, 318 may be combined into application data 510 based on the payloads contained therein and the packet numbers associated with the particular protocol used to forward the packets (e.g., QUIC). The application data 510 may reach the application server 230 with the UDP header information and IP header information provided therein. Other application data (e.g., application data 550) may be combined according to packets 352, 354, 356, 358, which may have been sent only based on UDP. As such, data may be combined based on the data sequence mapping or packet number to establish ordered data without a loss of integrity. Responses may be disassembled into portions and retransmitted over the respective paths, or the same path, to improve throughput and speed in a similar fashion. All of the descriptions provided herein may be performed by the user device 102, transport converter, 220, application server 230, another implement, or combinations thereof to support unidirectional or bidirection al information transfer with the techniques and improvements disclosed herein.

Figure 6:
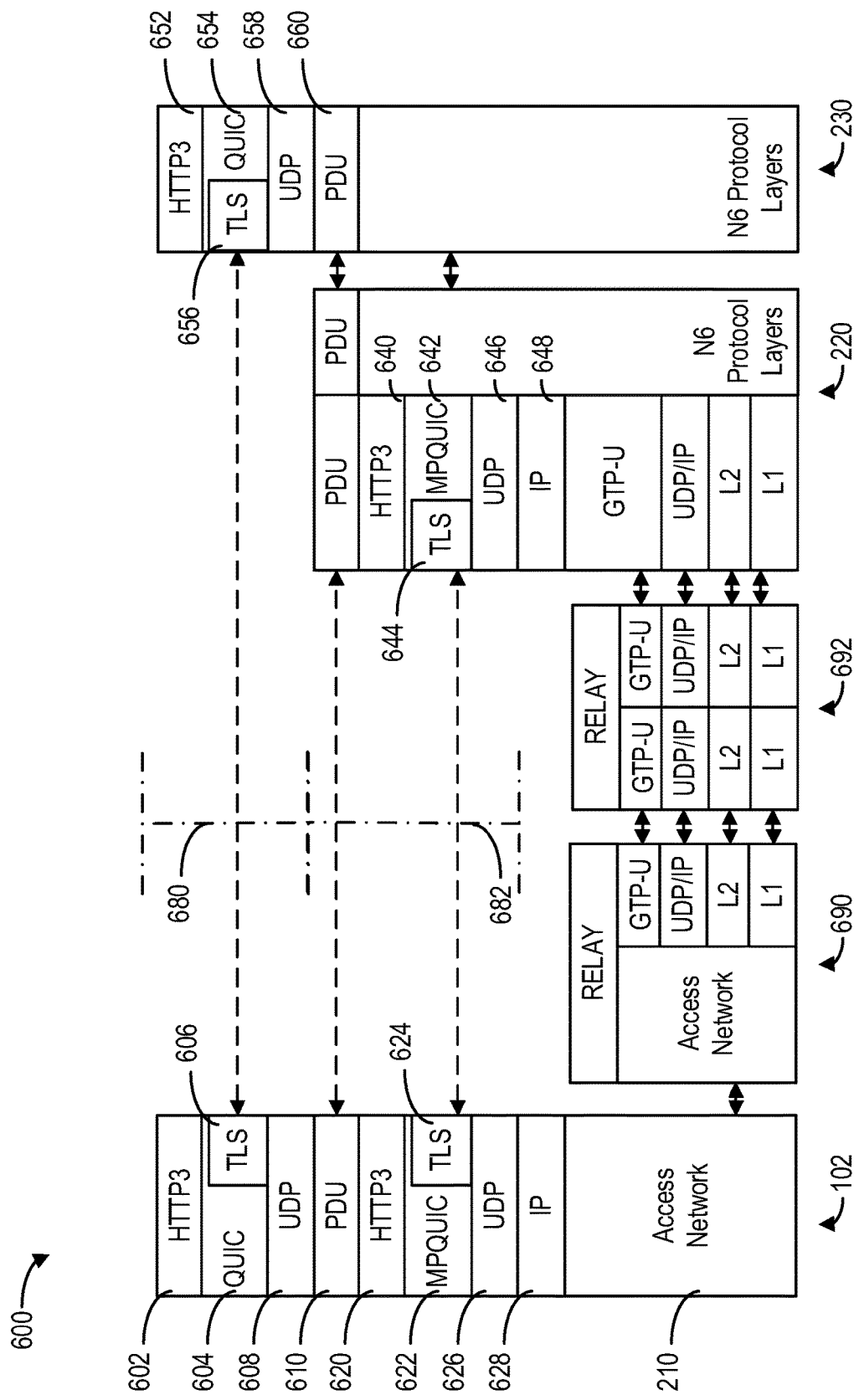
FIG. 6 illustrates an example protocol stack in accordance with one or more implementations of the present disclosure.

In FIG. 6, an example protocol stack 600 in accordance with one or more implementations of the present disclosure is shown. The protocol stack is drawn across the user device 102, the transport converter 220, the application server 230, and two relays 690, 692 to indicate corresponding layers. The relays 690, 692 may be part of the access network or other networks, along with the access network 210. For example, relay 692 may be a user plane function associated with a 5G network architecture connected with a user plane function of another 5G network configured to be the session anchor, which may further comprise processor-executable instructions for the transport converter 220 stored on computing device 122.

The protocol stack of the user device 102 may include layers, depicted, for encapsulating data for transmission to the transport converter 220 and the application server 230. For example, the access network 210 may provide baseline connectivity (e.g., connections mediums, link layer support) between the user device 102 and the network. For example, the user device 102 may access the network over a radio or wired mediums. The user device 102 may include an IP layer 628 of the user device 102 with an IP header for directing the packet to the transport converter 220. The IP address of IP layer 628 of the user device 102 may direct messages to the IP layer 648 of the transport converter 220 (e.g., comprise an IP address of the transport converter 220 or accessible to the transport converter 220).

The UDP layer 626 of the user device 102 may include port numbers for the source and destination (e.g., user device 102, transport converter 220), checksum, and length information for the packet. A corresponding UDP layer 646 may be implemented on the transport converter 220. The MPQUIC layer 622 of the user device 102 may be part of a payload of the UDP layer 626 of the user device 102. For example, the UDP payload may include the MPQUIC header, which includes the connection identifier, and packet number. The MPQUIC layer 622 of the user device 102 may further include the stream data and the stream identifier. The UDP layer 626 of the user device 102 may be unprotected. For example, the UDP layer 626 may be transmitted in clear text along with the IP layer 628. The UDP payload, or portion thereof, may be encrypted. For example, the transport layer security (TLS) layer 624 may be implemented to encrypt the payload, which includes the connection identifier, the packet number, and the stream identifier. As discussed herein, the stream may be restricted to one path based on the connection identifier, packet identifier, stream identifier, or combinations thereof. For example, the user device 102 may establish an encrypted tunnel with the transport converter 220 with a handshake and exchanged keys (e.g., Diffie-Hellman) or pre-shared keys. A corresponding MPQUIC layer 642 of the transport converter 220 and the TLS layer 644 of the transport converter 220 may provide reciprocal information and unpack the related information from MPQUIC layer 622 of the user device 102. The MPQUIC layer 622 may be formed based on portions of the application data 310, 350 encapsulated in a QUIC packet or a UDP packet as indicated in FIG. 3.

The payload of the MPQUIC layer 622 may include a HTTP datagram in HTTP layer 620. For example, the HTTP datagram may include stream identifiers and context identifiers with the payload (e.g., "Quarter Stream ID=11; Context ID=0; Payload=Encapsulated QUIC initial"). As such, the HTTP datagram may form the HTTP client and proxy relationship between the user device 102 and the transport converter 220. The payload may further include the PDU layer 610. The PDU layer may include the QoS information. For example, the QoS flow indication (QFI) and other PDU session information (Policy information, GPRS Tunneling information, indications of round-trip time, timestamps, latency, delay information, QFI sequence numbers, etc.). A corresponding HTTP layer 640 of the transport converter 220 may provide the reciprocal information and unpack the related information received from HTTP layer 620. It should be appreciated that the HTTP clients 412, 414 may perform to encapsulate such data and decapsulate the packet information along with HTTP proxies 432, 434. The MPQUIC connections 416, 418, 436, 438 may be formed based on the MPQUIC layers 622, 642 or QUIC layers 604, 654 and corresponding TLS layers 606, 624, 644, 656.

The payload, for example, the payload of PDU layer 610 of user device 302 and corresponding PDU layer of transport converter 220, may include another UDP layer 608 defined by the application. For example, the UDP layer 608 may be based on the application data 310, or application data 350, and one or more of packets 312, 314, 316, 318. The UDP layer 608 of the user device 102 may further encapsulate a QUIC layer 604 of the user device 102 defined by the application (e.g., a user application). The QUIC layer 604 of the user device 102 may include an encrypted payload based on a TLS layer 606 defined by the application. For example, the QUIC layer 604 of the user device 102 may include an encrypted payload that is only accessible by the application server 230 after the packet is forwarded from the transport converter 220 to the application server 230. The application may further generate a client-server relationship with the application server 230 based on the HTTP layer 602. As a non-limiting example, the layers 680 may be related to an address space of the user device 102 related to user applications. The layers 682 may be related to an address space of the user device 102 related to the operating system or kernel. A corresponding PDU layer 660 of the application server 230 may receive packets transmitted according to the PDU session by the PDU layer 610. The Application server 230 may include a corresponding UDP layer 658, QUIC layer 654, TLS layer 656, and HTTP layer 652.

Figure 7:
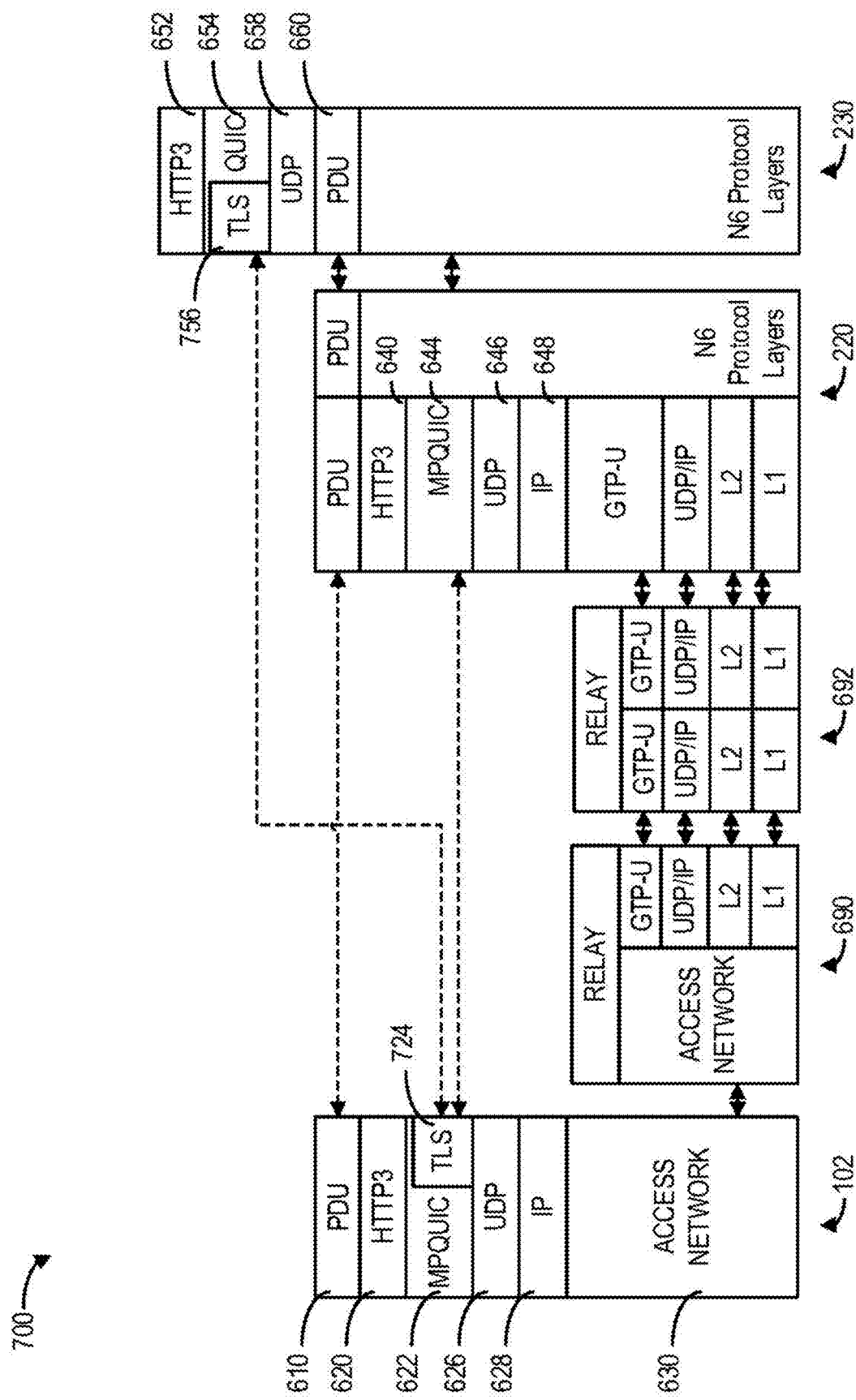
FIG. 7 illustrates an example protocol stack in accordance with one or more implementations of the present disclosure.
Figure 7A:
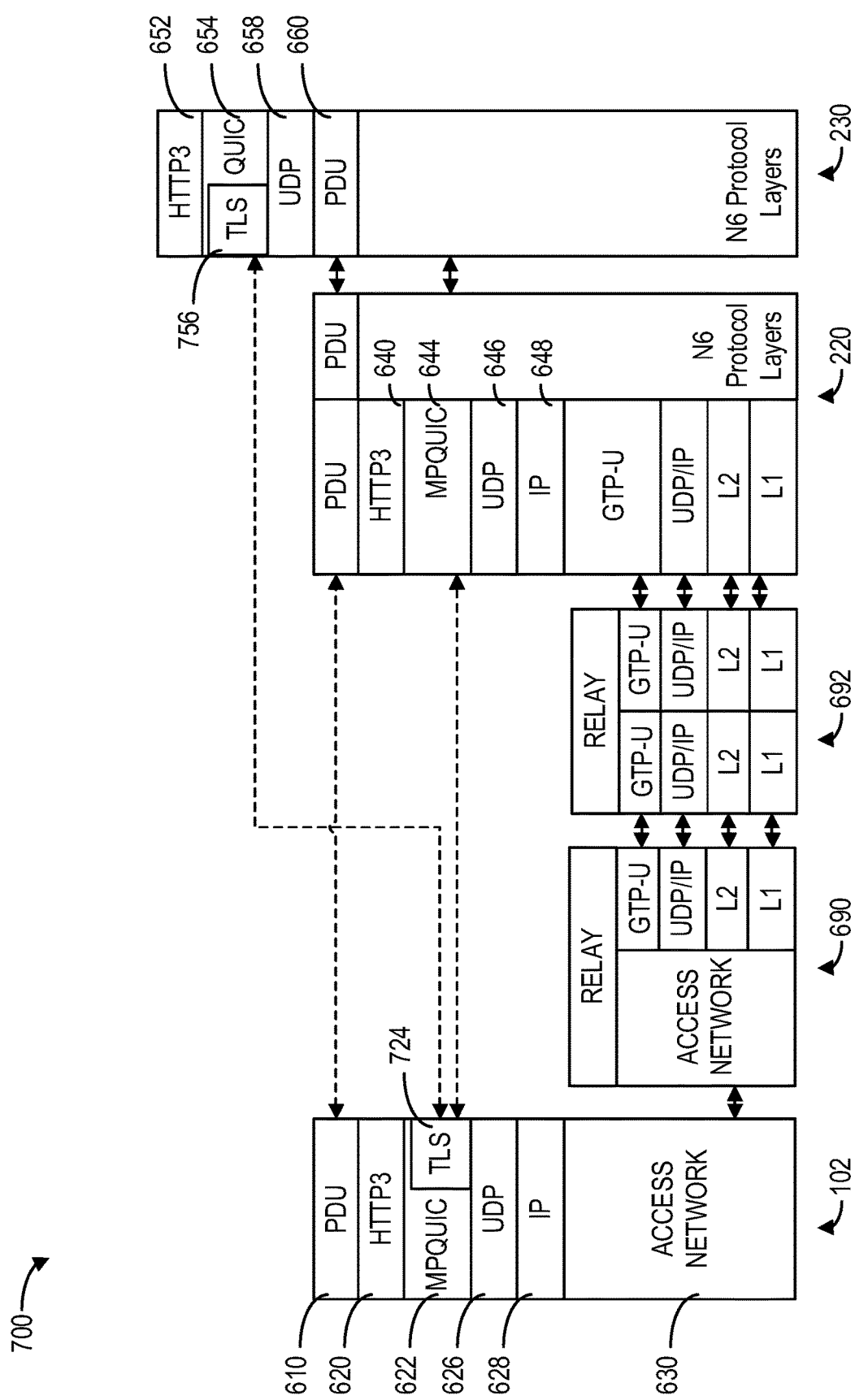
Figure 7B:
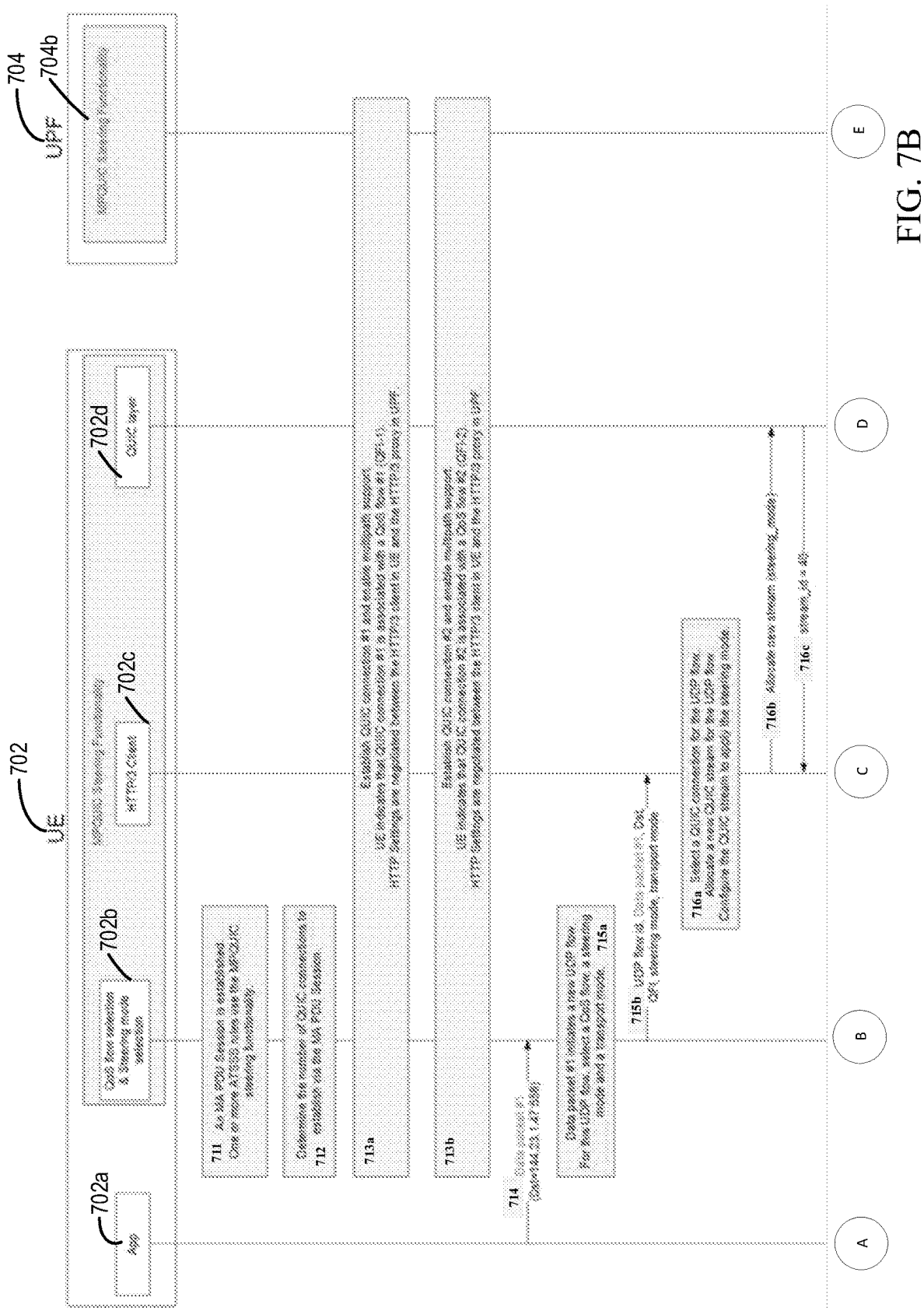
Figure 7C:
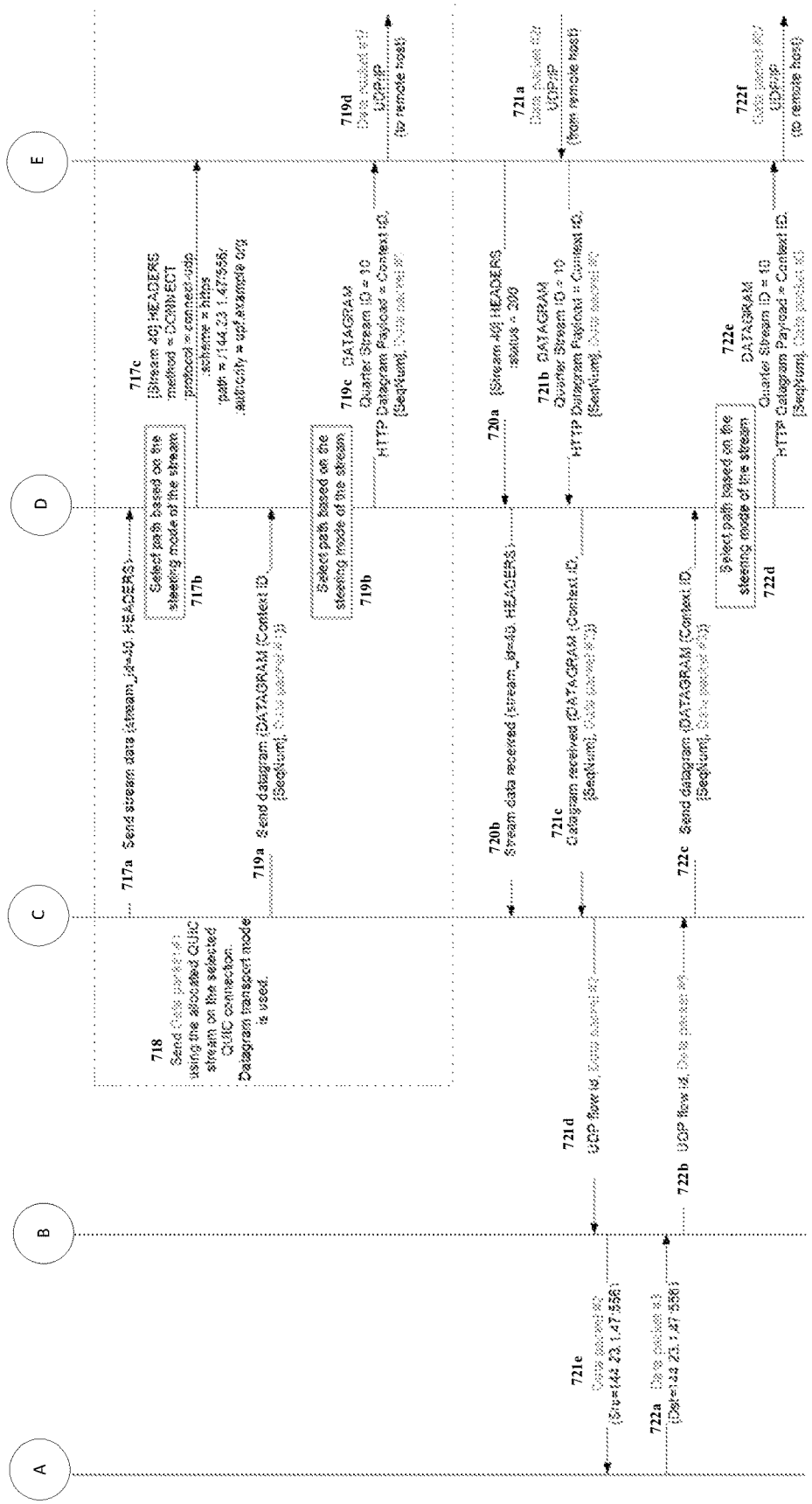

In FIG. 7, an example protocol stack 700 in accordance with one or more implementations of the present disclosure is shown. The protocol stack 700 may be similar to that of protocol stack 600 with reduced layers, decreasing the overhead necessary to enable encrypted communications with the application server 230. For example, the MPQUIC layer 622 may include a connection identifier, stream identifier, and packet numbers, which may correspond to the paths 452, 454, which may further be forwarded by the HTTP proxies 432, 434 to the application server 230. For example, the TLS layer 724 may be configured to encrypt the MPQUIC payload with the TLS layer 756 of the application server 230. As such, the MPQUIC payload or QUIC payload when forwarded by the HTTP proxies 432, 434 may be uninspectable by the HTTP proxies 432, 434. The HTTP layers 620, 640, 652 may form a mask or MASQUE enabling transfer of packets over multiple paths to the transport converter 220 and transfer of packets from the transport converter 220 without requiring redundant encryption. For example, the transport converter 220 may convert the multipath streams to a single path stream of encrypted payload information for consumption by the application server 230. Further, redundant HTTP layers may not be required by the user device 102. The encrypted connection with the application server 230 may be maintained and the HTTP proxy may forward the encrypted payloads to the application server 230 based on HTTP communications from the user device 102. Similarly, encrypted connection identifiers, stream identifiers, and packet numbers of the QUIC packet may be forwarded to the application server 230. In such a way, the transport converter 220 may relay packets based on the HTTP layer (e.g., HTTP layers 620, 640, 652) communications.

FIGS. 20A-D show an example procedure for data traffic exchange between a user equipment (UE) 702 and a user plane function (UPF) 704 using multipath QUIC (MPQUIC) in accordance with one or more implementations of the present disclosure. The procedure shown in FIGS. 20A-D may enable data traffic to be exchanged between the UE 702 and UPF 704 using the MPQUIC steering functionality.

At step 711, the UE 702 may establish a MA PDU session with the 5G core (5GC) network. During the MA PDU session establishment, the UE 702 may send the PDU Establishment Request message to the UPF 704. In the PDU Establishment Request message, the UE 702 may indicate that it supports the MPQUIC steering functionality. This indication may be used by the network to select a UPF that supports the MPQUIC steering functionality and to decide whether the ATSSS/N4 rules for the MA PDU Session may use the MPQUIC steering functionality. The UE 702 may receive MPQUIC proxy information, such as one IP address of UPF 704, one UDP port number and the proxy type (e.g. "connect-udp"). This information may be used by the UE 702 for establishing QUIC connections with the UPF 704, which is also referred to as "MPQUIC proxy". The UE 702 may receive one IP address/prefix for the MA PDU Session and two additional IP addresses/prefixes, called "link-specific multipath QUIC" addresses; one associated with 3GPP access and another associated with non-3GPP access. These two addresses can be used by the UE 702 to create two paths in a multipath QUIC connection. The UE 702 may receive QoS rules and ATSSS rules to be applied for the MA PDU Session, for QoS enforcement and traffic steering enforcement respectively. Similar rules (N4 rules) may be received by UPF 704.

At step 712, after the MA PDU Session is established and the UE 702 may identify that one or more ATSSS rules require traffic steering using the MPQUIC steering functionality. The UE 702 may determine the number of multipath QUIC connections to be established with the UPF 704 (i.e., MPQUIC proxy). For example, the UE 702 may determine to establish as many multipath QUIC connections, as the number of QoS flows of the MA PDU Session, (i.e. one multipath QUIC connection per QoS flow). The QoS rules provided to UE 702 may include downlink QoS information and the UE 702 may apply the downlink QoS information to establish QUIC connections for the QoS flows used for downlink traffic only.

At step 713*a-b*, the UE 702 may establish the number of multipath QUIC connection with the UPF 704 (i.e., MPQUIC proxy) determined in the step 712. This may result into several multipath QUIC connections between the UE 702 and UPF 704, each one comprising multiple paths, for example, one path over 3GPP access and another path over non-3GPP access. Data transmitted over a multipath QUIC connection may be encrypted. However, encryption may not be necessary when the multipath QUIC connection is established between UE 702 and UPF 704, because the underlying 5G security mechanisms can be applied.

During a QUIC connection establishment, the UE 702 and UPF 704 may negotiate QUIC transport parameters and indicate: (1) support of QUIC datagram frames; and (2) support of multipath. The UE 702 and UPF 704 may indicate support of QUIC datagram frames by providing the "max_datagram_frame_size" transport parameter with a non-zero value and they indicate support of multipath by providing the "enable_multipath" transport parameter.

After a QUIC connection establishment, the HTTP/3 client 702c and the HTTP/3 proxy (now shown) may negotiate HTTP settings and indicate support of HTTP datagrams and support of extended CONNECT.

The QoS flow associated with a QUIC connection may be negotiated between the UE 702 and UPF 704. This may be done by using a QUIC transport parameter when the QUIC connection is established. A QUIC transport parameter may be registered in IANA (at step 3).

At step 714. an application in the UE 702 may generate a new data packet (also referred to as "UDP payload") that needs be sent via the MA PDU Session. This data packet may initiate a new UDP flow, (i.e. a sequence of data packets using the same 5-tuple). For example, the data packet in step 713 may be sent to IP address 144.23.1.47 and to UDP port 556.

At step 715*a-b*, for the new UDP flow (and for each new UDP flow), the UE 702 may select a QoS flow (QFI) over which the UDP flow needs to be transmitted. This may be selected by using the received QoS rules. The UE 702 may select a steering mode that needs to be applied for the UDP flow. This may be selected by using the received ATSSS rules. The UE 702 may select a transport mode, for example, a datagram transport mode or the stream transport mode. This may be selected by using the received ATSSS rules. Each ATSSS rule which indicates that the MPQUIC steering functionality may be applied for the matching traffic, may indicate the transport mode that needs to be applied for this traffic.

The datagram transport mode may support the following two sub-modes of operation. First, in datagram mode 1 (with sequence numbers), the HTTP/3 proxy/client may prefix each UDP data with a sequence number before passing it to the QUIC layer for multipath transmission. The sequence numbers may be applied by the receiving endpoint (HTTP/3 client/proxy) to re-order the UDP data and remove duplicated UDP data. Second, in datagram mode 2 (without sequence numbers), the HTTP/3 proxy/client may not prefix each UDP data with a sequence number before passing it to the QUIC layer for multipath transmission. This may result (depending on the applied steering mode) in data delivery with out-of-order packets and/or with duplicated packets. For some applications, however, such type of data delivery may be acceptable.

In both datagram modes, every UDP data may be encapsulated within an HTTP DATAGRAM, which if further encapsulated within an QUIC DATAGRAM frame. The payload of the HTTP DATAGRAM may comprise a Context ID and a Payload: HTTP DATAGRAM payload={Context ID (i), Payload (..)}.

The datagram mode 1 and datagram mode 2 may use two different (and pre-defined in 3GPP) Context IDs, for example, Context ID=0 and Context ID=1, respectively. With Context ID=0, the Payload may include the UDP data, whereas, with Context ID=1, the Payload may include a sequence number followed by the UDP data. The format of QUIC DATAGRAMs used in both datagram modes is shown in FIG. 21.

At step 716a-c, the UE 702 may select a multipath QUIC connection to be used for the new UDP flow (e.g. based on the selected QFI) and the UE may allocate a new bidirectional QUIC stream (e.g. stream 40) in this multipath QUIC connection. This new stream may be associated with the new UDP flow. The UE 702 may configure the new stream to transmit uplink data traffic using the selected steering mode for this UDP flow.

At steps 717a-c, 718, 719a-d, the UE 702 may send the data packet using the allocated new stream on the selected QUIC connection. When the datagram transport mode is selected (either mode 1 or mode 2), the UE 702 may encapsulate the data packet within an HTTP DATAGRAM frame, which is transferred inside a QUIC DATAGRAM frame. The header of the HTTP DATAGRAM may indicate that this datagram is associated with stream 40 (i.e., the Quarter Stream ID is set to 10).

When the stream transport mode is selected, the UE 702 may encapsulate the data packet within an HTTP DATAGRAM frame that is further encapsulated in a DATAGRAM capsule, which is transferred inside a QUIC STREAM frame.

The datagram transport mode (either mode 1 or mode 2) may be selected. The UE 702 may send an HTTP CONNECT request via the allocated stream 40, which indicates to UPF 704 (MPQUIC proxy) that the UE 702 wishes to create a tunnel to send UDP traffic to remote host 144.23.1.47 and port 556. The :protocol pseudo-header may be set to "connect-udp" to indicate that the protocol to be spoken on the tunnel is the capsule protocol. Finally, the UE 702 may send a QUIC DATAGRAM frame to UPF 704 that encapsulates the data packet, which is forwarded to the remote host (144.23.1.47:556). The QUIC DATAGRAM frame may include a sequence number (as defined in step 715a-b).

If the stream transport mode were selected, the HTTP DATA frame may include a DATAGRAM capsule, which may include the data packet in the HTTP Datagram Payload field.

At step 720a-b, the UPF 704 (MPQUIC proxy) may respond with an HTTP 200 status, indicating that the request to proxy data packets to a remote host 144.23.1.47 and destination port 556 is accepted.

At steps 721a-e, when a data packet is received by UPF 704 (MPQUIC proxy) from the remote host (data packet #2), this data packet may be transferred to the UE 702 using the established context information for the UDP flow, for example, using the selected multipath QUIC connection, the selected stream on this connection, the selected steering mode, and the selected transport mode. Such context information may be stored in the UPF 704 and in the UE 702 and may be applied for all the data packets of the UDP flow.

At steps 722a-f, similarly, when another data packet is generated by the UE app (data packet #3), this data packet may be transferred to UPF 704 (MPQUIC proxy) using again all the stored context information for the UDP flow.

The context information for a UDP flow in the UE 702 and in the UPF 704 may be created when the first data packet (i.e. Data packet #1) of this UDP flow is transferred. All subsequent data packets of the same UDP flow may be transferred between the UE 702 and the UPF 704 using this context information.

Figure 8:
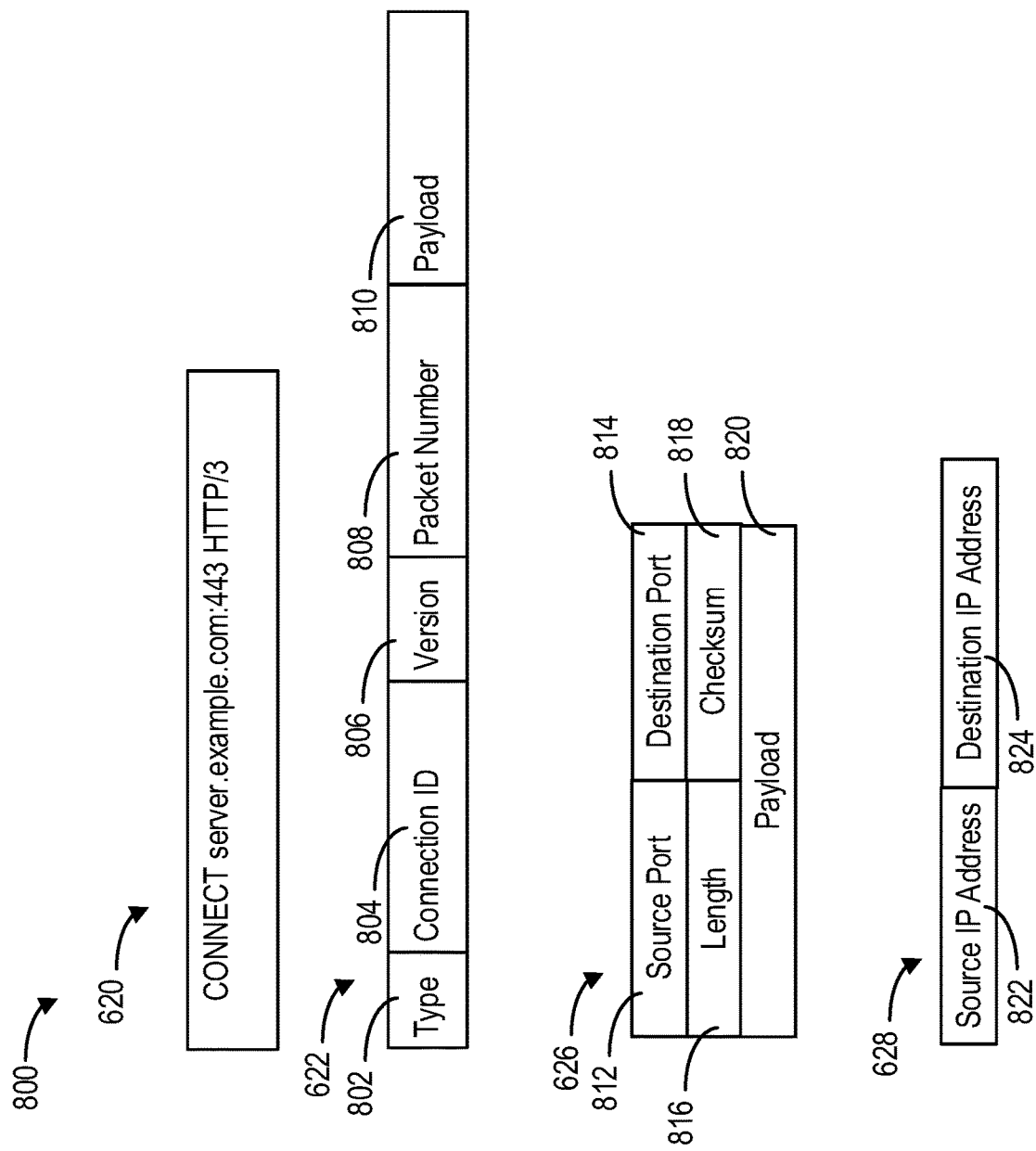
FIG. 8 illustrates example packet headers in accordance with one or more implementations of the present disclosure.

In FIG. 8, example packet headers 800 in accordance with one or more implementations of the present disclosure are shown. For example, HTTP layer 620, 640, 652 packet headers may include an HTTP MASQUE payload (e.g., an HTTP method along with a forwarding address) to establish HTTP communications. The QUIC or MPQUIC layers (e.g., layer 622) may be defined by a packet header including a type of bit or bits 802, a connection identifier 804, a version 806, a packet number 808, and a payload 810. This information may be encrypted as part of the UDP payload 820. For example, the UDP layer (e.g., UDP layer 626) may include header comprising a source port 812, destination port 814, length 816, checksum 818, and payload 820 and the payload 818 may comprise the header of the MPQUIC layer 622 and the MPQUIC payload, which may be encrypted. The IP layer (e.g., IP layer 628) may include header information that comprises a source IP address 822 and a destination IP address 824. For example, the source IP address 822 may be an IP address of the user device 102 assigned by the network and the destination IP address 824 may be an IP address of the transport converter 220 assigned by the network (e.g., DHCP). In such a way, the HTTP MASQUE may be used to establish proxy forwarding of the UDP layer packets having encrypted payloads received by the transport converter 220 to the application server 230, and the application server 230 can reconstruct the application data (e.g., application data 510) based on the connection identifier, packet number, and stream identifier in the encrypted payload.

Figure 9:
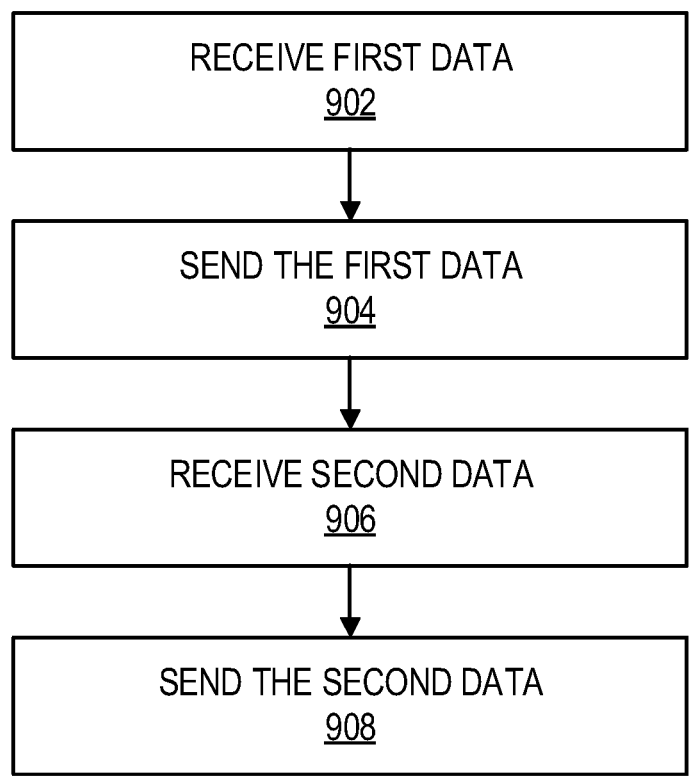
FIG. 9 illustrates an example method in accordance with one or more implementations of the present disclosure.

In FIG. 9, an example method 900 in accordance with one or more implementations of the present disclosure is shown. The method 900 may be performed by any of the devices or nodes discussed herein and combinations thereof. For example, the method 900 may be performed by the user device 102, the application server 230, the computing device 122, the transport converter 220, other nodes, and combinations thereof. In step 902, a first portion of data is received. For example, the data may be one or more of application data 310, 350 and the portion may be one or more of packets 312, 314, 316, 318 or packets 352, 354, 356, 358.

In step 902, a first portion of data or first data may be received. For example, a processor 103 of a user device 102 may receive the first portion of data or the first data from an application stored in a user layer memory allocation of a user device 102. The first portion of data or the first data may be a packet, a payload, or a frame. The first potion of data or the first data may comprise an identifier indicating a data stream associated with the first portion of data or the first data. The first portion of data or the first data may comprise a connection identifier, a stream identifier, and/or a packet number.

In an example, first indication of a first path of a connection may be determined. For example, a user device 102 may determine, based on a network condition associated with the first path of the connection, the first indication. The network condition may be represented by a condition category. For example, the condition category may relate to the type of network condition indicated (e.g., round trip time, congestion, latency, available throughput, percentage of capacity consumed, etc.). The first indication may be related to or indicative of the network condition of the first path (e.g., path 452) or portion thereof. For example, the first indication may be indicative of the network condition on the entire path 452 or the condition of one or more nodes or links of the path 452. The connection may be a multipath connection implemented by QUIC and/or MPQUIC to communicate the UDP/IP traffic flows between end nodes such as the user device 102 and an application server 230.

In an example, a second indication of a second path of the connection may be determined. For example, the user device 102 may determine, based on a network condition associated with the second path of the connection, the second indication. The second indication may be related to the same network condition or condition category as the first indication to allow the values of the indications to be directly compared. For example, the second indication associated with the second path of the connection may be a round-trip time of the second path (e.g., path 454) and the first indication associated with the first path of the connection may be a round-trip time of the first path (e.g., path 452). The network conditions or condition category for the first path and the second path may be different.

A scheduler (e.g., scheduler 402) may be configured to send packets (e.g., packets 312, 314, 316, 318) on either path based on the indication. For example, a network preference for the selection of the path (e.g., path 452, 454) may be provided to the scheduler 402 through a policy, a rule, or another requirement. For example, the network preference may require that the path (e.g., path 452, 454) with the lowest, shortest, round-trip time be selected for transmission. The network preference may require that the path selected have the lowest latency. The preference may require that the path selected have the smallest percentage of capacity consumed. The preference may require that the selected path have, for example, the highest, greatest, available bandwidth or throughput.

In step 904, the first portion (e.g., packet 312) of data or the first data may be sent. For example, the first portion of data or the first data may be sent based on the first and second indication and the network preference. As such, one of the indications may be more satisfactory of the network preference than the other of the indications when the network preference is a requirement for the lowest latency or most available bandwidth. For example, path 452 may have a lower latency than path 454. The network preference may require that the path with the lowest latency transmits the portion (e.g., packet 312). As such, the packet 312 may be transmitted on path 452 based on the indications of latency. The network preference may be represented by a threshold. For example, the first indication satisfies the threshold for the network preference but the second indication does not satisfy the threshold for the network preference. The first portion of the data may then be sent on the first path. For example, the threshold may be a value indicating the lowest latency, most available bandwidth, highest throughput, or maximum capacity. For example, the first portion of data or the first data may be sent, based on a first network condition of the first path relative to a second network condition of the second path satisfying a threshold for a network preference on the first path.

In step 906, a second portion of data or second data may be received. For example, a processor 103 of a user device 102 may receive the second portion of data or second data from an application stored in a user layer memory allocation of a user device 102. The second portion of data or the second data may be a packet, a payload, or a frame. The second potion of data or the second data may comprise an identifier indicating a data stream associated with the second portion of data. The second portion of data or the second data may comprise a connection identifier, a stream identifier, and/or a packet number. For example, the second portion may be packet 314 of application data 310.

A third indication associated with a network condition of the second path may be determined. For example, the user device 102 may determine, based on a network condition associated with the second path of the connection, the third indication. The third indication may be determined based on the same network condition or condition category as the first and second indications. The third indication may be determined after the first indication is determined. The third indication may be determined based on a different network condition or condition category than the first and second indications based on a change in the network policy, provisioned rules, or QFI. For example, the network policy or rules may change based on the access network 210 available to the user device 102.

A fourth indication associated with a network condition of the first path may be determined. For example, the user device 102 may determine, based on a network condition associated with the first path of the connection, the fourth indication. The fourth indication may be determined based on the same network condition or condition category as the third indication. The fourth indication may be determined after the second indication is determined. The fourth indication may be determined based on a different network condition or condition category than the first and second indications based on a change in the network policy, provisioned rules, or QFI. For example, the network policy or rules may change based on the access network 210 available to the user device 102.

In step 908, the second portion of data (e.g., packet 314) or the second data may be sent based on: (1) the third indication and the fourth indication; (2) the network preference; and/or (3) the first identifier and the second identifier. For example, the third indication relative the fourth indication may be indicative that the second path (e.g., path 454) is more satisfactory of the network preference (e.g., shorter round-trip time). For example, the third indication associated with the network condition of the second path may be more satisfactory for the network preference than the fourth indication associated with the network condition of the first path when the network preference is a requirement for the lowest latency or most available bandwidth. Furthermore, the first identifier and the second identifier may indicate that the first portion of data and the second portion of data are the same data stream. In this situation, despite that the second path is more satisfactory than the first path, the user device 102 may send the second portion of data on the first path to maintain the transmission of data on the same path/stream. For example, the second data may be sent, based on both the first identifier and the second identifier being indicative of the same data stream and based on the second network condition of the second path relative to the first network condition of the first path satisfying the threshold for the network preference, on the first path For example, path 454 may have a lower latency than path 452. The network preference may require that the path with the lowest latency transmits the portion (e.g., packet 314). However, the packet 314 may be the part of same stream as the packet 312. As such, the packet 314 may be still transmitted on path 452 based on the indications of latency and the same data stream. The network preference may be represented by a threshold. For example, when the third indication satisfies the threshold for the network preference but the fourth indication does not satisfy the threshold for the network preference, the second portion of the data may be sent on the first path based on the identifiers indicating the same data steam. For example, the second portion (e.g., packet 314) may be sent on the same path (e.g., path 452) as the first portion (e.g., packet 312).

The scheduler 402 may maintain a list, ledger, or dictionary of paths used to transmit the first portion (e.g., packet 312), recognize that the second portion (e.g., packet 314) is part of the same stream, based on the connection identifier, packet number, stream identifier, or combinations thereof, as the first portion, and override the preference to send the second portion (e.g., packet 314) on path 452. The indications may be determined based on a cadence. For example, the indications may be determined when new QFI packets are received.

Figure 10:
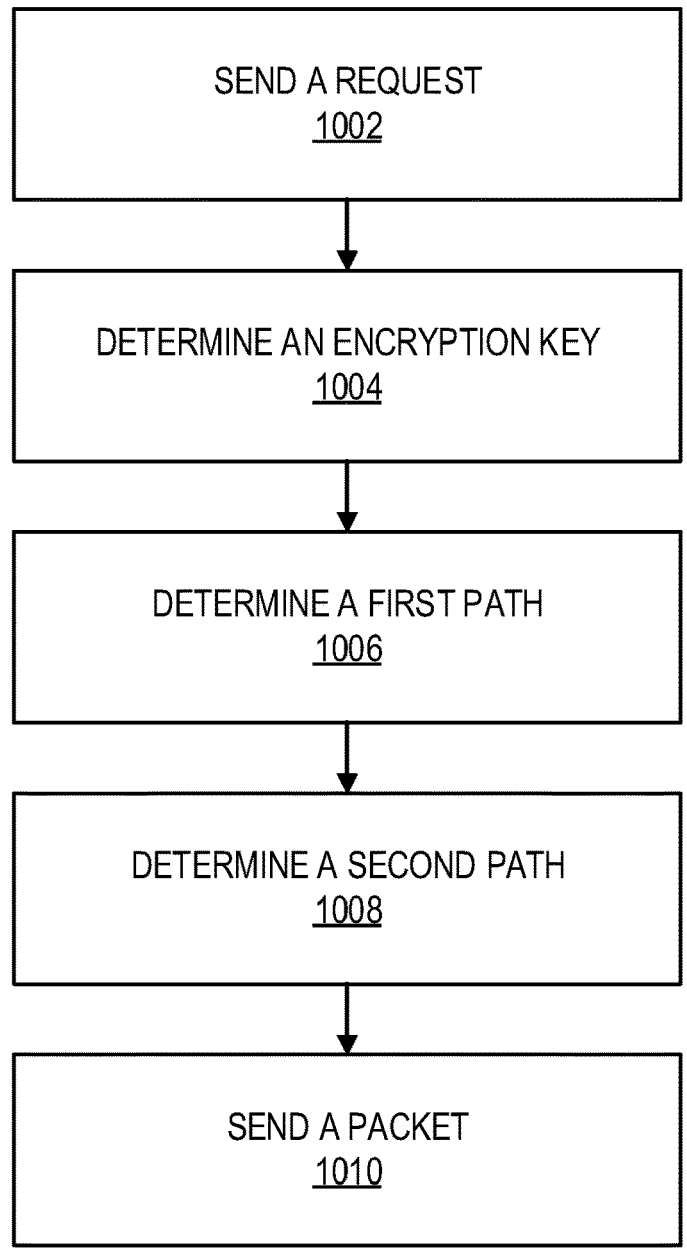
FIG. 10 illustrates an example method in accordance with one or more implementations of the present disclosure.

In FIG. 10, an example method 1000 in accordance with one or more implementations of the present disclosure is shown. The method 1000 may be performed by any of the devices or nodes discussed herein and combinations thereof. For example, the method 1000 may be performed by the user device 102, the application server 230, the computing device 122, the transport converter, 220, other nodes, and combinations thereof.

In step 1002, a request to establish a multipath connection may be sent. The request may be based on UDP, QUIC, or another protocol. The request may include a payload. For example, the payload may include HTTP parameters for generating a proxy. For example, the proxy may be configured to forward communications received over the connection to an application server (e.g., application server 230). The parameters may be sent before the connection (e.g., a QUIC connection or MPQUIC connection) is completely formed with the transport converter 220 and the tunnel is encrypted. For example, the payload may include an address (e.g., an IP address, URL, or otherwise) with the destination for packets to be forwarded over the connection. The request may establish one or more proxies (e.g., proxies 432, 434) for forwarding packets received. The proxies 432, 434 may be established for the connection of the request, another connection request, or a combination thereof. The port of the proxies 432, 434, or the transport converter 220, may be included in header information (e.g., the UDP header). The request to establish the multipath connection may be sent based on the port of the proxy. The request to establish the multipath connection may comprise a method field and a protocol field. The method field may be set to CONNECT. The protocol field may be set to COONECT-UDP and/or CONNECT-IP.

The request may further include an offer to establish an encrypted tunnel as part of a handshake procedure. For example, the encrypted tunnel may be based on TLS (e.g., TLS 1.3). The offer may be forwarded to the application server 230, based on one or more of the proxies 432, 434, to establish the encrypted tunnel. For example, an encryption key may be determined in step 1004. The encryption key may be based on a response from the application server 230 to the user device 102. The user device 102 may confirm the authenticity of information received from the application server 230 to determine the encryption key. The encryption key may be determined based on a protocol (e.g., Diffie-Hellman). The encryption key may be determined based on a private key of the user device 102 and a public key associated with the application server 230.

In step 1006, a first path (e.g., path 452) may be determined based on the multipath connection with the transport converter 220. For example, the first path may be based on one or more of a connection identifier of the connection, a packet number, a sequence number, or a stream identifier. For example, the first path may be identifiable based on the connection identifier and associated with one or more of the proxies 432, 434. For example, the connection identifier may be determined based on creation or instantiation of the one or more proxies 432, 434.

In step 1008, a second path (e.g., path 454) may be determined based on a multipath connection with the transport converter 220. For example, the second path may be based on one or more of a connection identifier of the connection, a packet number, a sequence number, or a stream identifier. For example, the second path may be identifiable based on the connection identifier and associated with one or more of the proxies 432, 434. For example, the connection identifier may be determined based on creation or instantiation of the one or more proxies 432, 434. In step 1010, a packet may be sent (e.g., packet 312) based on the encryption key, to the destination address. For example, the user device 102 may send a packet (e.g., packet 312) to the destination address.

Figure 11:
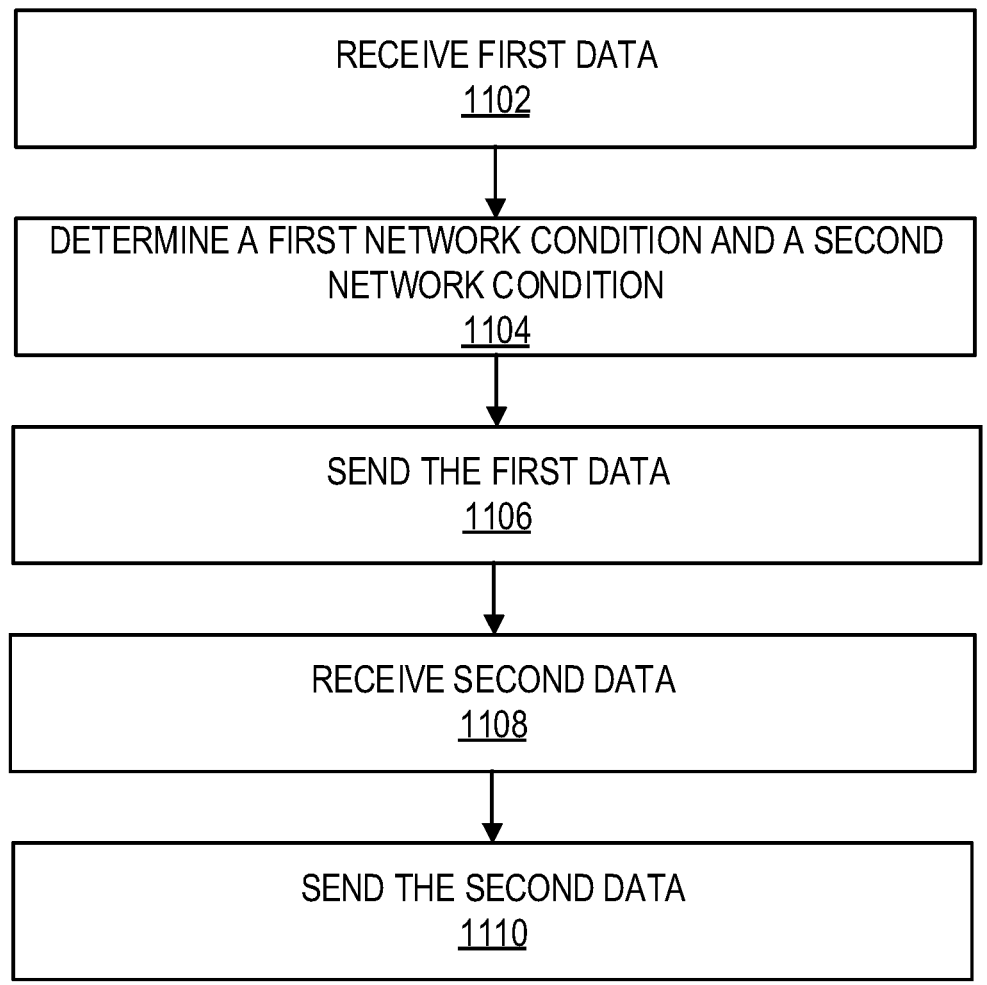
FIG. 11 illustrates an example method in accordance with one or more implementations of the present disclosure.

In FIG. 11, an example method 1100 in accordance with one or more implementations of the present disclosure is shown. The method 1100 may be performed by any of the devices or nodes discussed herein and combinations thereof. For example, the method 1100 may be performed by the user device 102, the application server 230, the computing device 122, transport converter, 220, other nodes, and combinations thereof. In step 1102, a first portion of data is received. For example, the data may be one or more of application data 310, 350 and the portion may be one or more of packets 312, 314, 316, 318, or packets 352, 354, 356, 358.

In step 1102, a first portion of data or first data may be received. For example, a processor 103 of a user device 102 may receive the first portion of data or first data from an application stored in a user layer memory allocation of a user device 102. The first portion of data or the first data may be a packet, a payload, or a frame. The first potion of data or the first data may comprise an identifier indicating a data stream associated with the first portion of data or the first data. The first portion of data or the first data may comprise a connection identifier, a stream identifier, and/or a packet number.

In step 1104, a first network condition of a first path and a second network condition of a second path may be determined. For example, a first indication of a first path of a connection may be determined. For example, a user device 102 may determine, based on a network condition associated with the first path of the connection, the first indication. The network condition may be represented by a condition category. For example, the condition category may relate to the type of network condition indicated (e.g., round trip time, congestion, latency, available throughput, percentage of capacity consumed, etc.). The first indication may be related to or indicative of the network condition of the first path (e.g., path 452) or portion thereof. For example, the first indication may be indicative of the network condition on the entire path 452 or the condition of one or more nodes or links of the path 452. The connection may be a multipath connection implemented by QUIC and/or MPQUIC to communicate the UDP/IP traffic flows between end nodes such as the user device 102 and an application server 230.

For example, a second indication of a second path of the connection may be determined. For example, the user device 102 may determine, based on a network condition associated with the second path of the connection, the second indication. The second indication may be related to the same network condition or condition category as the first indication to allow the values of the indications to be directly compared. For example, the second indication associated with the second path of the connection may be a round-trip time of the second path (e.g., path 454) and the first indication associated with the first path of the connection may be a round-trip time of the first path (e.g., path 452). The network conditions or condition category for the first path and the second path may be different.

A scheduler (e.g., scheduler 402) may be configured to send packets (e.g., packets 312, 314, 316, 318) on either path based on the indication. For example, a network preference for the selection of the path (e.g., path 452, 454) may be provided to the scheduler 402 through a policy, a rule, or another requirement. For example, the preference may require that the path (e.g., path 452, 454) with the lowest, shortest, round-trip time be selected for transmission. The preference may require that the path selected have the lowest latency. The preference may require that the path selected have, for example, the smallest percentage of capacity consumed. The preference may require that the selected path have the highest, greatest, available bandwidth or throughput.

In step 1106, the first portion (e.g., packet 312) of data or the first data may be sent based on the first network preference. As such, one of the indications may be more satisfactory of the first network preference than the other of the indications when the first network preference is a requirement for the lowest latency or most available bandwidth. For example, path 452 may have a lower latency than path 454. The first network preference may require that the path with the lowest latency transmits the portion (e.g., packet 312). As such, the packet 312 may be transmitted on path 452 based on the indications of latency. The first network preference may be represented by a threshold. For example, the first indication satisfies the threshold for the first network preference but the second indication does not satisfy the threshold for the first network preference. The first portion of the data may then be sent on the first path. For example, the threshold may be a value indicating the lowest latency, most available bandwidth, highest throughput, or maximum capacity. For example, the first portion of data or the first data may be sent on the first path, based on the first network condition relative to the second network condition satisfying a threshold for a first network preference.

In step 1108, a second portion or second data may be received. For example, the second portion or the second data may be packet 314 of application data 310. For example, a processor 103 of a user device 102 may receive the second portion of data or the second data from an application stored in a user layer memory allocation of a user device 102. The second portion of data or the second data may be a packet, a payload, or a frame. The second potion of data or the second data may comprise an identifier indicating a data stream associated with the second portion of data. The second portion of data or the second data may comprise a connection identifier, a stream identifier, and/or a packet number. The third indication and the fourth indication may be determined as described above and details of the determination procedures are not described herein for brevity.

In step 1110, the second portion (e.g., packet 314) or the second data may be sent based on: (1) the third indication and the fourth indication; (2) a second network preference; and/or (3) the first identifier and the second identifier. The first network preference and the second network preference may be different. For example, the second network preference may be based on a rule or policy change for the scheduler 402. For example, the rule or policy change may be based on a location of the user device 102 or the access network 210 available to the user device 102. The first preference may be based on a first policy, and the first policy may be updated to a second policy including a second network preference. For example, the network policy may be provided by a policy control function of a network. The first network preference may be based on a rule of a first network policy, and the second network preference may be based on a second rule of the second network policy. For example, a steering rule may have conditions for satisfaction. As the user device 102 changes position or configurations, different conditions may be met, activating a different rule (e.g., a second rule). The rule change may attempt to inadvertently redirect packets to the other path (e.g., path 454) different from the path (e.g., path 452) of the first packet (e.g., packet 312). As such, the scheduler 402 may prevent such redirection of packets within the same stream.

For example, the third indication relative the fourth indication may be indicative that the second path (e.g., path 454) is more satisfactory of the second network preference (e.g., shorter round-trip time). The second portion (e.g., packet 314) may be sent on the same path (e.g., path 452) as the first portion (e.g., packet 312) when the first identifier and the second identifier indicate the same data stream, despite that the second network preference is satisfied for the second path instead of the first path. For example, the scheduler 402 may maintain a list, ledger, or dictionary of paths used to transmit the first portion (e.g., packet 312), recognize that the second portion (e.g., packet 314) is part of the same stream, based on the connection identifier, packet number, stream identifier, or combinations thereof, as the first portion, and override the preference to send the second portion (e.g., packet 314) on path 452. The indications may be determined based on a cadence. For example, the indications may be determined when new QFI packets are received. It should also be appreciated that the rule or policy change may further require that different indications (e.g., a third and fourth indication) be based on a different condition category that is associated with the second preference. For example, the second portion of data or the second data may be sent on the first path, based on both the first identifier and the second identifier being indicative of the data stream and based on the second network condition relative to the first network condition satisfying a threshold for a second network preference.

Figure 12:
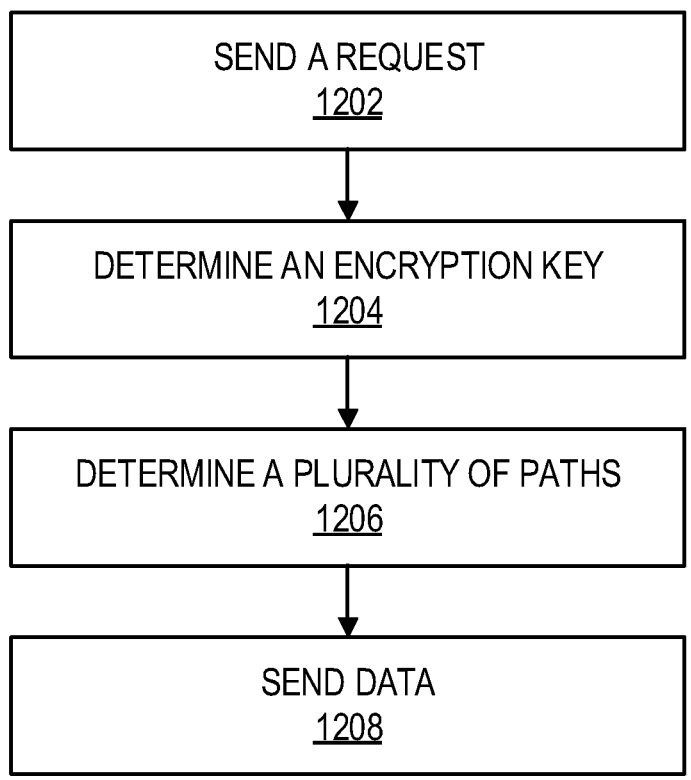
FIG. 12 illustrates an example method in accordance with one or more implementations of the present disclosure.

In FIG. 12, an example method 1200 in accordance with one or more implementations of the present disclosure is shown. The method 1200 may be performed by any of the devices or network nodes discussed herein and combinations thereof. For example, the method 1200 may be performed by the user device 102, the computing device 122, other network nodes, and combinations thereof.

In step 1202, a request to establish an encrypted tunnel for a multipath connection may be sent. For example, a user device 102 may send, to a network node, a request to establish an encrypted tunnel for a multipath connection. The request may be based on UDP, QUIC, or another protocol. The encrypted tunnel may be based on TLS (e.g., TLS 1.3). The user device 102 may send the request to the proxy 432, 434 and the proxy 432, 434 may forward the request to the application server 230 to establish the encrypted tunnel. The request may comprise a method field set to CONNECT and/or a protocol field set to CONNECT-UDP or CONNECT-IP.

In step 1204, an encryption key may be determined. For example, the user device 102 may determine the encryption key based on a response received from the application server 230. The user device 102 may confirm the authenticity of information received from the application server 230 to determine the encryption key. For example, the response may comprise a public key associated with the network node. The encryption key may be determined based on a protocol (e.g., Diffie-Hellman). The encryption key may be determined based on a private key of the user device 102 and/or a public key associated with the network node such as the application server 230.

In step 1206, a plurality of paths (e.g., paths 452, 454) may be determined based on the multipath connection with the transport converter 220. For example, the user device 102 may determine a first path (e.g. path 452) based on at least one of a connection identifier, a packet number, a sequence number, or a stream identifier. The user device 102 may also determine a second path (e.g. path 454) based on at least one of a connection identifier, a packet number, a sequence number, or a stream identifier. For example, the first path or the second path may be identifiable based on the connection identifier associated with one or more of the proxies 432, 434. The connection identifier may be determined based on creation or instantiation of the one or more proxies 432, 434.

In step 1208, data may be sent (e.g., packets 312, 318, 316, 318) using the encryption key, to the destination address. For example, the user device 102 may send, to the network node, data (e.g., packets 312, 318, 316, 318) using the encryption key over the at least one of multiple paths. The network node may be a proxy 432, 434, a transport converter 220, or an application server 230. The network node may be a logical or physical entity that performs one or more user plane functions. The network node may use the encryption key to decrypt the data.

Figure 13:
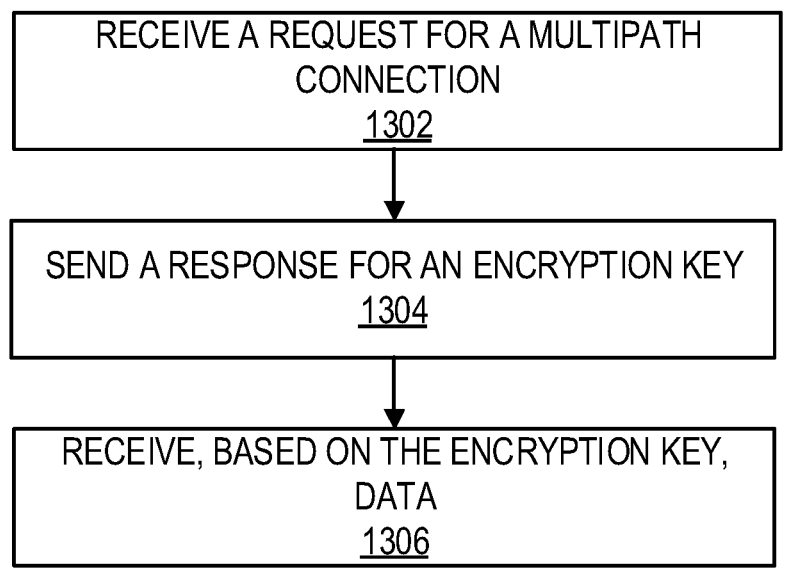
FIG. 13 illustrates an example method in accordance with one or more implementations of the present disclosure.

In FIG. 13, an example method 1300 in accordance with one or more implementations of the present disclosure is shown. The method 1300 may be performed by any of the devices or network nodes discussed herein and combinations thereof. For example, the method 1300 may be performed by the application server 230, the computing device 122, the transport converter 220, other network nodes, and combinations thereof.

In step 1302, a request to establish an encrypted tunnel for a multipath connection may be received. For example, a network node may receive, from a user device 102, a request to establish an encrypted tunnel for a multipath connection. The received request may be based on UDP, QUIC, or another protocol. The encrypted tunnel may be based on TLS (e.g., TLS 1.3). The proxy 432, 434 may forward the request to the network node and/or the application server 230 to establish the encrypted tunnel. The request may comprise a method field set to CONNECT and/or a protocol field set to CONNECT-UDP or CONNECT-IP.

In step 1304, a response may be sent to the user device 102 for an encryption key. For example, the network node may send a response to the user device 102 to create an encryption key. For example, once the user device 102 receives the response, the user device 102 may determine the encryption key based on the response received from the network node such as the application server 230. The user device 102 may confirm the authenticity of information received from the network node to determine the encryption key. For example, the response may comprise a public key associated with the network node. The encryption key may be determined based on a protocol (e.g., Diffie-Hellman). The encryption key may be determined based on a private key of the user device 102. and/or a public key associated with the network node such as the application server 230.

In step 1306, data may be received from the user device based on the encryption key. For example, the network node may receive, from the user device 102, based on the encryption key, data over at least one of a plurality of paths of the multipath connection. A plurality of paths (e.g., paths 452, 454) may be determined based on the multipath connection with the transport converter 220. For example, the network node may determine a first path (e.g. path 452) based on at least one of a connection identifier, a packet number, a sequence number, or a stream identifier. The network node may also determine a second path (e.g. path 454) based on at least one of a connection identifier, a packet number, a sequence number, or a stream identifier. For example, the first path or the second path may be identifiable based on the connection identifier associated with one or more of the proxies 432, 434. The connection identifier may be determined based on creation or instantiation of the one or more proxies 432, 434.

Once the network node receives the data over at least one of the plurality of paths, the network node may decrypt the data based on the encryption key. The network node may be a proxy 432, 434, a transport converter 220, or an application server 230. The network node may be a logical or physical entity that performs one or more user plane functions.

Figure 14:
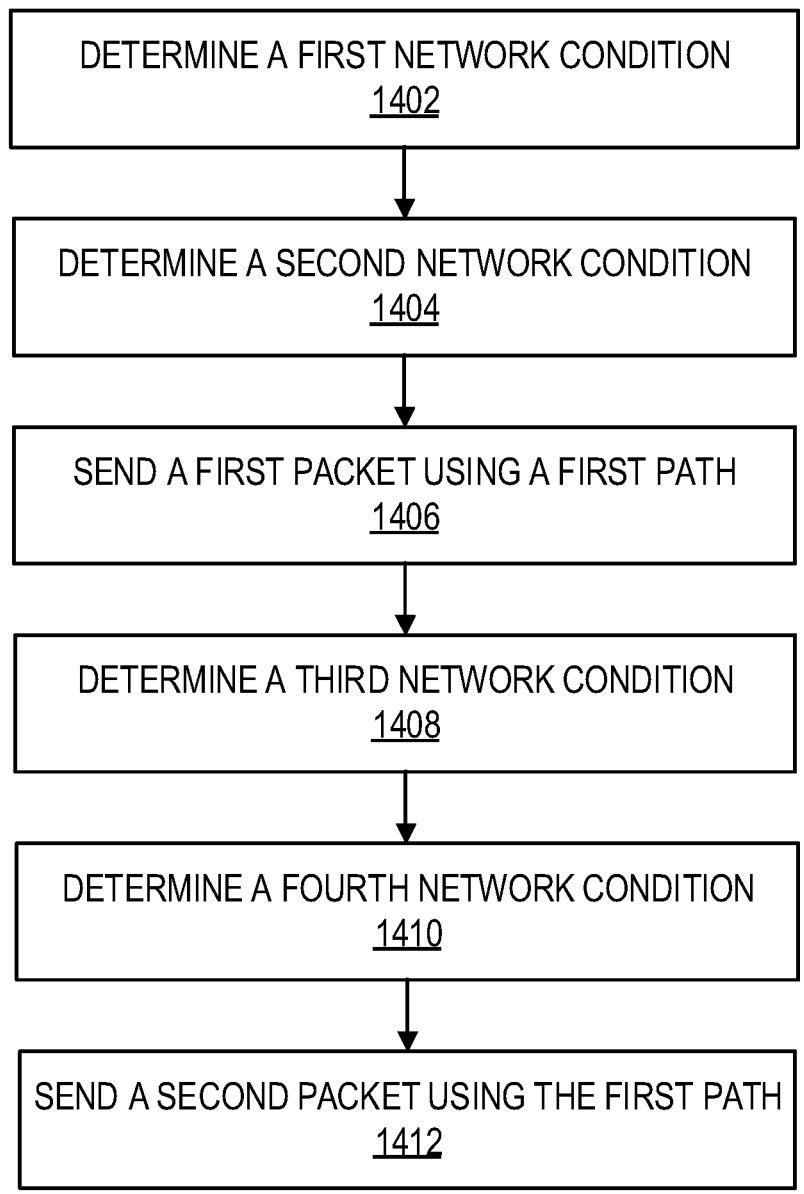
FIG. 14 illustrates an example method in accordance with one or more implementations of the present disclosure.

In FIG. 14, an example method 1400 in accordance with one or more implementations of the present disclosure is shown. The method 1400 may be performed by any of the devices or nodes discussed herein and combinations thereof. For example, the method 1400 may be performed by the user device 102, the application server 230, the computing device 122, the transport converter 220, other network nodes, and combinations thereof.

In steps 1402, 1404, a first network condition and a second network condition may be determined. For example, a user device 102 may determine a first network condition of a first path associated with a multipath connection. The user device 102 may also determine a second network condition of a second path associated with the multipath connection. The types of the network conditions (e.g., the first network condition and the second network condition) may include, but are not limited to, a round-trip time, network congestion, latency, available throughput, percentage of capacity consumed, and an available bandwidth. The types of the network conditions may be represented as a condition category. The first network condition may indicate the condition of the entire first path, a portion of the first path, one or more node on the first path, or a link of the first path. The second network condition may indicate the condition of the entire second path, a portion of the second path, one or more node on the second path, or a link of the second path. The second network condition may be related to the same condition or condition category as the first network condition to allow the values of the network conditions to be directly compared. For example, the second network condition may indicate a round-trip time of the second path (e.g., path 454) and the first network condition may indicate a round-trip time of the first path (e.g., path 452).

In step 1406, a first packet may be sent using the first path based on the first network condition and the second network condition. For example, the user device 102 may send a first packet (e.g., packet 312) using the first path based on that the first network condition is more satisfactory for a network path selection preference than the second network condition. The network path preference may be provided to the user device 102 through a policy, a rule, or another requirement. The network path selection preference may indicate at least one of a shortest round-trip time, lowest latency, highest throughput, or most available bandwidth. For example, the network path preference may indicate that the path (e.g., path 452, 454) with the lowest, for example, shortest, round-trip time be selected for transmission. The network path preference may indicate that the path selected have the lowest latency. The network path preference may indicate that the path selected have the smallest percentage of capacity consumed. The preference may indicate that the selected path have the highest, for example, greatest, available bandwidth or throughput. In an example, the first network condition may be more satisfactory of the network path preference than the second network condition when the network path preference indicates the lowest latency or most available bandwidth. For example, path 452 may have a lower latency than path 454. The network path preference may require that the path with the lowest latency transmits the first packet (e.g., packet 312). As such, the packet 312 may be transmitted on path 452 based on the network path preference of latency.

In steps 1408, 1410, a third network condition and a fourth network condition may be determined. For example, the user device 102 may determine a third network condition of the second path associated with the multipath connection. The user device 102 may also determine a fourth network condition of the first path associated with the multipath connection. The types of the network conditions (e.g., the third network condition and the fourth network condition) may include, but are not limited to, a round-trip time, network congestion, latency, available throughput, percentage of capacity consumed, and an available bandwidth. The types of the network conditions may be represented as a condition category. The third network condition may indicate the condition of the entire first path, a portion of the first path, one or more node on the first path, or a link of the first path. The fourth network condition may indicate the condition of the entire second path, a portion of the second path, one or more node on the second path, or a link of the second path. The fourth network condition may be related to the same condition or condition category as the third network condition to allow the values of the network conditions to be directly compared. For example, the fourth network condition may indicate latency of the second path (e.g., path 454) and the third network condition may indicate a latency of the first path (e.g., path 452).

In step 1412, a second packet may be sent using the first path based on the third network condition and the fourth network condition. For example, the user device 102 may send the second packet (e.g., packet 314) using the first path based on that the third network condition is more satisfactory for the network path selection preference than the fourth network condition (i.e., despite that the second path is better than the firs path). The network path preference used for comparing the third network condition and the fourth network condition may be the same or different network path preference that were used for comparing the first network condition and the second network condition. The network path preference used for comparing the above network conditions may be changed due to network policy provisioning, geolocation of the user device 102, and/or roaming of the user device 102.

A type of the first network condition and/or a type of the third network condition may comprise a round-trip time, a network congestion, a latency, a throughput, and an available bandwidth. The type of the first network condition and the type of third network condition may be different. For example, when a user device 102 sends the first packet using the first path, the user device 102 may use a round round-trip as the first network condition. However, when the user device 102 sends the second packet using the first path, the user device 102 may use an available bandwidth as the third network condition. Similarly, a type of the second network condition and/or a type of the fourth network condition may comprise a round-trip time, a network congestion, a latency, a throughput, and an available bandwidth. The type of the second network condition and the type of fourth network condition may be different. For example, when the user device 102 sends the first packet using the first path, the user device 102 may use a round-trip time as the second network condition. However, when the user device 102 sends the second packet using the first path, the user device 102 may use an available bandwidth as the fourth network condition.

The network path preference may be provided to the user device 102 through a policy, a rule, or another requirement. The network path selection preference may indicate at least one of a shortest round-trip time, lowest latency, highest throughput, or most available bandwidth. For example, the network path preference may indicate that the path (e.g., path 452, 454) with the lowest, for example, shortest, round-trip time be selected for transmission. The network path preference may indicate that the path selected have the lowest latency. The network path preference may indicate that the path selected have the smallest percentage of capacity consumed. The preference may indicate that the selected path have the highest, for example, greatest, available bandwidth or throughput. In an example, the third network condition may be less satisfactory of the network path preference than the fourth network condition when the network path preference indicates the lowest latency or most available bandwidth. For example, path 452 may have a higher latency than path 454. Even if the network path preference may require that the path with the lowest latency transmits the second packet (e.g., packet 314), in case that the first packet and the second packet form a same stream, a second packet may be sent using the same first path that was used to send the first packet. For example, the packet 314 may be transmitted on path 452 based on the network path preference of latency, thereby keeping the streams on the same path.

Figure 15:
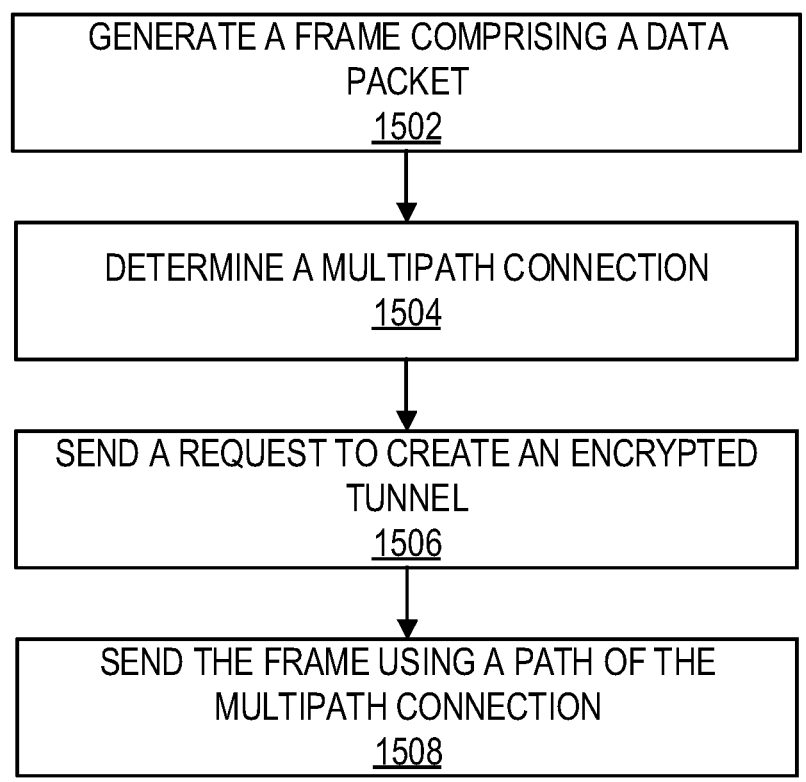
FIG. 15 illustrates an example method in accordance with one or more implementations of the present disclosure.

In FIG. 15, an example method 1500 in accordance with one or more implementations of the present disclosure is shown. At step 1502, a frame that comprises a data packet may be generated. For example, a user device 102 may generate a frame that includes an IP header, a UDP header, a QUIC header, and a data packet. The data packet may be encapsulated within a QUIC datagram frame. The data packet may be encrypted based on an encryption key shared with a plurality of network nodes across a plurality of layers. The plurality of network nodes may comprise the user device 102, the proxy server, the application server 230, relays 690, 692, and the transport converter 220. Each of the plurality of network nodes may store the encryption key. The plurality of layers may comprise an HTTP3 layer, an MPQUIC layer, a TLS layer, a QUIC layer, an IP layer, and a UDP layer. Each of the plurality of layers may access or fetch the encryption key.

At step 1504, a multipath connection may be established between the user device 102 and a proxy server. For example, the user device 102 may determine, based on QoS information associated with the data packet, a multipath connection with the proxy server. The QoS information may be related to network traffics such as UDP traffic and/or IP traffic. The QOS information may indicate one or more QoS flows of the network traffics. The QoS information may be received from the network as a network policy or a network rule. For example, the user device 102 may receive, from the proxy server or a server managing the network configuration, network configuration information to establish the multipath connection. The configuration information may comprise an IP address of the proxy server, a port number for the proxy server, and a proxy type. The multipath connection may comprise a plurality of paths to exchange frames or data packets between the user device 102 and the proxy server.

At step 1506, a request to create an encrypted tunnel may be sent. For example, the user device 102 may send, to the proxy server, a request to create an encrypted tunnel with the application server 230. The request may comprise a method field being set to CONNECT and a protocol field being set to CONNECT-UDP or CONNECT-IP. At step 1508, the frame may be sent using a path of the multipath connection. For example, the user device 102 may send, to the proxy server, the frame using a path of the multipath connection. The proxy server may forward the frame to the application server 230 over the encryption tunnel based on the encryption key shared with the plurality of network nodes across the plurality of layers. The proxy server may be a network node performing one or more User Plane Functions (UPFs).

Figure 16:
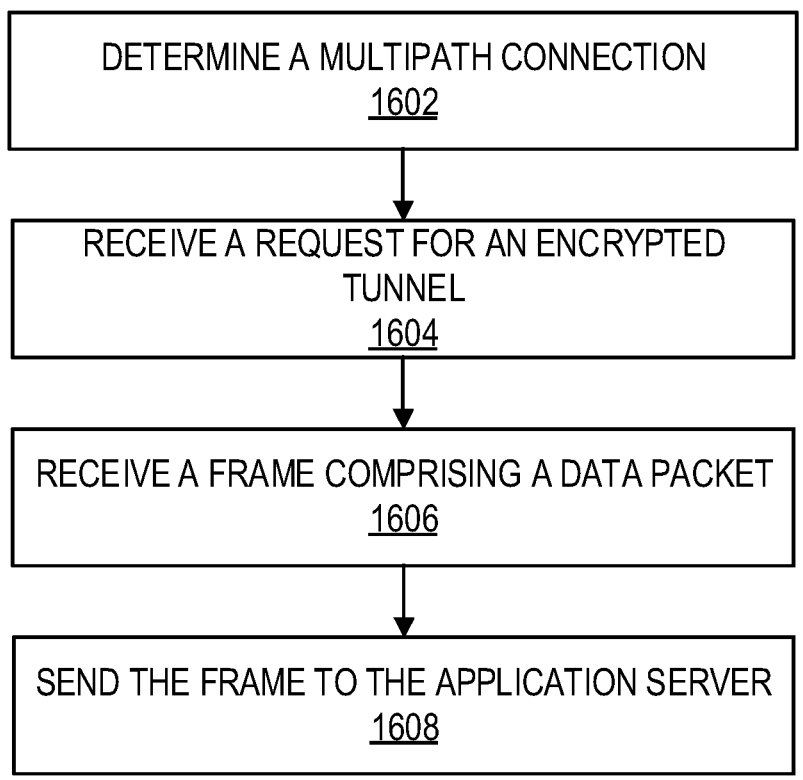
FIG. 16 illustrates an example method in accordance with one or more implementations of the present disclosure.

In FIG. 16, an example method 1600 in accordance with one or more implementations of the present disclosure is shown. At step 1602, a multipath connection with a user device 102 may be determined. For example, a proxy server may determine, based on QoS information associated with a plurality of data packets, a multipath connection with the user device 102. The QoS information may be related to network traffics such as UDP traffic and/or IP traffic. The QOS information may indicate one or more QoS flows of the network traffics. The QoS information may be received from the network as a network policy or a network rule. For example, the proxy server may receive, from a server managing the network configuration or the like, network configuration information to establish the multipath connection. The configuration information may comprise an IP address of the user device 102 server, a port number to be used for the proxy server, and a proxy type. The multipath connection may comprise a plurality of paths to exchange frames or data packets between the user device 102 and the proxy server.

At step 1604, a request for an encrypted tunnel may be received. For example, the proxy server may receive, from the user device 102, the request to create an encrypted tunnel with the application server 230. The request may comprise a method field being set to CONNECT and a protocol field being set to CONNECT-UDP or CONNECT-IP. At step 1606, a frame may be received from the user device 102 using a path of the plurality of paths associated with the multipath connection. As described above, the data packet may be encrypted based on an encryption key shared with a plurality of network nodes across a plurality of layers. The plurality of network nodes may comprise the user device 102, the proxy server, the application server 230, relays 690, 692, and the transport converter 220. Each of the plurality of network nodes may store the encryption key. The plurality of layers may comprise an HTTP3 layer, an MPQUIC layer, a TLS layer, a QUIC layer, an IP layer, and a UDP layer. Each of the plurality of layers may access or fetch the encryption key.

At step 1608, the frame may be sent to the application server 230. For example, the proxy server may forward the frame to the application server 230 over the encryption tunnel based on the encryption key. The encryption key may be shared with the plurality of network nodes including the application server 230 across the plurality of layers including the UDP layers and IP layers. The proxy server may be a network node performing one or more User Plane Functions (UPFs).

Figure 17:
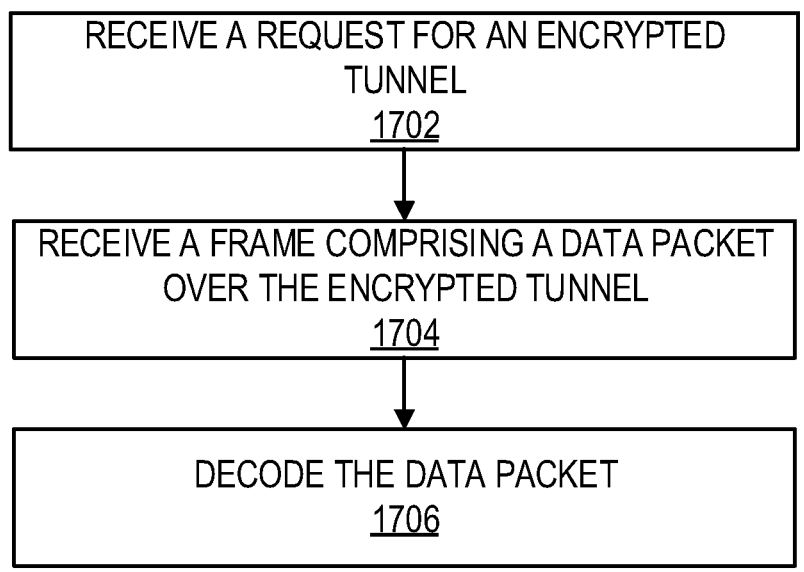
FIG. 17 illustrates an example method in accordance with one or more implementations of the present disclosure.

In FIG. 17, an example method 1700 in accordance with one or more implementations of the present disclosure is shown. At step 1702, a request to create an encrypted tunnel may be received. For example, an application server 230 may receive, from a proxy server, a request to create the encrypted tunnel with the user device 102. The request may comprise a method field being set to CONNECT and a protocol field being set to CONNECT-UDP or CONNECT-IP.

The encrypted tunnel may be based on an encryption key shared with a plurality of network nodes across a plurality of layers. The encryption key may be shared with a plurality of network nodes across a plurality of layers. The plurality of network nodes may comprise the user device 102, the proxy server, the application server 230, relays 690, 692, and the transport converter 220. Each of the plurality of network nodes may store the encryption key. The plurality of layers may comprise an HTTP3 layer, an MPQUIC layer, a TLS layer, a QUIC layer, an IP layer, and a UDP layer. Each of the plurality of layers may access or fetch the encryption key.

At step 1704, a frame may be received over the encrypted tunnel. For example, the application server 230 may receive the frame from the proxy server. The proxy server may be a network node performing one or more User Plane Functions (UPFs). The frame may comprise a data packet encrypted based on the encryption key shared with the plurality of network nodes across the plurality of layers. At step 1706, the data packet may be decoded using the encryption key. For example, the application server 230 may decode the data packet using the encryption key stored in or shared with the application server 230.

The network functions described herein may be generally referred to as a combination that may run on one or more servers, one or more instances, one or more sets of instructions, and so on. Such instances may be containerized, replicated, scaled, and distributed to meet the growing demands of respective networks. Any of the steps or functions described in one or more of the methods, architectures, or call flows described herein may be used in conjunction with any of the other methods, architectures, or call flows described herein. Any of the components (e.g., network functions, user equipment, servers) may perform any of the steps from any of the methods or call flows described herein even though not specifically described and may be performed in combination with any of the other components. It should be appreciated that the techniques described herein relate to various protocols and technology and may at least apply to 3G, 4G, and 5G technologies.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
generating a frame that comprises a data packet encrypted based on an encryption key shared with a plurality of network nodes across a plurality of layers;
determining, based on Quality of Server (QOS) information associated with the data packet, a multipath connection with a proxy server;
sending, to the proxy server, a request to create an encrypted tunnel with an application server; and
sending, to the proxy server, the frame using a path of the multipath connection, wherein the frame is to be forwarded to the application server over the encrypted tunnel based on the encryption key shared with the plurality of network nodes across the plurality of layers.

2. The method of claim 1, wherein the plurality of network nodes comprises the proxy server and the application server.

3. The method of claim 1, wherein the plurality of layers comprises a Quick User Datagram Protocol (UDP) Internet Connections (QUIC) protocol layer, an Internet Protocol (IP) layer, and a UDP layer.

4. The method of claim 1, wherein the frame comprises an Internet Protocol (IP) header, a User Datagram Protocol (UDP) header, a Quick UDP Internet Connections (QUIC) header, and the data packet encapsulated within a QUIC datagram.

5. The method of claim 1, wherein the request further comprises a method field being set to CONNECT and a protocol field being set to CONNECT-UDP or CONNECT-IP.

6. The method of claim 1, further comprising:
receiving, from the proxy server, configuration information to establish the multipath connection with the proxy server, wherein the configuration information comprises an Internet Protocol (IP) address of the proxy server, a port number for the proxy server, and a proxy type.

7. The method of claim 1, wherein the proxy server is a network node performing one or more User Plane Functions (UPFs).

8. A method comprising:
determining, based on Quality of Server (QOS) information associated with a data packet, a multipath connection with a user device;
receiving, from the user device, a request to create an encrypted tunnel with an application server;
receiving, from the user device, using a path of the multipath connection, a frame comprising the data packet, wherein the data packet is encrypted based on an encryption key shared with a plurality of network nodes across a plurality of layers; and
sending, to the application server, the frame over the encrypted tunnel based on the encryption key shared with the plurality of network nodes across the plurality of layers.

9. The method of claim 8, wherein the plurality of network nodes comprises the user device and the application server.

10. The method of claim 8, wherein the plurality of layers comprises a Quick User Datagram Protocol (UDP) Internet Connections (QUIC) protocol layer, an Internet Protocol (IP) layer, and a UDP layer.

11. The method of claim 8, wherein the frame comprises an Internet Protocol (IP) header, a User Datagram Protocol (UDP) header, a Quick UDP Internet Connections (QUIC) header, and the data packet encapsulated within a QUIC datagram.

12. The method of claim 8, wherein the request further comprises a method field being set to CONNECT and a protocol field being set to CONNECT-UDP or CONNECT-IP.

13. The method of claim 8, further comprising:
sending, to the user device, configuration information for the multipath connection with the user device, wherein the configuration information comprises an Internet Protocol (IP) address of a proxy server, a port number for the proxy server, and a proxy type.

14. The method of claim 13, wherein the proxy server is a network node performing one or more User Plane Functions (UPFs).

15. A method comprising:
receiving, from a proxy server, a request to create an encrypted tunnel with a user device via the proxy server, wherein the encrypted tunnel is based on an encryption key shared with a plurality of network nodes across a plurality of layers;
receiving, from the proxy server, a frame over the encrypted tunnel, wherein the frame comprises a data packet encrypted based on the encryption key shared with the plurality of network nodes across the plurality of layers; and
decoding, based on the encryption key, the data packet.

16. The method of claim 15, wherein the plurality of network nodes comprises the user device and the proxy server.

17. The method of claim 15, wherein the plurality of layers comprises a Quick User Datagram Protocol (UDP) Internet Connections (QUIC) protocol layer, an Internet Protocol (IP) layer, and a UDP layer.

18. The method of claim 15, wherein the frame comprises an Internet Protocol (IP) header, a User Datagram Protocol (UDP) header, a Quick UDP Internet Connections (QUIC) header, and the data packet encapsulated within a QUIC datagram.

19. The method of claim 15, wherein the request further comprises a method field being set to CONNECT and a protocol field being set to CONNECT-UDP or CONNECT-IP.

20. The method of claim 15, wherein the proxy server is a network node performing one or more User Plane Functions (UPFs).

* * * * *